United States Patent
Han et al.

(10) Patent No.: US 9,794,917 B2
(45) Date of Patent: *Oct. 17, 2017

(54) METHOD AND DEVICE FOR TRANSMITTING CONTROL INFORMATION IN A WIRELESS COMMUNICATION SYSTEM

(71) Applicant: LG ELECTRONICS INC., Seoul (KR)

(72) Inventors: Seunghee Han, Anyang-si (KR); Jaehoon Chung, Anyang-si (KR); Hyunwoo Lee, Anyang-si (KR); Moonil Lee, Anyang-si (KR); Hyunsoo Ko, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 114 days.

This patent is subject to a terminal disclaimer.

(21) Appl. No.: 14/836,585

(22) Filed: Aug. 26, 2015

(65) Prior Publication Data
US 2015/0373696 A1  Dec. 24, 2015

Related U.S. Application Data

(63) Continuation of application No. 13/824,281, filed as application No. PCT/KR2011/007524 on Oct. 11, 2011, now Pat. No. 9,155,083.
(Continued)

(51) Int. Cl.
*H04W 72/02* (2009.01)
*H04W 72/04* (2009.01)
(Continued)

(52) U.S. Cl.
CPC ....... *H04W 72/0413* (2013.01); *H04L 1/0073* (2013.01); *H04L 1/1657* (2013.01);
(Continued)

(58) Field of Classification Search
CPC ... H04L 1/0023; H04L 1/0025; H04L 1/0035; H04L 1/0075; H04L 1/1861;
(Continued)

(56) References Cited

U.S. PATENT DOCUMENTS 8,837,414 B2    9/2014 Han et al.
9,084,243 B2 *  7/2015 Yang ................... H04L 1/0027
(Continued)

OTHER PUBLICATIONS

Huawei, "SORTD resource allocation for PUCCH format 1a/1b", R1-104283, 3GPP TSG RAN WG1#62, Aug. 2010, 2 pages.
(Continued)

*Primary Examiner* — Benjamin H Elliott, IV
(74) *Attorney, Agent, or Firm* — Lee Hong Degerman Kang Waimey

(57) ABSTRACT

The present invention relates to a wireless communication system. In more detail, in relation to a method for a terminal to transmit ACK/NACK in a wireless communication system, an ACK/NACK transmission method includes: receiving at least one Physical Downlink Shared Channel (PDSCH); transmitting at least one ACK/NACK corresponding to the at least one PDSCH through a plurality of Physical Uplink Control Channel (PUCCH) formats; and, when the at least one ACK/NACK is transmitted using a first PUCCH format, transmitting at least one ACK/NACK in an antenna port transmission mode set for a second PUCCH format.

12 Claims, 34 Drawing Sheets

Related U.S. Application Data

(60) Provisional application No. 61/392,390, filed on Oct. 12, 2010, provisional application No. 61/411,480, filed on Nov. 9, 2010.

(51) Int. Cl.
  *H04L 1/18* (2006.01)
  *H04L 1/00* (2006.01)
  *H04L 1/16* (2006.01)
  *H04L 5/00* (2006.01)
  *H04B 7/0413* (2017.01)

(52) U.S. Cl.
  CPC .......... *H04L 1/1861* (2013.01); *H04L 5/0053* (2013.01); *H04L 5/0055* (2013.01); *H04W 72/042* (2013.01); *H04B 7/0413* (2013.01); *H04L 5/0023* (2013.01); *H04L 5/0094* (2013.01)

(58) Field of Classification Search
  CPC ............... H04L 5/0053; H04L 5/0055; H04W 72/0413; H04W 72/042
  See application file for complete search history.

(56) References Cited

U.S. PATENT DOCUMENTS

| | | | |
|---|---|---|---|
| 9,155,083 B2* | 10/2015 | Han | .................. H04L 1/1861 |
| 2010/0271970 A1 | 10/2010 | Pan et al. | |
| 2011/0103317 A1 | 5/2011 | Ribeiro et al. | |
| 2011/0243066 A1 | 10/2011 | Nayeb Nazar et al. | |
| 2013/0176982 A1 | 7/2013 | Han et al. | |
| 2013/0188589 A1* | 7/2013 | Nakashima | .......... H04B 7/0404 370/329 |
| 2013/0195066 A1 | 8/2013 | Lee et al. | |
| 2015/0373696 A1* | 12/2015 | Han | .................. H04L 1/1861 370/329 |

OTHER PUBLICATIONS

Nokia Siemens Networks, et al., "SORTD Resource allocation", R1-104437, 3GPP TSG RAN WG1 Meeting #62, Aug. 2010, 3 pages.

Sharp, "Resource allocation for PUCCH format 1a/1b SORTD", R1-104516, 3GPP TSG RAN WG1 Meeting #62, Aug. 2010, 7 pages.

LG Electronics, "Discussion on Control Signaling for Uplink Transmission Mode", R1-104770, 3GPP TSG RAN WG1 Meeting #62, Aug. 2010, 6 pages.

PCT International Application No. PCT/KR2011/007524, Written Opinion of the International Searching Authority dated Apr. 19, 2012, 9 pages.

PCT International Application No. PCT/KR2011/007524, Written Opinion of the International Searching Authority dated Apr. 19, 2012, 16 pages.

* cited by examiner

FIG. 6
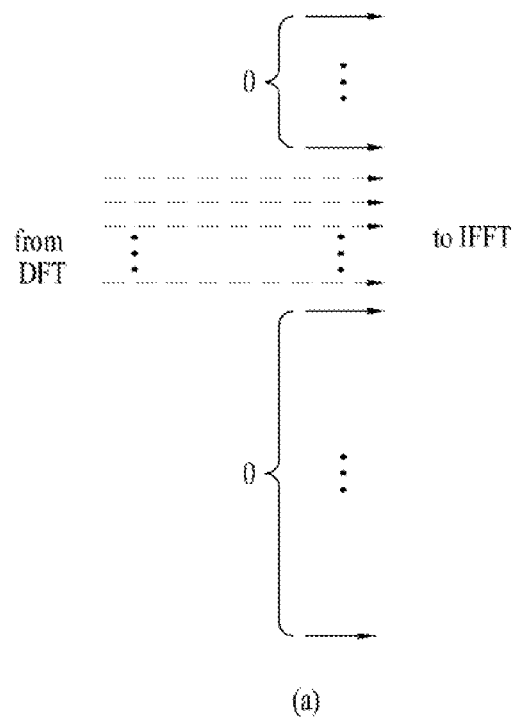
(a)
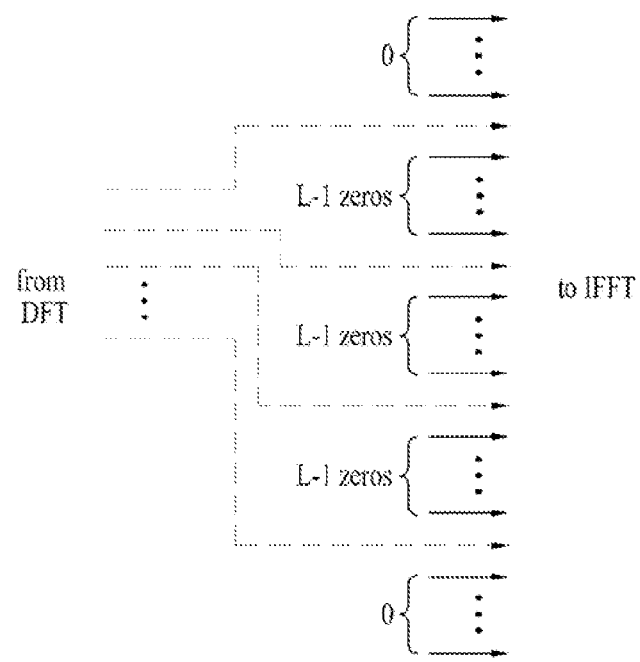
(b)

PUCCH format 1a and 1b structure (normal CP case)

PUCCH format 1a and 1b structure (extended CP case)

PUCCH format 2,2a and 2b structure (normal CP case)

PUCCH format 2,2a and 2b structure (extended CP case)

FIG. 19

Resource allocation: 18 ACK/NACK channels with normal CP $\Delta_{shift}^{PUCCH} = 2$

| Cell specific cyclic shift offset | | RS orthogonal cover | | | ACK/NACK orthogonal cover | | |
|---|---|---|---|---|---|---|---|
| $\delta_{offset}^{PUCCH}=1$ | $\delta_{offset}^{PUCCH}=0$ | $\overline{n}_{OC}=0$ | $\overline{n}_{OC}=1$ | $\overline{n}_{OC}=2$ | $n_{OC}=0$ | $n_{OC}=1$ | $n_{OC}=2$ |
| $n_{CS}=1$ | $n_{CS}=0$ | n'=0 | | 12 | n'=0 | | 12 |
| 2 | 1 | | 6 | 13 | | 6 | 13 |
| 3 | 2 | 1 | | | 1 | | |
| 4 | 3 | | 7 | 14 | | 7 | 14 |
| 5 | 4 | 2 | | 15 | 2 | | 15 |
| 6 | 5 | 3 | 8 | | 3 | 8 | |
| 7 | 6 | | 9 | 16 | | 9 | 16 |
| 8 | 7 | 4 | | 17 | 4 | | 17 |
| 9 | 8 | | 10 | | | 10 | |
| 10 | 9 | 5 | | | 5 | | |
| 11 | 10 | | 11 | | | 11 | |
| 0 | 11 | | | | | | |

$\Delta_{shift}^{PUCCH} = \begin{cases} \{1,2,3\} \text{ for normal cyclic prefix} \\ \{1,2,3\} \text{ for extended cyclic prefix} \end{cases}$ $\delta_{offset}^{PUCCH} \in \{0,1,...,\Delta_{shift}^{PUCCH}-1\}$ Cell specific cyclic shift offset $n_{OC}$ Orthogonal sequence index for ACK/NACK
$\overline{n}_{OC}$ Orthogonal sequence index for RS
$n_{CS}$ Cyclic shift value of a CAZAC sequence
n' ACK/NACK resource index used for the channelization in a RB

METHOD AND DEVICE FOR TRANSMITTING CONTROL INFORMATION IN A WIRELESS COMMUNICATION SYSTEM

CROSS-REFERENCE TO RELATED APPLICATIONS

This application is a continuation of U.S. patent application Ser. No. 13/824,281, filed on Mar. 15, 2013, now U.S. Pat. No. 9,155,083, which is the National Stage filing under 35 U.S.C. 371 of International Application No. PCT/KR2011/007524, filed on Oct. 11, 2011, which claims the benefit of U.S. Provisional Application No. 61/392,390, filed on Oct. 12, 2010, and 61/411,480, filed on Nov. 9, 2010, the contents of which are all hereby incorporated by reference herein in their entirety.

TECHNICAL FIELD

The present invention relates to a wireless communication system, and more particularly, to a method and apparatus for transmitting control information. The wireless communication system may support Carrier Aggregation (CA).

BACKGROUND ART

Wireless communication systems have been widely deployed to provide various types of communication services such as voice or data services. Generally, a wireless communication system is a multiple access system capable of supporting communication with multiple users by sharing available system resources (bandwidth, transmit power, etc.). Multiple access systems include, for example, a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DETAILED DESCRIPTION OF THE INVENTION

Technical Problems

It is an object of the present invention to provide a method and apparatus for efficiently transmitting control information in a wireless communication system. It is another object of the present invention to provide a channel format and a signal processing method and apparatus, for efficiently transmitting control information. It is a further object of the present invention to provide a method and apparatus for efficiently allocating resources for transmission of control information.

It will be appreciated by persons skilled in the art that that the technical objects that can be achieved through the present invention are not limited to what has been particularly described hereinabove and other technical objects of the present invention will be more clearly understood from the following detailed description.

Technical Solutions

In accordance with an aspect of the present invention, a method for transmitting, by a user equipment, an Acknowledgement/Negative Acknowledgement (ACK/NACK) signal in a wireless communication system includes receiving at least one Physical Downlink Shared Channel (PDSCH) and transmitting at least one ACK/NACK signal corresponding to the at least one PDSCH using one of a plurality of Physical Uplink Control Channel (PUCCH) formats, wherein the at least one ACK/NACK signal is transmitted using an antenna port transmission mode configured for a second PUCCH format when the at least one ACK/NACK signal is transmitted using a first PUCCH format.

In accordance with another aspect of the present invention, a method for transmitting, by a user equipment, an ACK/NACK signal in a wireless communication system includes receiving at least one Physical Downlink Shared Channel (PDSCH) and transmitting at least one ACK/NACK signal corresponding to the at least one PDSCH using one of a plurality of Physical Uplink Control Channel (PUCCH) formats, wherein the at least one ACK/NACK signal is transmitted using a separately configured antenna port transmission mode other than an antenna port transmission mode configured for a first PUCCH format when the at least one ACK/NACK signal is transmitted using the first PUCCH format.

In accordance with still another aspect of the present invention, an apparatus for transmitting an ACK/NACK signal in a wireless communication system includes a Radio Frequency (RF) unit and a processor for controlling the RF unit to receive at least one Physical Downlink Shared Channel (PDSCH) and transmit at least one ACK/NACK signal corresponding to the at least one PDSCH using one of a plurality of Physical Uplink Control Channel (PUCCH) formats, wherein the at least one ACK/NACK signal is transmitted using an antenna port transmission mode configured for a second PUCCH format when the at least one ACK/NACK signal is transmitted using a first PUCCH format.

In accordance with a further aspect of the present invention, an apparatus for transmitting an ACK/NACK signal in a wireless communication system includes a Radio Frequency (RF) unit and a processor for controlling the RF unit to receive at least one Physical Downlink Shared Channel (PDSCH) and transmit at least one ACK/NACK signal corresponding to the at least one PDSCH using one of a plurality of Physical Uplink Control Channel (PUCCH) formats, wherein the at least one ACK/NACK is transmitted using a separately configured antenna port transmission mode other than an antenna port transmission mode configured for a first PUCCH format when the at least one ACK/NACK signal is transmitted using the first PUCCH format.

The plurality of PUCCH formats may include a PUCCH format, a PUCCH format 1a, a PUCCH format 1b, and a PUCCH format 3.

The antenna port transmission mode may be a single-antenna port mode or a Spatial Orthogonal Resource Transmit Diversity (SORTD) mode.

Advantageous Effects

According to the present invention, control information can be efficiently transmitted in a wireless communication system. Further, a channel format and a signal processing method for efficiently transmitting resources can be provided. Moreover, resources for transmission of control information can be efficiently allocated.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included as a part of the detailed description to provide a further understanding of the invention, provide embodiments of the invention and together with the description serve to explain the principle of the invention. In the drawings.

FIG. 6 illustrates signal mapping schemes in the frequency domain while satisfying a single carrier property;

FIG. 19 illustrates ACK/NACK channelization for PUCCH Formats 1a and 1b;

BEST MODE FOR CARRYING OUT THE INVENTION

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

Techniques, devices, and systems described herein may be used in various wireless multiple access systems. The wireless access system includes, for example, Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), and Multi-Carrier Frequency Division Multiple Access (MC-FDMA) systems. CDMA may be implemented as a radio technology such as Universal Terrestrial Radio Access (UTRA) or CDMA2000. TDMA may be implemented as a radio technology such as Global System for Mobile communication (GSM), General Packet Radio Service (GPRS), and Enhanced Data Rates for GSM Evolution (EDGE). OFDMA may be implemented as a radio technology such as Institute of Electrical and Electronics Engineers (IEEE) 802.11 (Wi-Fi), IEEE 802.16 (WiMAX), IEEE 802.20, and Evolved-UTRA (E-UTRA). UTRAN is a part of Universal Mobile Telecommunication System (UMTS) and 3rd Generation Partnership Project (3GPP) Long Term Evolution (LTE) is a part of Evolved UMTS (E-UMTS) using E-UTRAN. 3GPP LTE employs OFDMA on downlink and SC-FDMA on uplink. LTE-A is an evolved version of 3GPP LTE. For convenience of description, it is assumed that the present invention is applied to 3GPP LTE/LTE-A. However, the technical features of the present invention are not limited thereto.

In a wireless communication system, a User Equipment (UE) receives information through downlink from a Base Station (BS) and transmits information through uplink to the BS. Information transmitted and received by the BS and UE includes data and various control information and there are various physical channels according to type/usage of information transmitted and received by the BS and UE.

Figure 1:
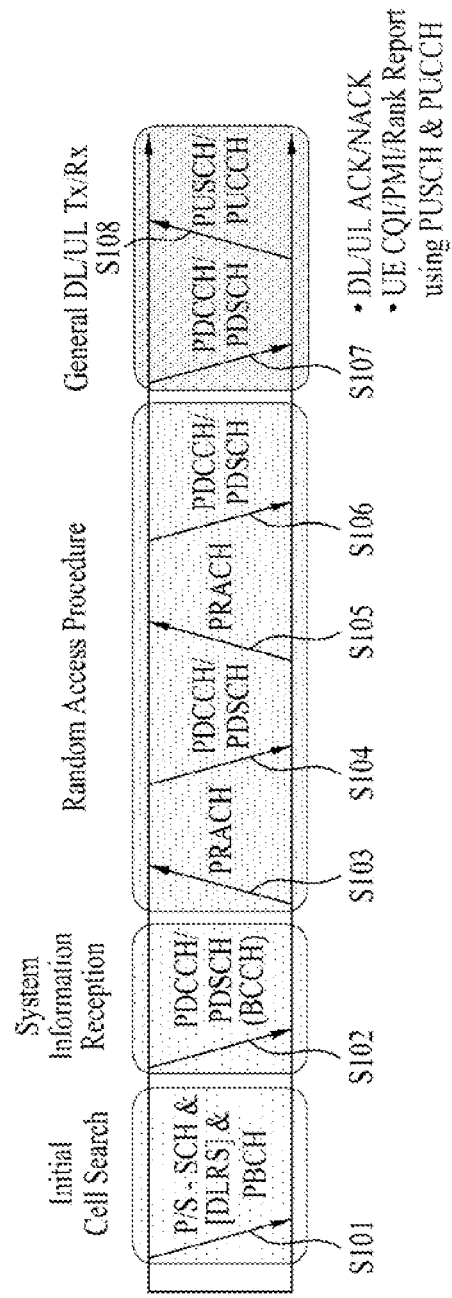
FIG. 1 illustrates physical channels used in a 3GPP LTE system which is an exemplary wireless communication system and a general signal transmission method using the physical channels.

FIG. 1 illustrates physical channels used in a 3rd Generation Partnership Project (3GPP) Long Term Evolution (LTE) system and a general signal transmission method using the physical channels.

Referring to FIG. 1, upon power-on or when a UE initially enters a cell, the UE performs an initial cell search involving synchronization of its timing to a BS in step S101. For the initial cell search, the UE may be synchronized to the BS and acquire information such as a cell Identifier (ID) by receiving a Primary Synchronization CHannel (P-SCH) and a Secondary Synchronization CHannel (S-SCH). Then the UE may receive broadcast information from the cell on a Physical Broadcast CHannel (PBCH). In the mean time, the UE may determine a downlink channel status by receiving a DownLink Reference Signal (DL RS) during the initial cell search.

After the initial cell search, the UE may acquire more specific system information by receiving a Physical Downlink Control CHannel (PDCCH) and receiving a Physical Downlink Shared CHannel (PDSCH) based on information of the PDCCH in step S102.

Next, in order to complete access to the BS, the UE may perform a random access procedure as indicated in steps S103 to S106. To this end, the UE may transmit a preamble through a Physical Random Access CHannel (PRACH) (S103) and receive a response message to the preamble through the PDCCH and the PDSCH corresponding to the PDCCH (S104). If the random access procedure is contention-based, the UE may additionally perform a contention resolution procedure such as transmission of the PDSCH (S104) and reception of the PDCCH and the PDSCH corresponding to the PDCCH (S106).

The UE which has performed the above procedures may then receive a PDCCH/PDSCH (S107) and transmit a Physical Uplink Shared CHannel (PUSCH)/Physical Uplink Control CHannel (PUCCH) (S108), as a general uplink/downlink (UL/DL) signal transmission procedure. Control information that the UE transmits to the BS is collectively referred to as Uplink Control Information (UCI). UCI includes a Hybrid Automatic Repeat and request (HARQ) Acknowledgement/Negative Acknowledgement (ACK/NACK) signal, a Scheduling Request (SR), a Channel Quality Indicator (CQI), a Precoding Matrix Index (PMI), a Rank Indicator (RI), and the like. In this specification, HARQ ACK/NACK is simply referred to as HARQ-ACK or ACK/NACK (A/N). HARQ-ACK includes at least one of positive ACK (simply, ACK), negative ACK (NACK), DTX, and NACK/DTX. While UCI is generally transmitted through the PUCCH, UCI may be transmitted through the PUSCH in the case where control information and traffic data should be simultaneously transmitted. In addition, UCI may be aperiodically transmitted through the PUSCH at the request/command of a network.

Figure 2:
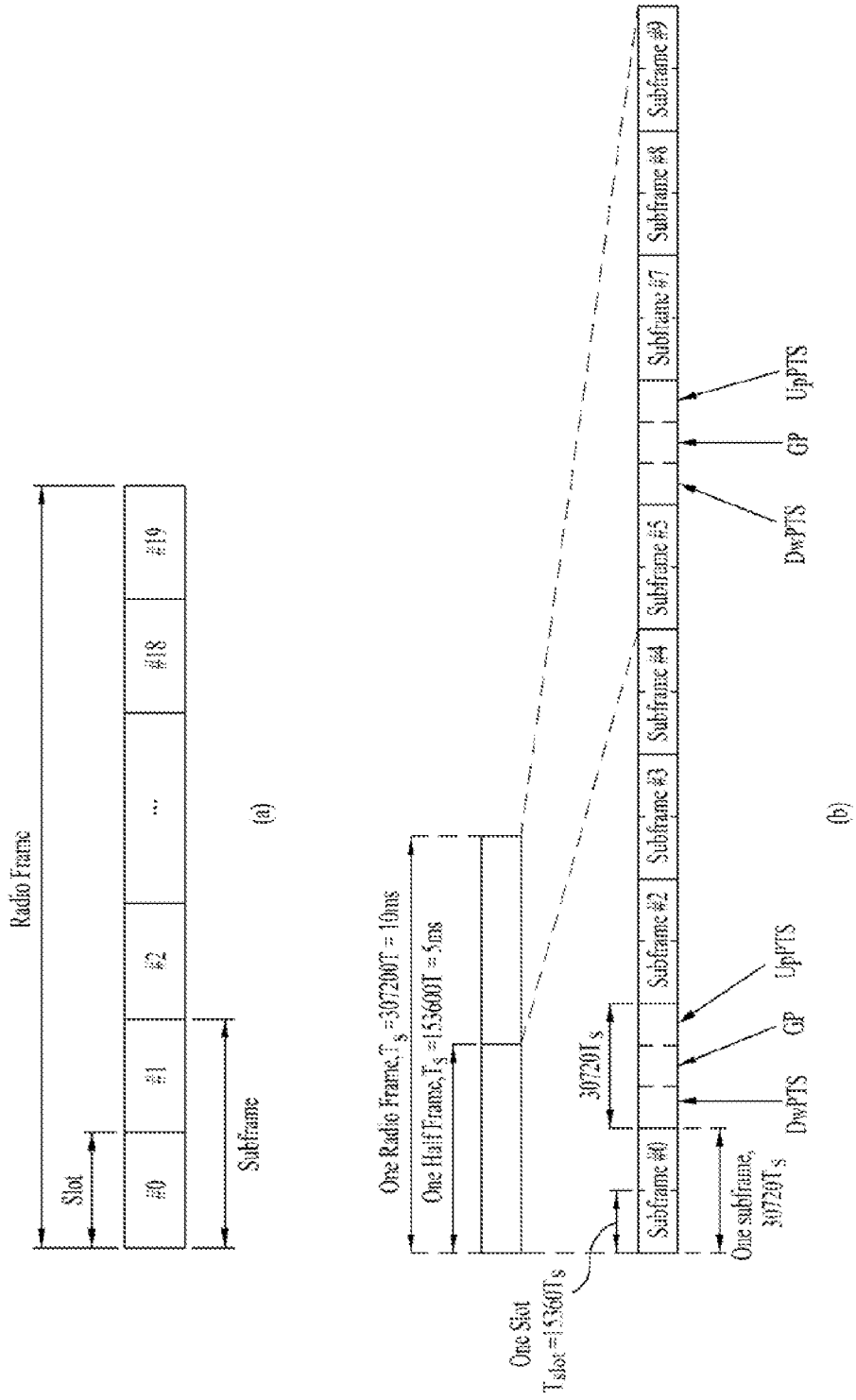
FIG. 2 illustrates radio frame structures.

FIG. 2 illustrates exemplary radio frame structures used in a wireless communication system. In a cellular OFDM radio packet communication system, uplink/downlink data packet transmission is performed in subframe units. One subframe is defined as a predetermined time interval including a plurality of OFDM symbols. The 3GPP LTE standard supports a type 1 radio frame structure applicable to Frequency Division Duplex (FDD) and a type 2 radio frame structure applicable to Time Division Duplex (TDD).

FIG. 2(a) illustrates the structure of the type 1 radio frame. A downlink radio frame includes 10 subframes, and one subframe includes two slots in the time domain. A time required to transmit one subframe is defined as a Transmission Time Interval (TTI). For example, one subframe may have a length of 1 ms and one slot may have a length of 0.5 ms. One slot includes a plurality of OFDM symbols in the time domain and includes a plurality of Resource Blocks (RBs) in the frequency domain. Since a 3GPP LTE system adopts OFDMA in downlink, an OFDM symbol indicates one symbol interval. The OFDM symbol may be referred to as an SC-FDMA symbol or a symbol interval. An RB as a resource allocation unit includes a plurality of contiguous subcarriers in a slot.

The number of OFDM symbols included in one slot may be changed according to the configuration of a Cyclic Prefix (CP). The CP includes an extended CP and a normal CP. For example, if the OFDM symbols are configured by the normal CP, the number of OFDM symbols included in one slot may be seven. If the OFDM symbols are configured by the extended CP, since the length of one OFDM symbol is increased, the number of OFDM symbols included in one slot is less than that of the case of the normal CP. In case of the extended CP, for example, the number of OFDM symbols included in one slot may be six. If a channel state is unstable, for example, if a UE moves at a high speed, the extended CP may be used in order to further reduce inter-symbol interference.

In case of using the normal CP, since one slot includes 7 OFDM symbols, one subframe includes 14 OFDM symbols. At this time, a maximum of the first three OFDM symbols of each subframe may be allocated to a PDCCH and the remaining OFDM symbols may be allocated to a PDSCH.

FIG. 2(b) illustrates the structure of the type 2 radio frame. The type 2 radio frame includes two half frames, each of which includes five subframes, a Downlink Pilot Time Slot (DwPTS), a Guard Period (GP), and an Uplink Pilot Time Slot (UpPTS). One subframe includes two slots. DwPTS is used for initial cell search, synchronization, or channel estimation in a UE. UpPTS is used for channel estimation in a BS and uplink transmission synchronization of the UE. GP is located between uplink and downlink to remove interference generated in uplink due to multi-path delay of a downlink signal.

The structure of the radio frame is only exemplary. Accordingly, the number of subframes included in the radio frame, the number of slots included in the subframe, or the number of symbols included in the slot may be changed in various manners.

Figure 3:
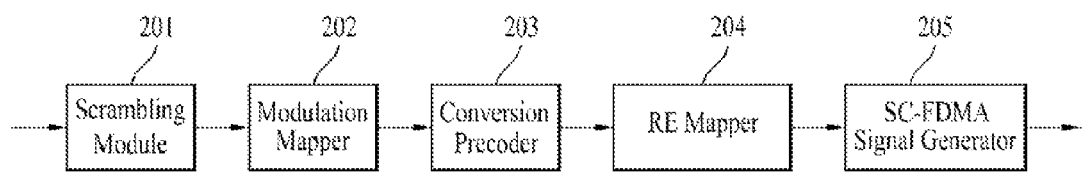
FIG. 3 illustrates an uplink signal processing operation.

FIG. 3 illustrates a signal processing operation for transmitting an uplink signal in a UE.

A scrambling module 201 may scramble a transmission signal using a scrambling signal in order to transmit an uplink signal. A modulation mapper 202 modulates the scrambled signal received from the scrambling module 201 to complex modulation symbols using Binary Phase Shift Keying (BPSK), Quadrature Phase Shift Keying (QPSK), or 16 Quadrature Amplitude Modulation (QAM)/64 QAM according to the type of the transmission signal or a channel state. A precoder 203 processes the complex modulation symbols received from the modulation mapper 202. An RE mapper 204 may map the complex modulation symbols received from the precoder 203 to time-frequency REs. After being processed in an SC-FDMA signal generator 205, the mapped signal may be transmitted to a BS through an antenna.

Figure 4:
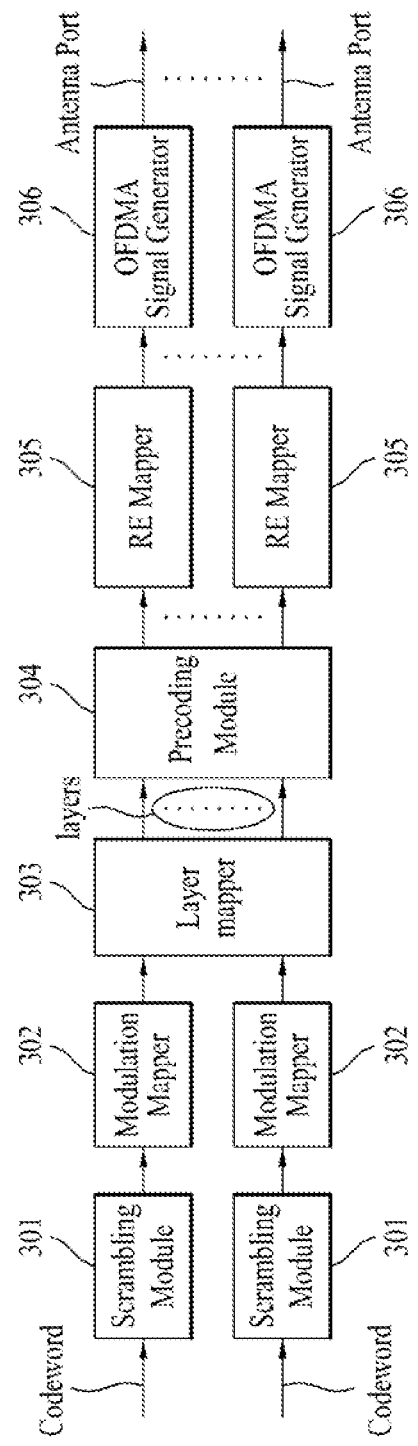
FIG. 4 illustrates a downlink signal processing operation.

FIG. 4 illustrates a signal processing operation for transmitting a downlink signal in a BS.

In an LTE system, the BS may transmit one or more codewords on downlink. Scrambling modules 301 and modulation mappers 302 may process the codewords into complex symbols, as in FIG. 3. A layer mapper 303 maps the complex symbols to a plurality of layers. A precoding module 304 may multiply the layers by a precoding matrix and may allocate the multiplied signals to respective transmission antennas. RE mappers 305 map the antenna-specific signals processed by the precoding module 304 to time-frequency REs. After being processed in OFDMA signal generators 306, the mapped signals may be transmitted through the respective antennas.

In the wireless communication system, uplink signal transmission from a UE is more problematic than downlink signal transmission from a BS in Peak-to-Average Power Ratio (PAPR). Accordingly, SC-FDMA is adopted for uplink signal transmission, unlike OFDMA used for downlink signal transmission as described above with reference to FIGS. 3 and 4.

Figure 5:
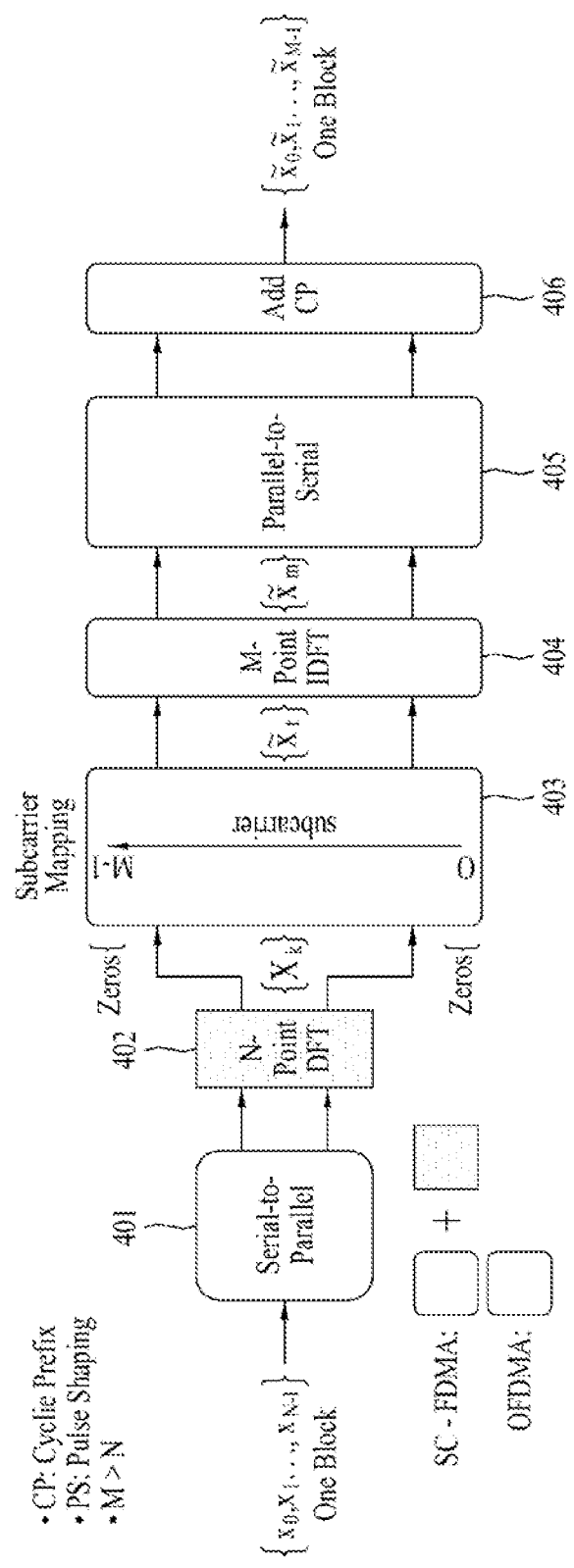
FIG. 5 illustrates SC-FDMA and OFDMA.

FIG. 5 illustrates SC-FDMA and OFDMA, to which the present invention is applied. The 3GPP system uses OFDMA on downlink and SC-FDMA on uplink.

Referring to FIG. 5, a UE for uplink signal transmission and a BS for downlink signal transmission commonly have a serial-to-parallel converter 401, a subcarrier mapper 403, an M-point Inverse Discrete Fourier Transform (IDFT) module 404, and a Cyclic Prefix (CP) addition module 406. Nonetheless, the UE further includes an N-point Discrete Fourier Transform (DFT) module 402 to transmit an uplink signal in SC-FDMA. The N-point DFT module 402 partially offsets the effects of IDFT performed by the M-point IDFT module 404 so that a transmission uplink signal may have a single carrier property.

FIG. 6 illustrates examples of mapping input symbols to subcarriers in the frequency domain while satisfying the single carrier property. FIG. 6(*a*) illustrates localized mapping and FIG. 6(*b*) illustrates distributed mapping.

Clustered SC-FDMA which is a modified version of SC-FDMA will now be described. In clustered SC-FDMA, DFT processed output samples are divided into sub-groups and the sub-groups are discontinuously mapped in the frequency domain (or subcarrier domain), during a subcarrier mapping process.

Figure 7:
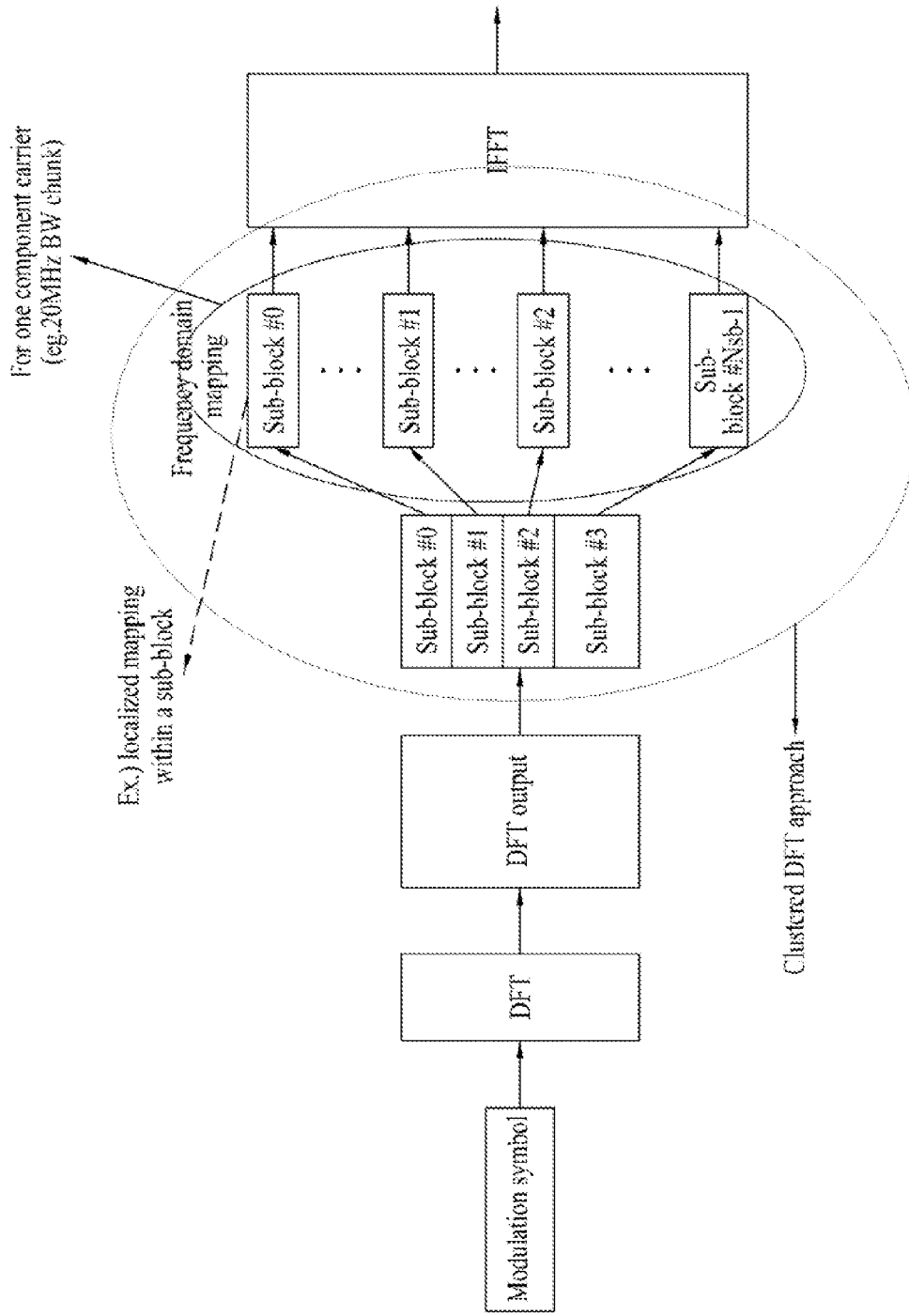
FIG. 7 illustrates a signal processing operation for mapping DFT processed samples to a single carrier in clustered SC-FDMA.
Figure 8:
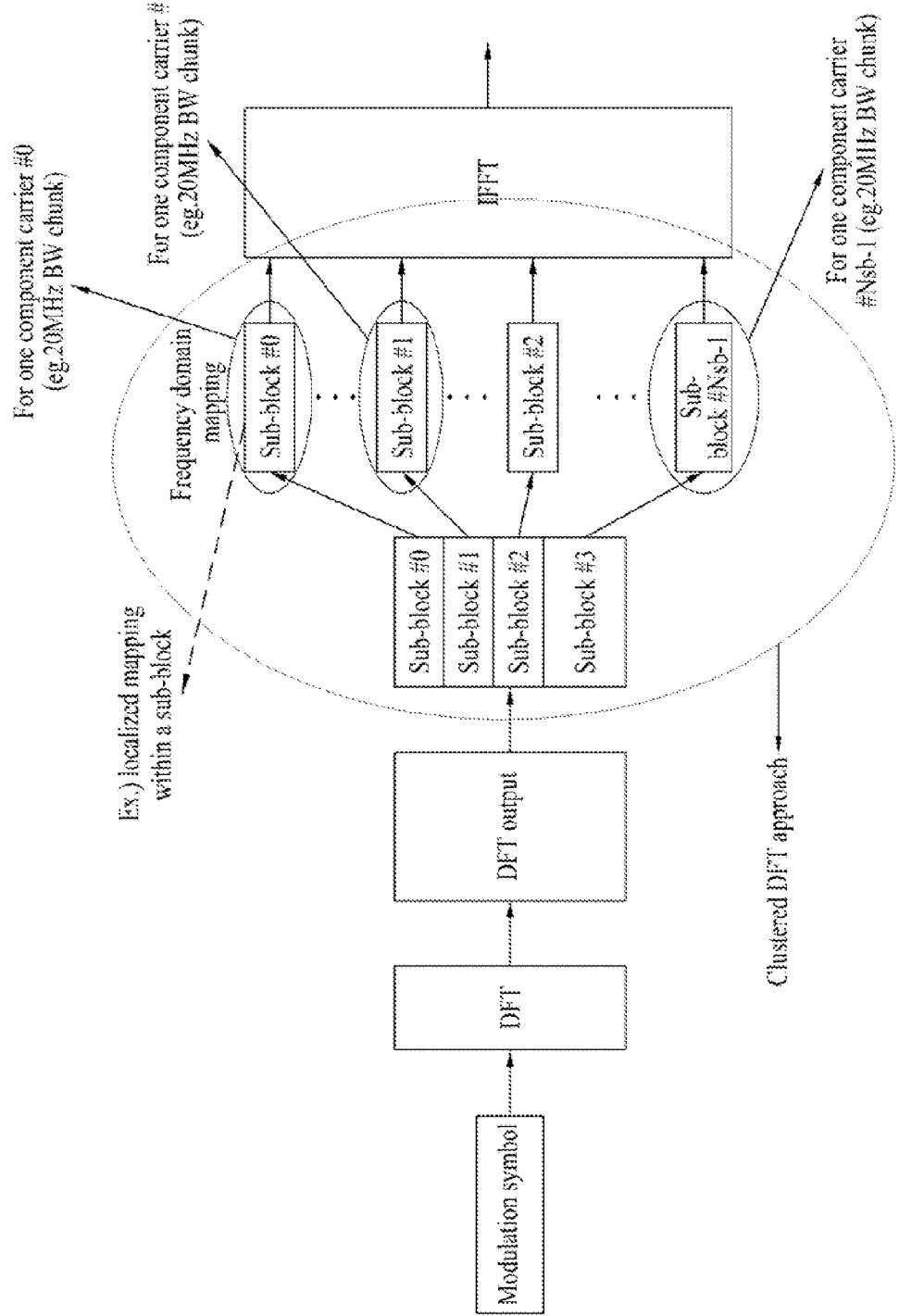
FIGS. 8 and 9 illustrate signal processing operations for mapping DFT processed samples to multiple carriers in clustered SC-FDMA.
Figure 9:
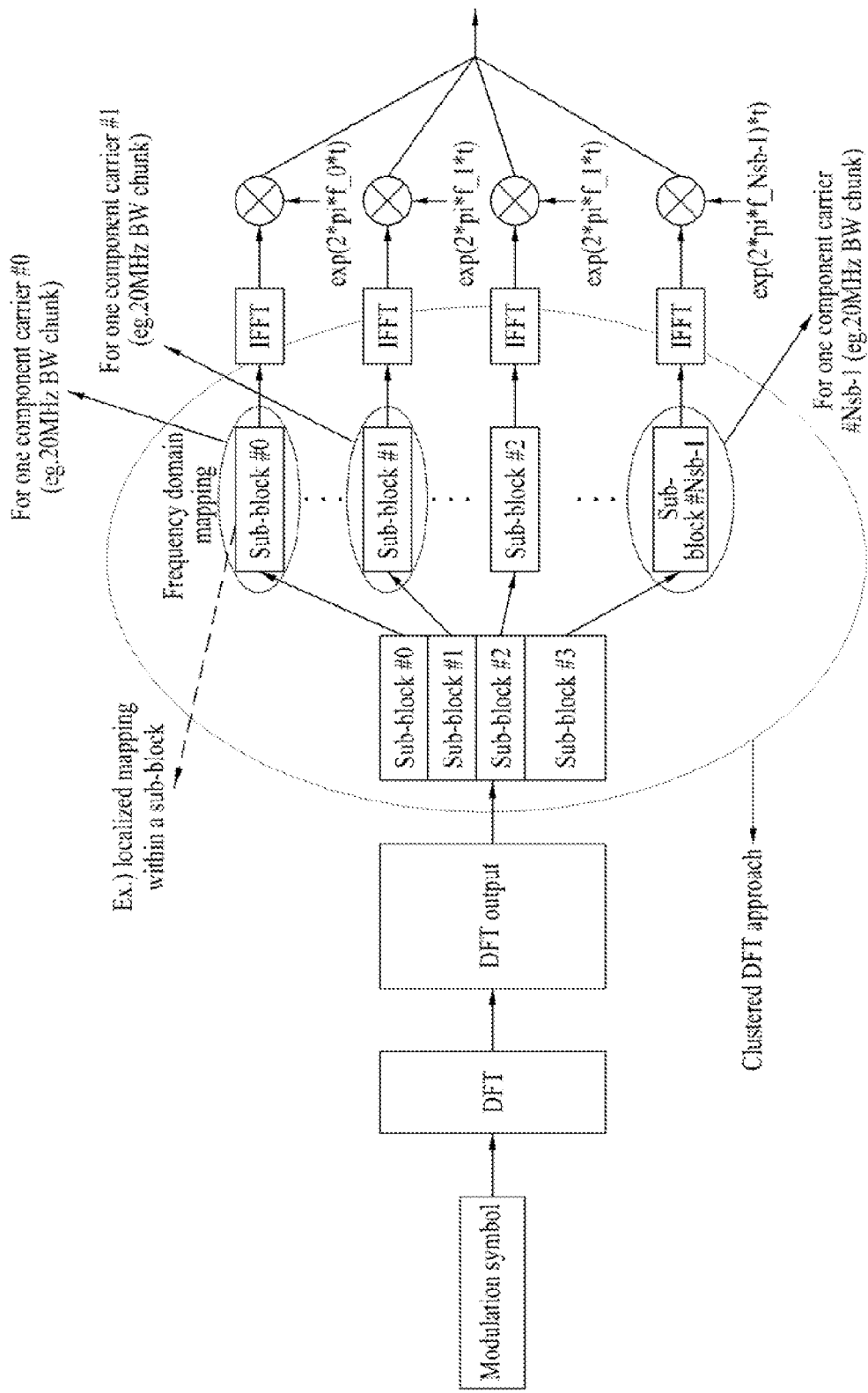

FIG. 7 illustrates an operation for mapping DFT processed samples to a single carrier in clustered SC-FDMA. FIGS. 8 and 9 illustrate operations for mapping DFT processed samples to multiple carriers in clustered SC-FDMA. FIG. 7 illustrates the application of intra-carrier clustered SC-FDMA, whereas FIGS. 8 and 9 illustrate the application of inter-carrier clustered SC-FDMA. FIG. 8 illustrates signal generation through a single IFFT block in the case of alignment of a subcarrier spacing between contiguous subcarriers in a situation in which Component Carriers (CCs) are contiguously allocated in the frequency domain. FIG. 9 illustrates signal generation through a plurality of IFFT blocks in a situation in which CCs are non-contiguously allocated in the frequency domain.

Figure 10:
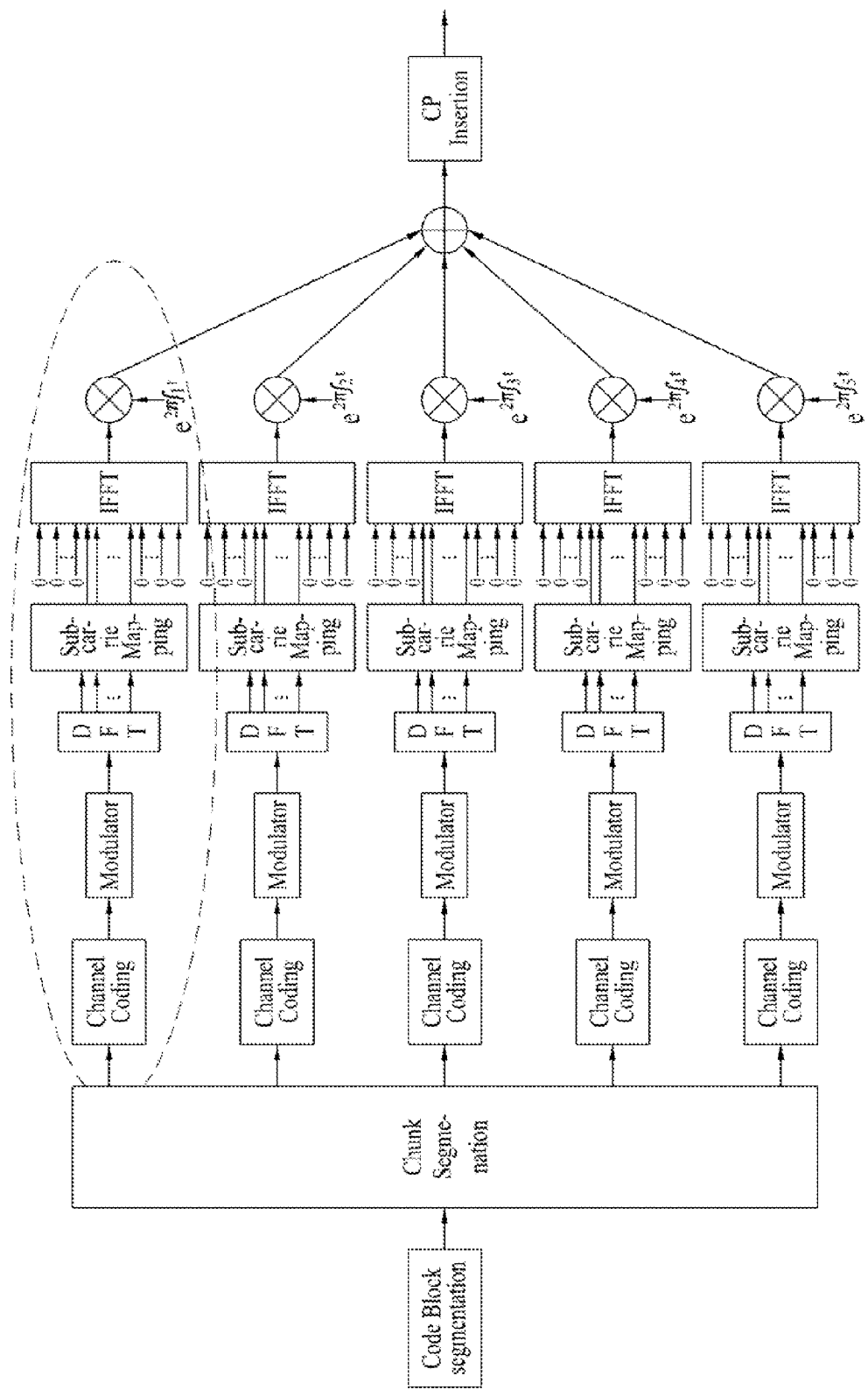
FIG. 10 illustrates a signal processing operation in segmented SC-FDMA.

FIG. 10 illustrates a signal processing operation in segmented SC-FDMA.

As the number of DFT blocks is equal to the number of IFFT blocks and thus the DFT blocks and the IFFT blocks are in a one-to-one correspondence, segmented SC-FDMA is a simple extension of the DFT spreading and IFFT subcarrier mapping structure of conventional SC-FDMA and may be expressed as NxSC-FDMA or NxDFT-s-OFDMA. In this disclosure, segmented SC-FDMA includes all these terms. Referring to FIG. 9, in segmented SC-FDMA, all modulation symbols in the time domain are divided into N groups (where N is an integer greater than 1) and subjected to a DFT process in units of a group in order to relieve single carrier property constraints.

Figure 11:
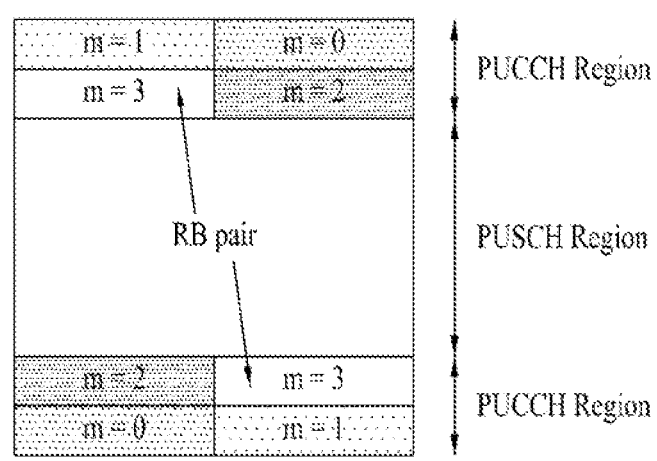
FIG. 11 illustrates an uplink subframe structure.

FIG. 11 illustrates an uplink subframe structure.

Referring to FIG. 11, an uplink subframe includes multiple (e.g. two) slots. A slot may include a different number of SC-FDMA symbols according to the length of a CP. For example, in case of a normal CP, a slot may include 7 SC-FDMA symbols. The uplink subframe is divided into a data region and a control region. The data region includes a PUSCH region and is used to transmit data signals such as voice signals. The control region includes a PUCCH region and is used to transmit control information. The PUCCH includes an RB pair (e.g. RB pair of a frequency mirrored location, m=0, 1, 2, 3) located at both ends of the data region on the frequency domain and the RB pair is hopped on a slot basis. UCI includes an HARQ ACK/NACK, a CQI, a PMI, and an RI.

Figure 12:
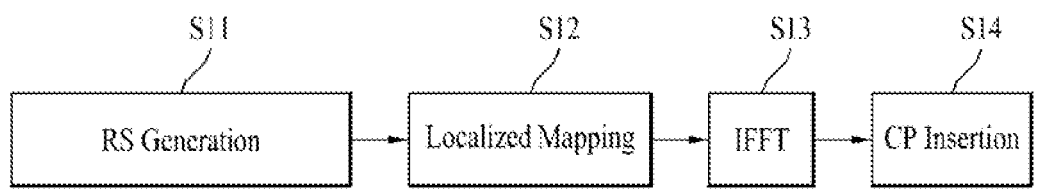
FIG. 12 illustrates a signal processing procedure for transmitting an RS on uplink.

FIG. 12 illustrates a signal processing procedure for transmitting an RS on uplink. While data is converted into a frequency-domain signal through a DFT processor, is mapped to a signal on subcarriers, and then is transmitted through IFFT, an RS is generated without passing through the DFT precoder. Specifically, an RS sequence is directly generated (S11) in the frequency domain and then the RS is transmitted through sequential processes of localized mapping (S12), IFFT (S13), and CP insertion (S14).

RS sequence $r_{u,v}^{(a)}(n)$ is defined by a cyclic shift a of a base sequence $\bar{r}_{u,v}(n)$, and may be expressed as Equation 1.

$$r_{u,v}^{(a)}(n) = e^{j\alpha n}\bar{r}_{u,v}(n), 0 \leq n < M_{sc}^{RS} \quad \text{[Equation 1]}$$

Here, $M_{sc}^{RS} = mN_{sc}^{RB}$ is the length of the reference signal sequence, $N_{sc}^{RB}$ is Resource block size, expressed as a number of subcarriers, and $1 \leq m \leq N_{RB}^{max,UL}$. $N_{RB}^{max,UL}$ is maximum uplink bandwidth.

Base sequences $\bar{r}_{u,v}(n)$ are divided into groups, where $u \in \{0, 1, \ldots, 29\}$ is the group number and v is the base sequence number within the group, such that each group contains one base sequence (v=0) of each length $M_{sc}^{RS} = mN_{sc}^{RB}$, $1 \leq m \leq 5$ and two base sequences (v=0, 1) of each length $M_{sc}^{RS} = mN_{sc}^{RB}$, $6 \leq m \leq N_{RB}^{max,UL}$. The sequence group number u and the number v within the group may vary in time as described in Sections 5.5.1.3 and 5.5.1.4, respectively. The definition of the base sequence $\bar{r}_{u,v}(0), \ldots, \bar{r}_{u,v}(M_{sc}^{RS}-1)$ depends on the sequence length $M_{sc}^{RS}$.

Base sequences of length $3N_{sc}^{RB}$ or larger may be defined as follows.

For $M_{sc}^{RS} \geq 3N_{sc}^{RB}$, the base sequence $\bar{r}_{u,v}(0), \ldots, \bar{r}^{u,v}(M_{sc}^{RS}-1)$ is given by Equation 2.

$$\bar{r}_{u,v}(n) = x_q(n \bmod N_{ZC}^{RS}), 0 \leq n < M_{sc}^{RS} \quad \text{[Equation 2]}$$

The $q^{th}$ root Zadoff-Chu sequence may be defined by Equation 3.

$$x_q(m) = e^{-j\frac{\pi q m(m+1)}{N_{ZC}^{RS}}}, \quad \text{[Equation 3]}$$
$$0 \leq m \leq N_{ZC}^{RS} - 1$$

where q satisfies the following Equation 4.

$$q = \lfloor \bar{q} + 1/2 \rfloor + v \cdot (-1)^{\lfloor 2\bar{q} \rfloor}$$

$$\bar{q} = N_{ZC}^{RS} \cdot (u+1)/31 \quad \text{[Equation 4]}$$

The length $N_{ZC}^{RS}$ of the Zadoff-Chu sequence is given by the largest prime number such that $N_{ZC}^{RS} \leq M_{sc}^{RS}$.

Base sequences of length less than $3N_{sc}^{RB}$ may be defined as follows.

For $M_{sc}^{RS} = N_{sc}^{RB}$ and $M_{sc}^{RS} = 2N_{sc}^{RB}$, base sequence is given by Equation 5.

$$\bar{r}_{u,v}(n) = e^{j\phi(n)\pi/4}, 0 \leq n \leq M_{sc}^{RS} - 1 \quad \text{[Equation 5]}$$

where the value of $\phi(n)$ is given by the following Table 1 and Table 2 for $M_{sc}^{RS} = N_{sc}^{RB}$ and $M_{sc}^{RS} = 2N_{sc}^{RB}$, respectively.

TABLE 1

| u | φ(0), ..., φ(11) | | | | | | | | | | | |
|---|---|---|---|---|---|---|---|---|---|---|---|---|
| 0 | -1 | 1 | 3 | -3 | 3 | 3 | 1 | 1 | 3 | 1 | -3 | 3 |
| 1 | 1 | 1 | 3 | 3 | 3 | -1 | 1 | -3 | -3 | 1 | -3 | 3 |
| 2 | 1 | 1 | -3 | -3 | -3 | -1 | -3 | -3 | 1 | -3 | 1 | -1 |
| 3 | -1 | 1 | 1 | 1 | 1 | -1 | -3 | -3 | 1 | -3 | 3 | -1 |
| 4 | -1 | 3 | 1 | -1 | 1 | -1 | -3 | -1 | 1 | -1 | 1 | 3 |
| 5 | 1 | -3 | 3 | -1 | -1 | 1 | 1 | -1 | -1 | 3 | -3 | 1 |
| 6 | -1 | 3 | -3 | -3 | -3 | 3 | 1 | -1 | 3 | 3 | -3 | 1 |
| 7 | -3 | -1 | -1 | -1 | 1 | -3 | 3 | -1 | 1 | -3 | 3 | 1 |
| 8 | 1 | -3 | 3 | 1 | -1 | -1 | -1 | 1 | 1 | 3 | -1 | 1 |
| 9 | 1 | -3 | -1 | 3 | 3 | -1 | -3 | 1 | 1 | 1 | 1 | 1 |
| 10 | -1 | 3 | -1 | 1 | 1 | -3 | -3 | -1 | -3 | -3 | 3 | -1 |
| 11 | 3 | 1 | -1 | -1 | 3 | 3 | -3 | 1 | 3 | 1 | 3 | 3 |
| 12 | 1 | -3 | 1 | 1 | -3 | 1 | 1 | 1 | -3 | -3 | -3 | 1 |
| 13 | 3 | 3 | -3 | 3 | -3 | 1 | 1 | 3 | -1 | -3 | 3 | 3 |
| 14 | -3 | 1 | -1 | -3 | -1 | 3 | 1 | 3 | 3 | 3 | -1 | 1 |
| 15 | 3 | -1 | 1 | -3 | -1 | -1 | 1 | 1 | 3 | 1 | -1 | -3 |
| 16 | 1 | 3 | 1 | -1 | 1 | 3 | 3 | 3 | -1 | -1 | 3 | -1 |
| 17 | -3 | 1 | 1 | 3 | -3 | 3 | -3 | -3 | 3 | 1 | 3 | -1 |
| 18 | -3 | 3 | 1 | 1 | -3 | 1 | -3 | -3 | -1 | -1 | 1 | -3 |
| 19 | -1 | 3 | 1 | 3 | 1 | -1 | -1 | 3 | -3 | -1 | -3 | -1 |
| 20 | -1 | -3 | 1 | 1 | 1 | 1 | 3 | 1 | -1 | 1 | -3 | -1 |
| 21 | -1 | 3 | -1 | 1 | -3 | -3 | -3 | -3 | -3 | 1 | -1 | -3 |
| 22 | 1 | 1 | -3 | -3 | -3 | -3 | -1 | 3 | -3 | 1 | -3 | 3 |
| 23 | 1 | 1 | -1 | -3 | -1 | -3 | 1 | -1 | 1 | 3 | -1 | 1 |
| 24 | 1 | 1 | 3 | 1 | 3 | 3 | -1 | 1 | -1 | -3 | -3 | 1 |
| 25 | 1 | -3 | 3 | 3 | 1 | 3 | 3 | 1 | -3 | -1 | -1 | 3 |
| 26 | 1 | 3 | -3 | -3 | 3 | -3 | 1 | -1 | -1 | 3 | -1 | -3 |
| 27 | -3 | -1 | -3 | -1 | -3 | 3 | 1 | -1 | 1 | 3 | -3 | -3 |
| 28 | -1 | 3 | -3 | 3 | -1 | 3 | 3 | -3 | 3 | 3 | -1 | -1 |
| 29 | 3 | -3 | -3 | -1 | -1 | -3 | -1 | 3 | -3 | 3 | 1 | -1 |

TABLE 2

| u | φ(0), ..., φ(23) | | | | | | | | | | | | | | | | | | | | | | | |
|---|---|---|---|---|---|---|---|---|---|---|---|---|---|---|---|---|---|---|---|---|---|---|---|---|
| 0 | -1 | 3 | 1 | -3 | 3 | -1 | 1 | 3 | -3 | 3 | 1 | 3 | -3 | 3 | 1 | 1 | -1 | 1 | 3 | -3 | 3 | -3 | -1 | -3 |
| 1 | -3 | 3 | -3 | -3 | -3 | 1 | -3 | -3 | 3 | -1 | 1 | 1 | 1 | 3 | 1 | -1 | 3 | -3 | -3 | 1 | 3 | 1 | 1 | -3 |
| 2 | 3 | -1 | 3 | 3 | 1 | 1 | -3 | 3 | 3 | 3 | 3 | 1 | -1 | 3 | -1 | 1 | 1 | -1 | -3 | -1 | -1 | 1 | 3 | 3 |
| 3 | -1 | -3 | 1 | 1 | 3 | -3 | 1 | 1 | -3 | -1 | -1 | 1 | 3 | 1 | 3 | 1 | -1 | 3 | 1 | 1 | -3 | -1 | -3 | -1 |
| 4 | -1 | -1 | -1 | -3 | -3 | -1 | 1 | 1 | 3 | 3 | -1 | 3 | -1 | 1 | -1 | -3 | 1 | -1 | -3 | -3 | 1 | -3 | -1 | -1 |
| 5 | -3 | 1 | 1 | 3 | -1 | 1 | 3 | 1 | -3 | 1 | -3 | 1 | 1 | -1 | -1 | 3 | -1 | -3 | 3 | -3 | -3 | -3 | 1 | 1 |
| 6 | 1 | 1 | -1 | -1 | 3 | -3 | -3 | 3 | -3 | 1 | -1 | -1 | 1 | -1 | 1 | 1 | -1 | -3 | -1 | 1 | -1 | 3 | -1 | -3 |
| 7 | -3 | 3 | 3 | -1 | -1 | -3 | -1 | 3 | 1 | 3 | 1 | 3 | 1 | 1 | -1 | 3 | 1 | -1 | 1 | 3 | -3 | -1 | -1 | 1 |
| 8 | -3 | 1 | 3 | -3 | 1 | -1 | -3 | 3 | -3 | 3 | -1 | -1 | -1 | -1 | 1 | -3 | -3 | -3 | 1 | -3 | -3 | -3 | 1 | -3 |
| 9 | 1 | 1 | -3 | 3 | 3 | -1 | -3 | -1 | 3 | -3 | 3 | 3 | 3 | -1 | 1 | 1 | -3 | 1 | -1 | 1 | 1 | -3 | 1 | 1 |
| 10 | -1 | 1 | -3 | -3 | 3 | -1 | 3 | -1 | -1 | -3 | -3 | -3 | -1 | -3 | -3 | 1 | -1 | 1 | 3 | 3 | -1 | 1 | -1 | 3 |
| 11 | 1 | 3 | 3 | -3 | -3 | 1 | 3 | 1 | -1 | -3 | -3 | -3 | 3 | 3 | -3 | 3 | 3 | -1 | -3 | 3 | -1 | 1 | -3 | 1 |
| 12 | 1 | 3 | 3 | 1 | 1 | 1 | -1 | -1 | 1 | -3 | 3 | -1 | 1 | 1 | -3 | 3 | 3 | -1 | -3 | 3 | -3 | -1 | -3 | -1 |
| 13 | 3 | -1 | -1 | -1 | -1 | -3 | -1 | 3 | 3 | 1 | -1 | 1 | 3 | 3 | 3 | -1 | 1 | 1 | -3 | 1 | 3 | -1 | -3 | 3 |
| 14 | -3 | -3 | 3 | 1 | 3 | 1 | -3 | 3 | 1 | 3 | 1 | 1 | 3 | 3 | -1 | -1 | -3 | 1 | -3 | -1 | 3 | 1 | 1 | 3 |
| 15 | -1 | -1 | 1 | -3 | 1 | 3 | -3 | 1 | -1 | -3 | -1 | 3 | 1 | 3 | 1 | -1 | -3 | -3 | -1 | -1 | -3 | -3 | -3 | -1 |
| 16 | -1 | -3 | 3 | -1 | -1 | -1 | -1 | 1 | 1 | -3 | 3 | 1 | 3 | 3 | 1 | -1 | 1 | -3 | 1 | -3 | 1 | 1 | -3 | -1 |
| 17 | 1 | 3 | -1 | 3 | 3 | -1 | -3 | 1 | -1 | -3 | 3 | 3 | 3 | -1 | 1 | 1 | 3 | -1 | -3 | -1 | 3 | -1 | -1 | -1 |
| 18 | 1 | 1 | 1 | 1 | 1 | -1 | 3 | -1 | -3 | 1 | 1 | 3 | -3 | 1 | -3 | -1 | 1 | 1 | -3 | -3 | 3 | 1 | 1 | -3 |
| 19 | 1 | 3 | 3 | 1 | -1 | -3 | 3 | -1 | 3 | 3 | 3 | -3 | 1 | -1 | 1 | -1 | -3 | -1 | 1 | 3 | -1 | 3 | -3 | -3 |
| 20 | -1 | -3 | 3 | -3 | -3 | -3 | -1 | -1 | -3 | -1 | -3 | 3 | 1 | 3 | -3 | -1 | 3 | -1 | 1 | -1 | 3 | -3 | 1 | -1 |
| 21 | -3 | -3 | 1 | 1 | -1 | 1 | -1 | 1 | -1 | 3 | 1 | -3 | -1 | 1 | -1 | 1 | -1 | -1 | 3 | 3 | -3 | -1 | 1 | -3 |
| 22 | -3 | -1 | -3 | 3 | 1 | -1 | -3 | -1 | -3 | -3 | 3 | -3 | 3 | -3 | -1 | 1 | 3 | 1 | -3 | 1 | 3 | 3 | -1 | -3 |
| 23 | -1 | -1 | -1 | -1 | 3 | 3 | 3 | 1 | 3 | 3 | -3 | 1 | 3 | -1 | 3 | -1 | 3 | 3 | -3 | 3 | 1 | -1 | 3 | 3 |
| 24 | 1 | -1 | 3 | 3 | -1 | -3 | 3 | -3 | -1 | -1 | 3 | -1 | 3 | -1 | -1 | 1 | 1 | 1 | 1 | -1 | -1 | -3 | -1 | 3 |
| 25 | 1 | -1 | 1 | -1 | 3 | -1 | 3 | 1 | 1 | -1 | -1 | -3 | 1 | 1 | -3 | 1 | 3 | -3 | 1 | 1 | -3 | -3 | -1 | -1 |
| 26 | -3 | -1 | 1 | 3 | 1 | 1 | -3 | -1 | -1 | -1 | 3 | 1 | -3 | 3 | -1 | 3 | 3 | 1 | -1 | 1 | 1 | 1 | 1 | 1 |
| 27 | -1 | -3 | 3 | 3 | 1 | 1 | 3 | -1 | -3 | -1 | -1 | -1 | 3 | 1 | -3 | -3 | -1 | 3 | -3 | -1 | -3 | -1 | -3 | -1 |
| 28 | -1 | -3 | -1 | -1 | 1 | -3 | -1 | -1 | 1 | -1 | -3 | 1 | 1 | -3 | 1 | -3 | -3 | 3 | 1 | 1 | -1 | 3 | -1 | -1 |
| 29 | 1 | 1 | -1 | -1 | -3 | -1 | 3 | -1 | 3 | -1 | 1 | 3 | 1 | -1 | 3 | 1 | 3 | -3 | -3 | 1 | -1 | -1 | 1 | 3 |

In the meantime, RS hopping is described as follows.

The sequence-group number u in slot $n_s$ may be defined by a group hopping pattern $f_{gh}(n_s)$ and a sequence-shift pattern $f_{ss}$ according to the following Equation 6.

$$u = (f_{gh}(n_s) + f_{ss}) \bmod 30 \quad \text{[Equation 6]}$$

where mod denotes the modulo operation.

There are 17 different hopping patterns and 30 different sequence-shift patterns. Sequence-group hopping can be enabled or disabled by means of the cell-specific parameter provided by higher layers.

PUCCH and PUSCH have the same hopping pattern but may have different sequence-shift patterns.

The group-hopping pattern $f_{gh}(n_s)$ is the same for PUSCH and PUCCH and given by the following Equation 7.

$$f_{gh}(n_s) = \begin{cases} 0 & \text{if group hopping is disabled} \\ \left(\sum_{i=0}^{7} c(8n_s + i) \cdot 2^i\right) \bmod 30 & \text{if group hopping is enabled} \end{cases}$$ [Equation 7]

where c(i) is the pseudo-random sequence. The pseudo-random sequence generator may be initialized with $$c_{init} = \left\lfloor \frac{N_{ID}^{cell}}{30} \right\rfloor$$

at the beginning of each radio frame.

The sequence-shift pattern $f_{ss}$ definition differs between PUCCH and PUSCH.

For PUCCH, the sequence-shift pattern $f_{ss}^{PSUCCH}$ is given by $f_{ss}^{PUCCH} = N_{ID}^{cell} \bmod 30$.

For PUSCH, the sequence-shift pattern $f_{ss}^{PUSCH}$ is given by $f_{ss}^{PUSCH} = (f_{ss}^{PUCCH} + \Delta_{ss}) \bmod 30$ where $\Delta_{ss} \in \{0, 1, \ldots 29\}$ is configured by higher layers. Hereinafter, sequence hopping is described.

Sequence hopping only applies for reference-signals of length $M_{sc}^{RS} \geq 6N_{sc}^{RB}$.

For reference-signals of length $M_{sc}^{RS} \geq 6N_{sc}^{RB}$, the base sequence number v within the base sequence group is given by v=0.

For reference-signals of length $M_{sc}^{RS} \geq 6N_{sc}^{RB}$, the base sequence number v within the base sequence group in slot $n_s$ is given by the following Equation 8.

$$v = \begin{cases} c(n_s) & \text{if group hopping is disabled and sequence hopping is enabled} \\ 0 & \text{otherwise} \end{cases}$$ [Equation 8]

where c(i) is the pseudo-random sequence, and the parameter provided by higher layers determines if sequence hopping is enabled or not. The pseudo-random sequence generator may be initialized with $$c_{init} = \left\lfloor \frac{N_{ID}^{cell}}{30} \right\rfloor \cdot 2^5 + f_{ss}^{PUSCH}$$

at the beginning of each radio frame.

The demodulation reference signal sequence $r_{PUSCH}(\cdot)$ for PUSCH is defined by $r_{PUSCH}(m \cdot M_{sc}^{RS} + n) = (m)r_{u,v}^{(\alpha)}(n)$, where m=0, 1, n=0, ..., $M_{sc}^{RS} - 1$, and $M_{sc}^{RS} = M_{sc}^{PUSCH}$.

The cyclic shift in a slot is given as $\alpha = 2\pi n_{cs}/12$ with $n_{cs} = (n_{DMRS}^{(1)} + n_{DMR}^{(2)} + n_{PRS}(n_s)) \bmod 12$. $n_{DMRS}^{(1)}$ is a value broadcasted, $n_{DMRS}^{(2)}$ is given by uplink scheduling assignment, $n_{PRS}(n_s)$ is a cell-specific cyclic shift value. $n_{PRS}(n_s)$ varies depending on a slot number $n_s$ and given by $n_{PRS}(n_s) = \sum_{i=0}^{7} c(8 \cdot n_s + i) \cdot 2^i$.

c(i) is the pseudo-random sequence and cell-specific. The pseudo-random sequence generator may be initialized with $$c_{init} = \left\lfloor \frac{N_{ID}^{cell}}{30} \right\rfloor \cdot 2^5 + f_{ss}^{PUSCH}$$

at the beginning of each radio frame.

Table 3 shows Cyclic Shift Field in downlink control information (DCI) format 0 and $n_{DMRS}^{(2)}$.

TABLE 3

| Cyclic Shift Field in DCI format 0 | $n_{DMRS}^{(2)}$ |
|---|---|
| 000 | 0 |
| 001 | 2 |
| 010 | 3 |
| 011 | 4 |
| 100 | 6 |
| 101 | 8 |
| 110 | 9 |
| 111 | 10 |

Uplink RS for PUSCH is mapped according to the following method.

The sequence is multiplied with the amplitude scaling factor $\beta_{PUSCH}$ and mapped in sequence starting with $r_{PUSCH}$ (0 to the set of physical resource blocks (PRBs) that is identical to that used for a corresponding PUSCH. The mapping to resource elements (k,l) with l=3 for normal cyclic prefix and l=2 for extended cyclic prefix, in the subframe is in increasing order of first k, then the slot number.

In summary, if length is $3N_{sc}^{RB}$ or more, a ZC sequence is used with cyclic extension and, if length is less than $3N_{sc}^{RB}$, a computer generated sequence is used. A cyclic shift is determined according to cell-specific cyclic shift, UE-specific cyclic shift, and hopping pattern.

Figure 13:
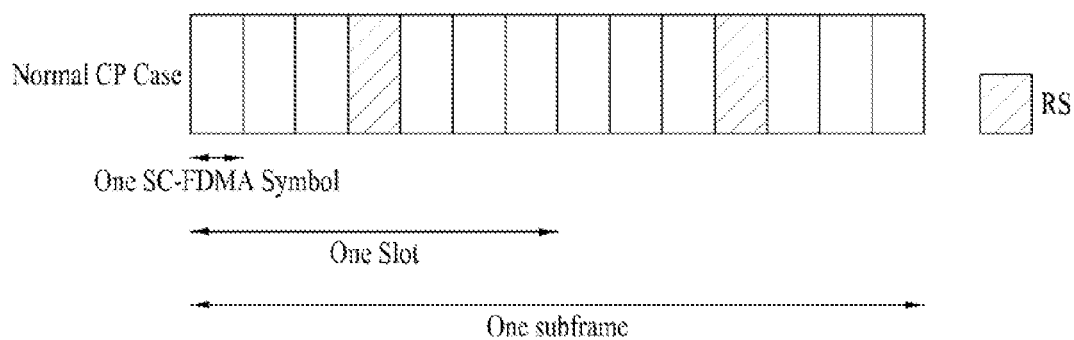
FIGS. 13 and 14 illustrate DMRS structures for a PUSCH.
Figure 14:
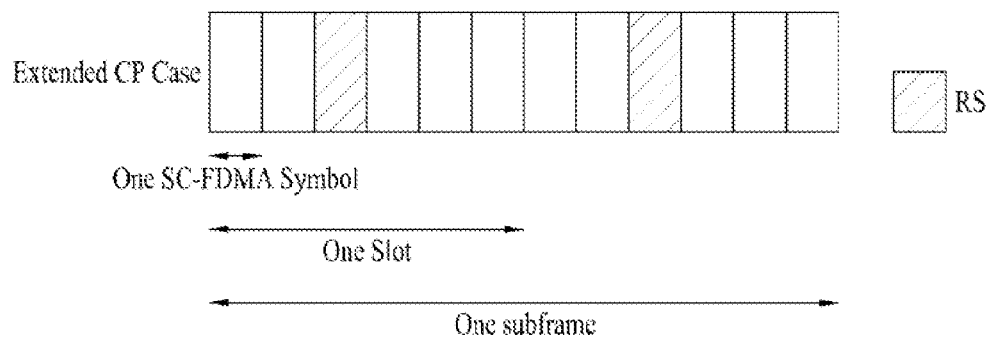

FIG. 13 shows a DeModulation Reference Signal (DMRS) structure for a PUSCH in case of a normal CP and FIG. 14 shows a DMRS structure for a PUSCH in case of an extended CP. A DMRS is transmitted through the fourth and eleventh SC-FDMA symbols in FIG. 13 and transmitted through the third and ninth SC-FDMA symbols in FIG. 14.

FIGS. 15 to 18 illustrate slot level structures of PUCCH formats. A PUCCH has the following formats in order to transmit control information.
  (1) PUCCH Format 1: used for On-Off Keying (OOK) modulation and a Scheduling Request (SR).
  (2) PUCCH Formats 1a and 1b: used for transmitting ACK/NACK information.
    1) PUCCH Format 1a: ACK/NACK information modulated by BPSK for one codeword.
    2) PUCCH Format 1b: ACK/NACK information modulated by QPSK for two codewords.
  (3) PUCCH Format 2: modulated by QPSK and used for Channel Quality Indicator (CQI) transmission.

(4) PUCCH Formats 2a and 2b: used for simultaneous transmission of a CQI and ACK/NACK information.

Table 4 lists modulation schemes and numbers of bits per subframe for PUCCH formats and Table 5 lists numbers of Reference Signals (RSs) per slot for PUCCH formats. Table 6 lists SC-FDMA symbol positions of RSs for PUCCH formats. In Table 4, PUCCH Formats 2a and 2b correspond to the case of a normal CP.

TABLE 4

| PUCCH Format | Modulation | Number of Bits per Subframe, $M_{bit}$ |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |

TABLE 5

| PUCCH Format | Normal CP | Extended CP |
|---|---|---|
| 1, 1a, 1b | 3 | 2 |
| 2 | 2 | 1 |
| 2a, 2b | 2 | N/A |

TABLE 6

| | SC-FDMA Symbol Position of RS | |
|---|---|---|
| PUCCH Format | Normal CP | Extended CP |
| 1, 1a, 1b | 2, 3, 4 | 2, 3 |
| 2, 2a, 2b | 1, 5 | 3 |

Figure 15:
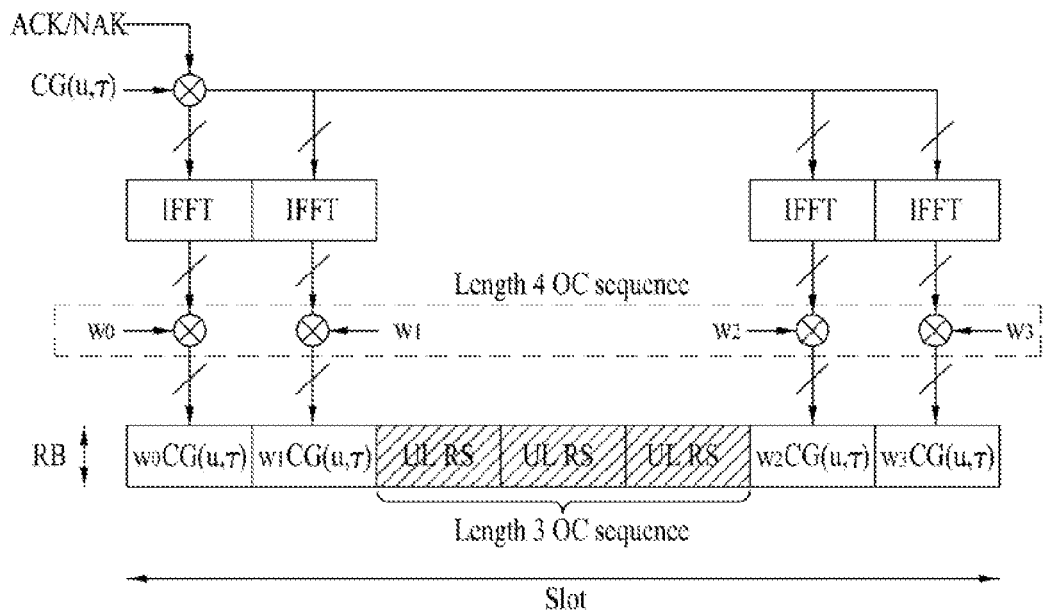
FIGS. 15 and 16 illustrate slot level structures of PUCCH formats 1a and 1b.
Figure 16:
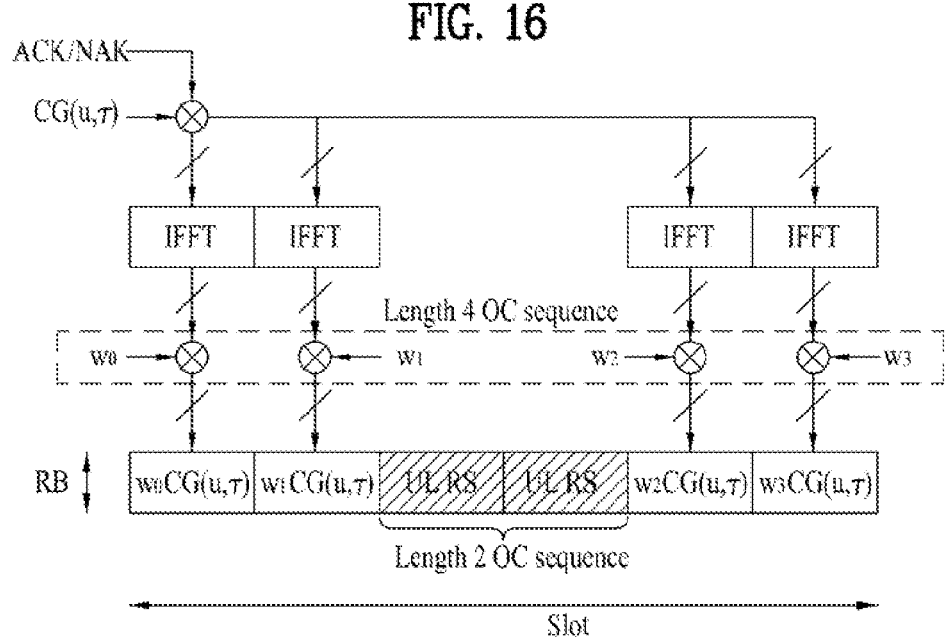

FIG. 15 illustrates PUCCH Formats 1a and 1b in case of normal cyclic prefix, and FIG. 16 illustrates PUCCH Formats 1a and 1b in case of extended cyclic prefix. The same UCI is repeated on a slot basis in a subframe in PUCCH Format 1a and 1b. A UE transmits ACK/NACK signals through different resources of different Cyclic Shifts (CSs) (a frequency-domain code) of a Computer-Generated Constant Amplitude Zero Auto Con-elation (CG-CAZAC) sequence and an Orthogonal Cover (OC) or Orthogonal Cover Code (OCC) (a time-domain spreading code). The OC includes, for example, a Walsh/DFT orthogonal code. If the number of CSs is 6 and the number of OCs is 3, a total of 18 UEs may be multiplexed in the same Physical Resource Block (PRB) based on a single antenna. An OC sequence w0, w1, w2 and w3 is applicable to a time domain (after FFT modulation) or to a frequency domain (before FFT modulation). PUCCH Format 1 for transmitting SR information is the same as PUCCH Formats 1a and 1b in slot-level structure and different from PUCCH Formats 1a and 1b in modulation scheme.

ACK/NACK resources comprised of a CS, an OC, and a PRB may be allocated to a UE by Radio Resource Control (RRC) signaling, for SR and Semi-Persistent Scheduling (SPS). ACK/NACK resources may be implicitly allocated to a UE using the lowest CCE index of a PDCCH corresponding to a PDSCH, for dynamic ACK/NACK or non-persistent scheduling.

Figure 17:
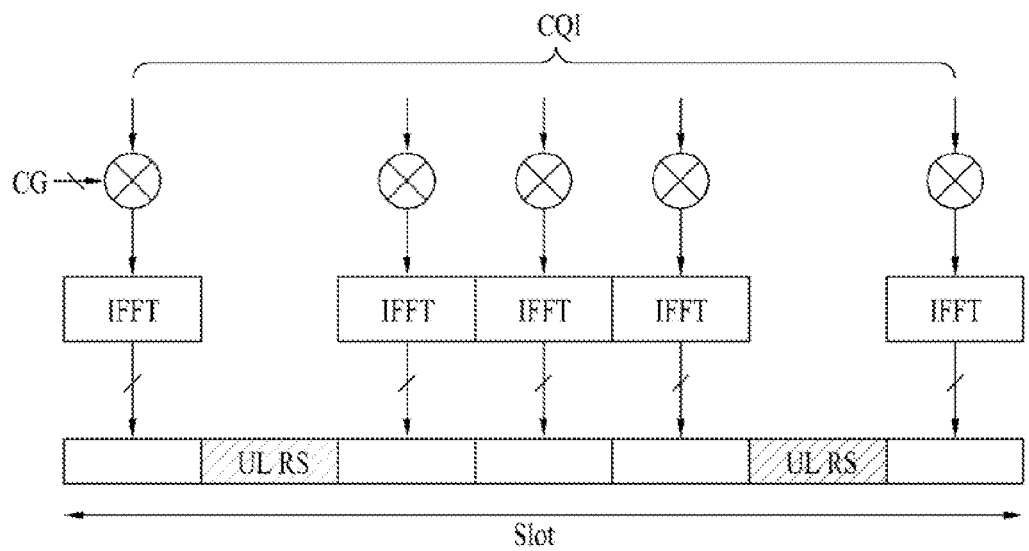
FIGS. 17 and 18 illustrate slot level structures of PUCCH formats 2/2a/2b.
Figure 18:
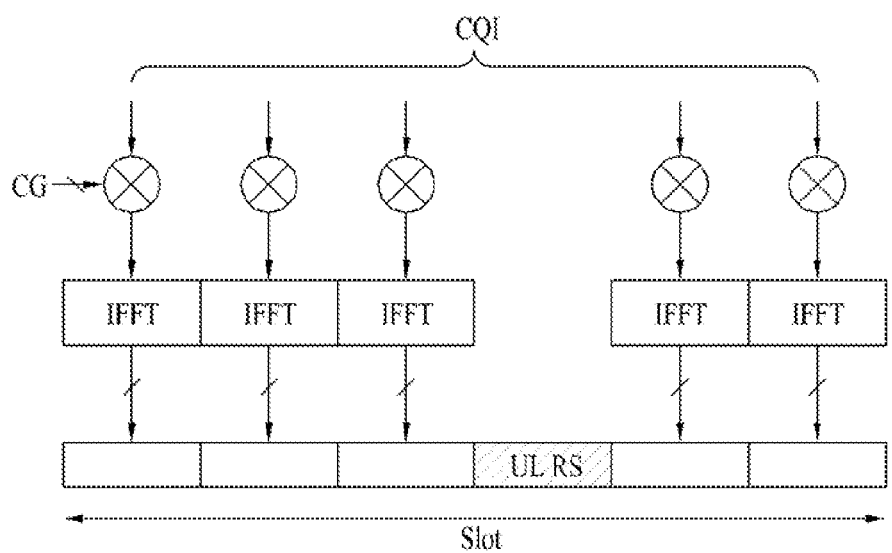

FIG. 17 illustrates PUCCH Format 2/2a/2b in case of a normal CP and FIG. 18 illustrates PUCCH Format 2/2a/2b in case of an extended CP. Referring to FIGS. 17 and 18, one subframe includes 10 QPSK symbols except for an RS symbol in case of a normal CP. Each QPSK symbol is spread with a CS in the frequency domain and then mapped to a corresponding SC-FDMA symbol. SC-FDMA symbol-level CS hopping may be applied to randomize inter-cell interference. An RS may be multiplexed by Code Division Multiplexing (CDM) using a CS. For example, if the number of available CSs is 12 or 6, 12 or 6 UEs may be multiplexed in the same PRB. That is, a plurality of UEs may be multiplexed using CS+OC+PRB and CS+PRB in PUCCH Formats 1/1a/1b and 2/2a/2b, respectively.

Length-4 and length-3 OCs for PUCCH Format 1/1a/1b are illustrated in Table 7 and Table 8 below.

TABLE 7

Length-4 orthogonal sequences for PUCCH formats 1/1a/1b

| Sequence index $n_{oc}(n_s)$ | Orthogonal sequences $[w(0) \ldots w(N_{SF}^{PUCCH} - 1)]$ |
|---|---|
| 0 | [+1 +1 +1 +1] |
| 1 | [+1 −1 +1 −1] |
| 2 | [+1 −1 −1 +1] |

TABLE 8

Length-3 orthogonal sequences for PUCCH formats 1/1a/1b

| Sequence index $n_{oc}(n_s)$ | Orthogonal sequences $[w(0) \ldots w(N_{SF}^{PUCCH} - 1)]$ |
|---|---|
| 0 | [1 1 1] |
| 1 | $[1\ e^{j2\pi/3}\ e^{j4\pi/3}]$ |
| 2 | $[1\ e^{j4\pi/3}\ e^{j2\pi/3}]$ |

OCs for RSs in PUCCH Format 1/1a/1b are given in Table 9 below.

TABLE 9

| | 1a and 1b | |
|---|---|---|
| Sequence index $n_{oc}(n_s)$ | Normal cyclic prefix | Extended cyclic prefix |
| 0 | [1 1 1] | [1 1] |
| 1 | $[1\ e^{j2\pi/3}\ e^{j4\pi/3}]$ | [1 −1] |
| 2 | $[1\ e^{j4\pi/3}\ e^{j2\pi/3}]$ | N/A |

FIG. 19 illustrates ACK/NACK channelization for PUCCH Formats 1a and 1b. In FIG. 19, $\Delta_{shift}^{PUCCH}=2$.

Figure 20:
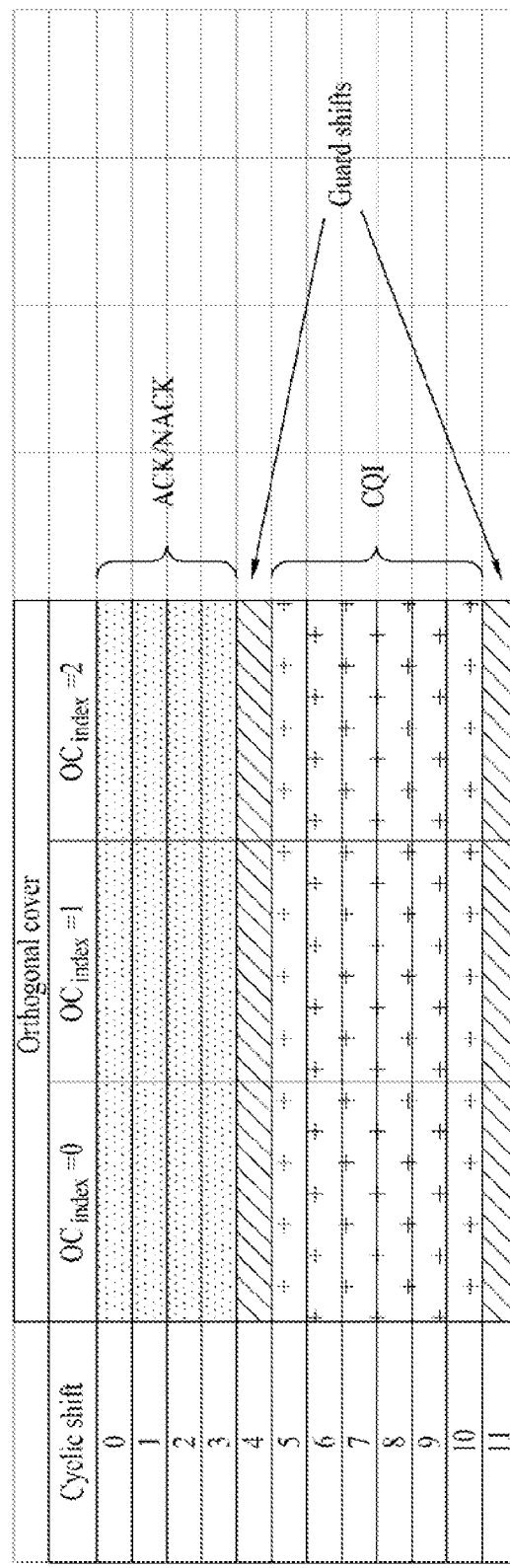
FIG. 20 illustrates channelization for a hybrid structure of PUCCH Format 1/1a/1b and PUCCH Format 2/2a/2b in the same PRB.

FIG. 20 illustrates channelization for a hybrid structure of PUCCH Format 1/1a/1b and PUCCH Format 2/2a/2b in the same PRB.

CS hopping and OC re-mapping may be applied as follows.

(1) Symbol-based cell-specific CS hopping for randomization of inter-cell interference
(2) Slot-level CS/OC re-mapping
  1) For randomization of inter-cell interference
  2) Slot-based approach for mapping between an ACK/NACK channel and a resources Meanwhile, a resource $n_r$ for PUCCH Format 1/1a/1b includes the following combinations.

(1) CS (identical to DFT OC in symbol level) ($n_{cs}$)
(2) OC (OC in slot level) ($n_{oc}$)
(3) Frequency RB ($n_{rb}$)

Assuming that indexes of a CS, an OC, and an RB are denoted by $n_{cs}$, $n_{oc}$, and $n_{rb}$, respectively, a representative index $n_r$ includes $n_{cs}$, $n_{oc}$, and $n_{rb}$ where $n_r$ satisfies $n_r=(n_{cs}, n_{oc}, n_{rb})$.

A combination of an ACK/NACK and a CQI, PMI and RI, and a combination of an ACK/NACK and a CQI may be delivered through PUCCH Format 2/2a/2b. Reed Muller (RM) channel coding may be applied.

For example, channel coding for an uplink CQI in the LTE system is described as follows. A bit stream $a_0, a_1, a_2, a_3, \ldots, a_{A-1}$ is channel coded using a (20, A) RM code. Table 10 lists base sequences for the (20, A) code. $a_0$ and $a_{A-1}$ denote the Most Significant Bit (MSB) and Least Significant Bit (LSB), respectively. In case of an extended CP, up to 11 bits can be transmitted except for simultaneous transmission of a CQI and an ACK/NACK. A bit stream may be encoded to 20 bits using an RM code and then modulated by QPSK. Before QPSK modulation, the coded bits may be scrambled.

TABLE 10

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0  | 1 | 1 | 0 | 0 | 0 | 0 | 0 | 0 | 0 | 0 | 1 | 1 | 0 |
| 1  | 1 | 1 | 1 | 0 | 0 | 0 | 0 | 0 | 0 | 1 | 1 | 1 | 0 |
| 2  | 1 | 0 | 0 | 1 | 0 | 0 | 1 | 0 | 1 | 1 | 1 | 1 | 1 |
| 3  | 1 | 0 | 1 | 1 | 0 | 0 | 0 | 0 | 1 | 0 | 1 | 1 | 1 |
| 4  | 1 | 1 | 1 | 1 | 0 | 0 | 0 | 1 | 0 | 0 | 1 | 1 | 1 |
| 5  | 1 | 1 | 0 | 0 | 1 | 0 | 1 | 1 | 1 | 0 | 1 | 1 | 1 |
| 6  | 1 | 0 | 1 | 0 | 1 | 0 | 1 | 0 | 1 | 1 | 1 | 1 | 1 |
| 7  | 1 | 0 | 0 | 1 | 1 | 0 | 0 | 1 | 1 | 0 | 1 | 1 | 1 |
| 8  | 1 | 1 | 0 | 1 | 1 | 0 | 0 | 1 | 0 | 1 | 1 | 1 | 1 |
| 9  | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 1 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 1 | 0 | 0 | 1 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

Channel-coded bits $b_0, b_1, b_2, b_3, \ldots, b_{B-1}$ may be generated by Equation 9.

$$b_i = \sum_{n=0}^{A-1} (o_n \cdot M_{i,n}) \bmod 2 \qquad \text{[Equation 9]}$$

where i=0, 1, 2, . . . , B−1.

Table 11 illustrates a UCI field for feedback of a wideband report (a single antenna port, transmit diversity, or open loop spatial multiplexing PDSCH) CQI.

TABLE 11

| Field | Bandwidth |
|---|---|
| Wideband CQI | 4 |

Table 12 illustrates a UCI field for feedback of a wideband CQI and a PMI. This field reports transmission of a closed loop spatial multiplexing PDSCH.

TABLE 12

| | Bandwidth | | | |
|---|---|---|---|---|
| | 2 antenna ports | | 4 antenna ports | |
| Field | Rank = 1 | Rank = 2 | Rank = 1 | Rank > 1 |
| wideband CQI | 4 | 4 | 4 | 4 |
| Spatial differential CQI | 0 | 3 | 0 | 3 |
| PMI | 2 | 1 | 4 | 4 |

Table 13 illustrates a UCI field for RI feedback for a wideband report.

TABLE 13

| | Bit widths | | |
|---|---|---|---|
| | | 4 antenna ports | |
| Field | 2 antenna ports | Up to 2 layers | Up to 4 layers |
| RI | 1 | 1 | 2 |

Figure 21:
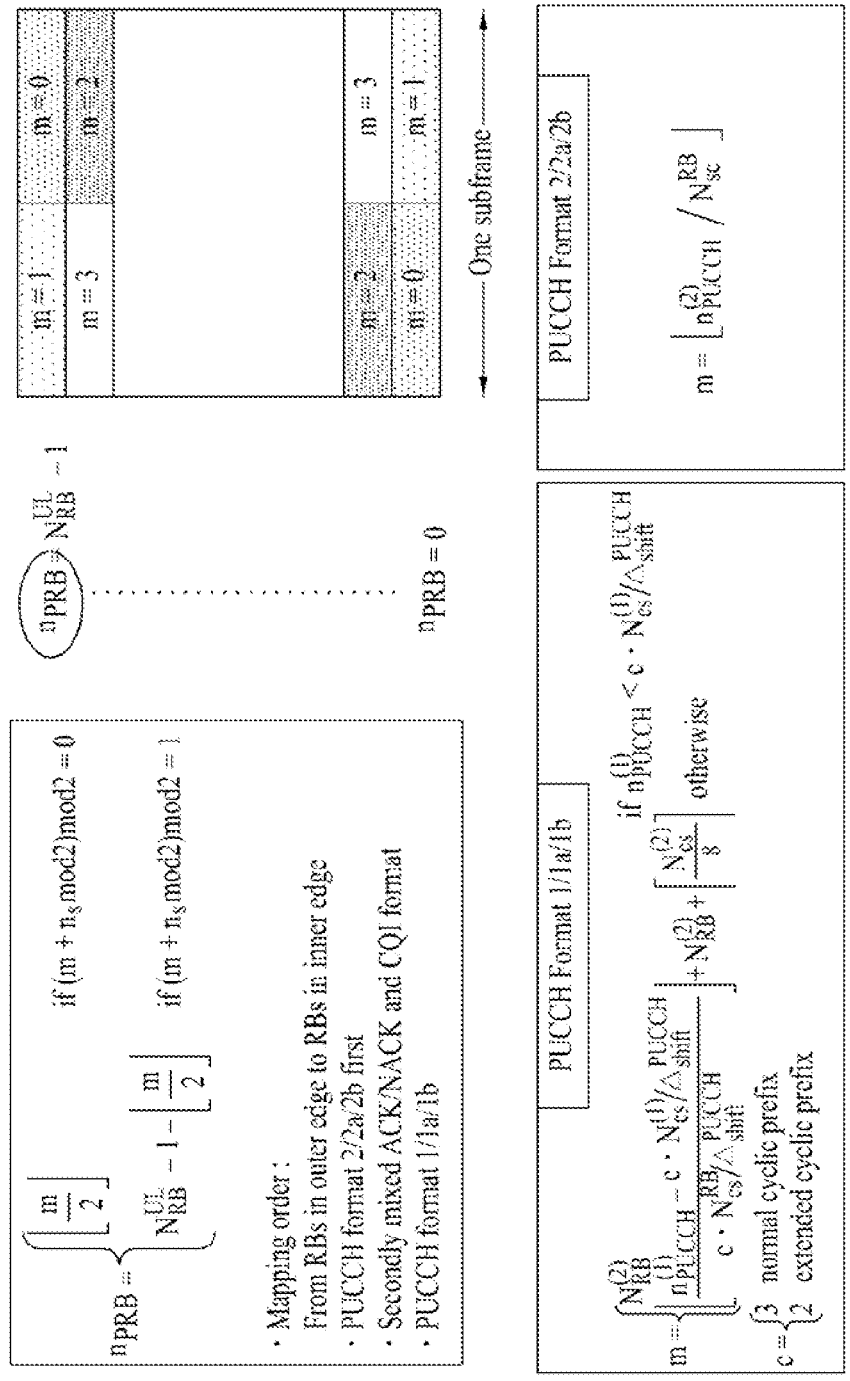
FIG. 21 illustrates PRB allocation for PUCCH transmission.

FIG. 21 illustrates PRB allocation. Referring to FIG. 21, a PRB may be used to carry a PUCCH in slot $n_s$.

A multi-carrier system or Carrier Aggregation (CA) system is a system using a plurality of carriers each having a narrower bandwidth than a target bandwidth in order to support a broadband. When a plurality of carriers each having a narrower bandwidth than a target bandwidth is aggregated, the bandwidth of the aggregated carriers may be limited to a bandwidth used in a legacy system in order to ensure backward compatibility with the legacy system. For example, the legacy LTE system supports bandwidths of 1.4, 3, 5, 10, 15, and 20 MHz and an LTE-A system evolved from an LTE system may support a broader bandwidth than 20 MHz using only the bandwidths supported by the LTE system. Alternatively, CA may be supported by defining a new bandwidth irrespective of the bandwidths used in the legacy system. The term multi-carrier is interchangeably used with CA and bandwidth aggregation. In addition, CA includes both contiguous CA and non-contiguous CA.

Figure 22:
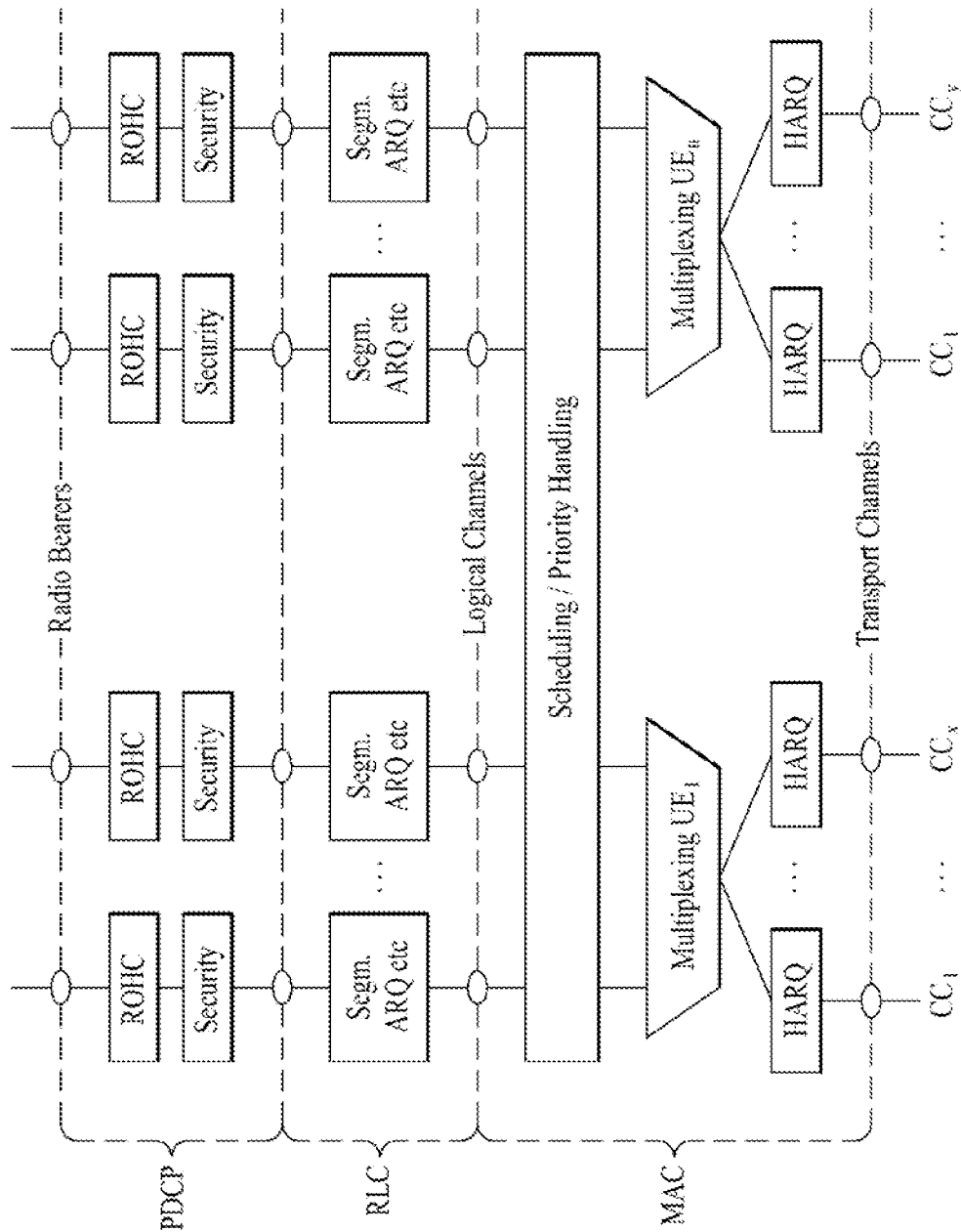
FIG. 22 illustrates a concept of downlink component carrier in a BS.
Figure 23:
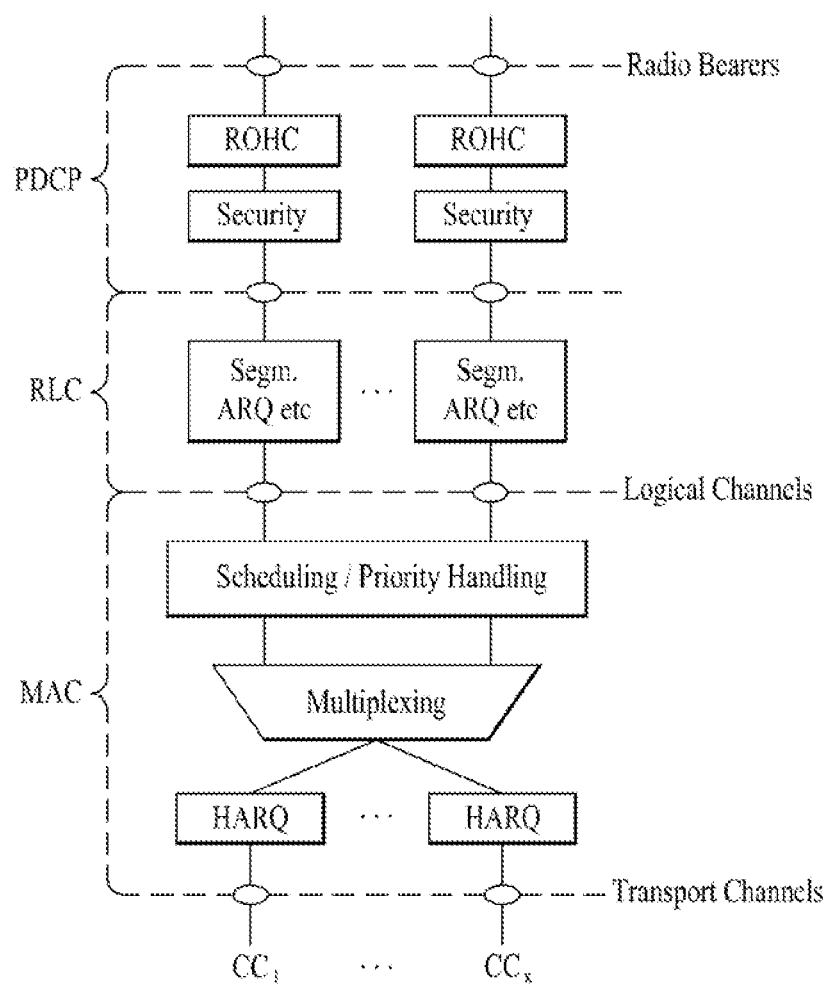
FIG. 23 illustrates a concept of uplink component carrier management in a UE.

FIG. 22 illustrates a concept of downlink (DL) CC management in a BS and FIG. 23 illustrates a concept of uplink (UL) CC management in a UE. For convenience of description, a higher layer will be simply referred to as a MAC in FIGS. 22 and 23.

Figure 24:
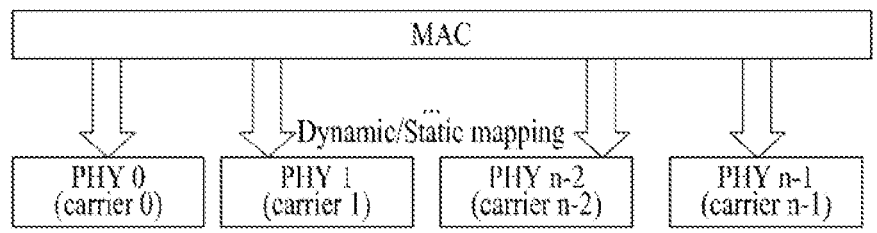
FIG. 24 illustrates a concept of multi-carrier management of one MAC in a BS.
Figure 25:
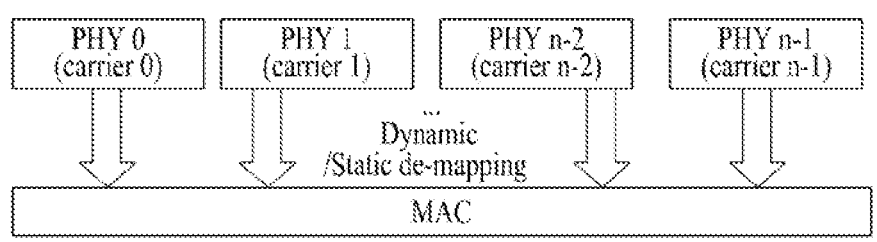
FIG. 25 illustrates multi-carrier management of one MAC in a UE.

FIG. 24 illustrates a concept of multi-carrier management of one MAC in a BS and FIG. 25 illustrates multi-carrier management of one MAC in a UE.

Referring to FIGS. 24 and 25, one MAC manages and operates one or more frequency carriers to perform transmission and reception. Since frequency carriers managed by a single MAC do not need to be contiguous, this multi-carrier management scheme is more flexible in terms of resource management. In FIGS. 24 and 25, one Physical layer (PHY) refers to one CC, for convenience of description. Here, one PHY does not always mean an independent Radio Frequency (RF) device. Although one independent RF device generally means one PHY, it may include a plurality of PHYs.

Figure 26:
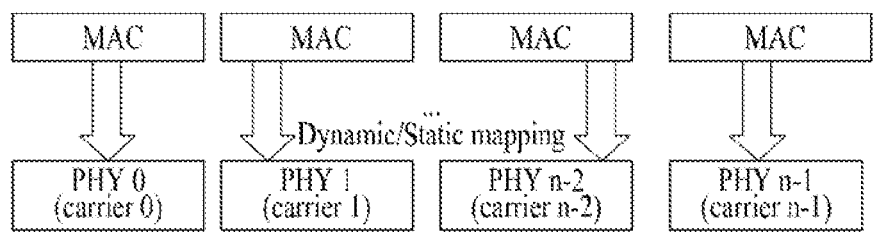
FIG. 26 illustrates a concept of multi-carrier management of a plurality of MACs in a BS.
Figure 27:
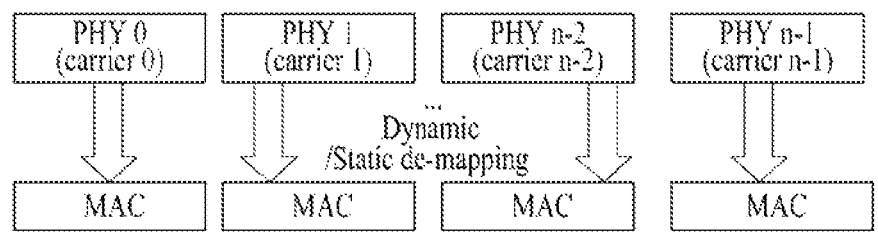
FIG. 27 illustrates a concept of multi-carrier management of a plurality of MACs in a UE.
Figure 28:
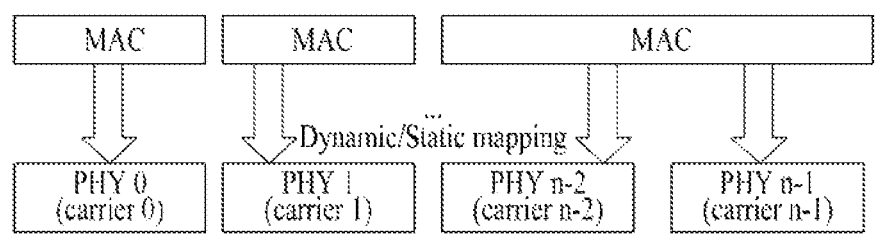
FIG. 28 illustrates another concept of multi-carrier management of a plurality of MACs in a BS.
Figure 29:
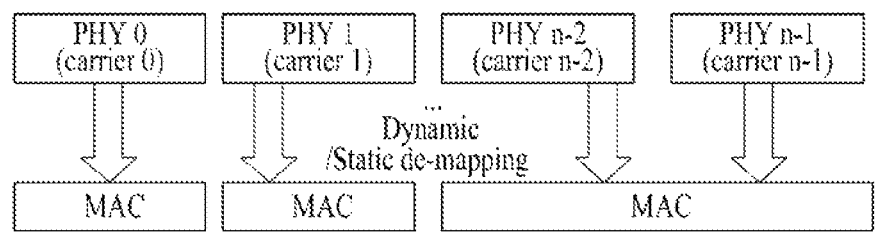
FIG. 29 illustrates another concept of multi-carrier management of a plurality of MACs in a UE.

FIG. 26 illustrates a concept of multi-carrier management of a plurality of MACs in a BS, FIG. 27 illustrates a concept of multi-carrier management of a plurality of MACs in a UE, FIG. 28 illustrates another concept of multi-carrier management of a plurality of MACs in a BS, and FIG. 29 illustrates another concept of multi-carrier management of a plurality of MACs in a UE.

In addition to the structures illustrated in FIGS. 24 and 25, a plurality of MACs rather than one MAC may control a plurality of carriers, as illustrated in FIGS. 26 to 29.

Each MAC may control one carrier in a one-to-one correspondence as illustrated in FIGS. 26 and 27, whereas each MAC may control one carrier in a one-to-one correspondence, for some carriers and one MAC may control one or more of the remaining carriers as illustrated in FIGS. 28 and 29.

The above-described system uses a plurality of carriers from one to N carriers and the carriers may be contiguous or non-contiguous irrespective of downlink or uplink. A TDD system is configured to use N carriers such that downlink transmission and uplink transmission are performed on each carrier, whereas an FDD system is configured to use a plurality of carriers for each of downlink transmission and uplink transmission. The FDD system may support asymmetrical CA in which different numbers of carriers and/or carriers having different bandwidths are aggregated for downlink and uplink.

When the same number of CCs is aggregated for downlink and uplink, all CCs can be configured to be compatible with the legacy system. However, CCs without compatibility are not excluded from the present invention.

The following description will be given under the assumption that, when a PDCCH is transmitted through downlink component carrier #0, a PDSCH corresponding to the PDCCH is transmitted through the downlink component carrier #0. However, it is apparent that the corresponding PDSCH can be transmitted through another downlink component carrier by applying cross-carrier scheduling. The term "component carrier" may be replaced with other equivalent terms (e.g. cell).

Figure 30:
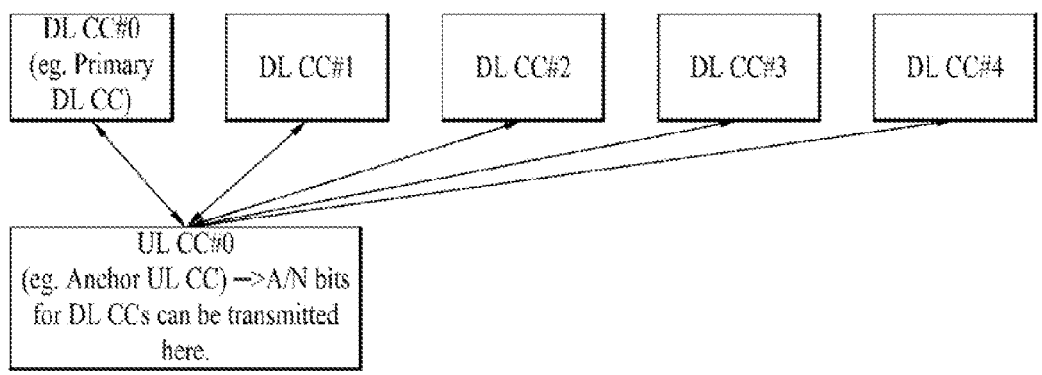
FIG. 30 illustrates asymmetric carrier aggregation in which a plurality of downlink component carriers is linked with one uplink carrier component.

FIG. 30 illustrates a scenario of transmitting UCI in a wireless communication system in which CA is supported. For convenience of description, it is assumed in this example that UCI is ACK/NACK (A/N). However, UCI may include control information such as Channel State Information (CSI) (e.g. CQI, PMI, and RI) and scheduling request information (e.g. SR), without restriction.

FIG. 30 illustrates exemplary asymmetrical CA in which five DL CCs are linked to a single UL CC. This asymmetrical CA may be set from the perspective of transmitting UCI. That is, DL CC-UL CC linkage for UCI may be set to be different from DL CC-UL CC linkage for data. For the convenience, if it is assumed that each DL CC can carry up to two codewords and the number of ACKs/NACKs for each CC depends on the maximum number of codewords set per CC (for example, if a BS sets up to two codewords for a specific CC, even though a specific PDCCH uses only one codeword on the CC, ACKs/NACKs for the CC are set to 2 which is the same as the maximum number of codewords), at least two UL ACK/NACK bits are needed for each DL CC. In this case, to transmit ACKs/NACKs for data received on five DL CCs on a single UL CC, at least 10 ACK/NACK bits are needed. If a Discontinuous Transmission (DTX) state is also to be indicated for each DL CC, at least 12 bits ($=5^6=3125=11.61$ bits) are required for ACK/NACK transmission. Since up to two ACK/NACK bits are available in the conventional PUCCH Formats 1a and 1b, this structure cannot transmit increased ACK/NACK information. While CA is given as an example of a cause to increase the amount of UCI, this situation may also occur due to an increase in the number of antennas and the existence of a backhaul subframe in a TDD system and a relay system. Similarly to ACK/NACK transmission, the amount of control information to be transmitted is also increased when control information related to a plurality of DL CCs is transmitted on a single UL CC. For example, transmission of CQI/PMI/RI information related to a plurality of DL CCs may increase UCI payload.

A DL primary CC may be defined as a DL CC linked with a UL primary CC. Here, linkage includes both implicit linkage and explicit linkage. In LTE, one DL CC and one UL CC are uniquely paired. For example, a DL CC linked with a UL primary CC may be referred to as a DL primary CC, according to LTE pairing. This may be regarded as implicit linkage. Explicit linkage means that a network configures linkage in advance and may be RRC-signaled. In explicit linkage, a DL CC paired with a UL primary CC may be referred to as a DL primary CC. The UL primary (or anchor) CC may be a UL CC on which UCI is transmitted through a PUCCH or a PUSCH. The DL primary CC may be configured through higher layer signaling. Otherwise, the DL primary CC may be a DL CC initially accessed by a UE. DL CCs other than the DL primary CC may be referred to as DL secondary CCs. Similarly, UL CCs other than the UL primary CC may be referred to UL secondary CCs.

In LTE-A, the concept of a cell is used to manage radio resources. A cell is defined as a combination of downlink resources and uplink resources and the uplink resources are not indispensable elements. Therefore, a cell may be composed of downlink resources only or both downlink resources and uplink resources. If CA is supported, the linkage between the carrier frequencies (or DL CCs) of downlink resources and the carrier frequencies (or UL CCs) of uplink resources may be indicated by system information. A cell operating in primary frequency resources (or a PCC) may be referred to as a primary cell (PCell) and a cell operating in secondary frequency resources (or an SCC) may be referred to as a secondary cell (SCell). The PCell is used for a UE to establish an initial connection or re-establish a connection. The PCell may refer to a cell indicated during handover. The SCell may be configured after an RRC connection is established and may be used to provide additional radio resources. The PCell and the SCell may collectively be referred to as a serving cell. Accordingly, a single serving cell composed of a PCell only is present for a UE in an RRC CONNECTED state, for which CA is not configured or which does not support CA. On the other hand, one or more serving cells are present, including a PCell and all SCells, for a UE in RRC CONNECTED state, for which CA is configured. For CA, a network may configure one or more SCells in addition to an initially configured PCell, for a UE supporting CA during a connection setup procedure after an initial security activation procedure is initiated.

DL-UL pairing may correspond only to FDD. Since TDD uses the same frequency, DL-UL pairing need not be additionally defined with respect to TDD. DL-UL linkage may be determined from UL linkage through UL E-UTRA Absolute Radio Frequency Channel Number (EARFCN) information of SIB2. For example, DL-UL linkage may be acquired through SIB2 decoding during initial access and otherwise, may be acquired through RRC signaling. Accordingly, only SIB2 linkage is present and other DL-UL pairing need not be explicitly defined. As an example, in the 5DL:1UL structure of FIG. 30, DL CC#0 and UL CC#0 have an SIB2 linkage relationship and the remaining DL CCs may have an SIB linkage relationship with other UL CCs which are not configured for a corresponding UE.

In order to support a scenario such as that of FIG. 30, a new scheme is necessary. Hereinafter, a PUCCH format for feedback of UCI (e.g. multiple A/N bits) in a communication system supporting CA is referred to as a CA PUCCH format (or PUCCH Format 3). For example, PUCCH Format 3 is used to transmit A/N information (possibly, including DTX state) corresponding a PDSCH (or PDCCH) received from multiple DL serving cells.

FIGS. 31 to 36 illustrate the structure of PUCCH Format 3 and a signal processing operation for PUCCH Format 3.

Figure 31:
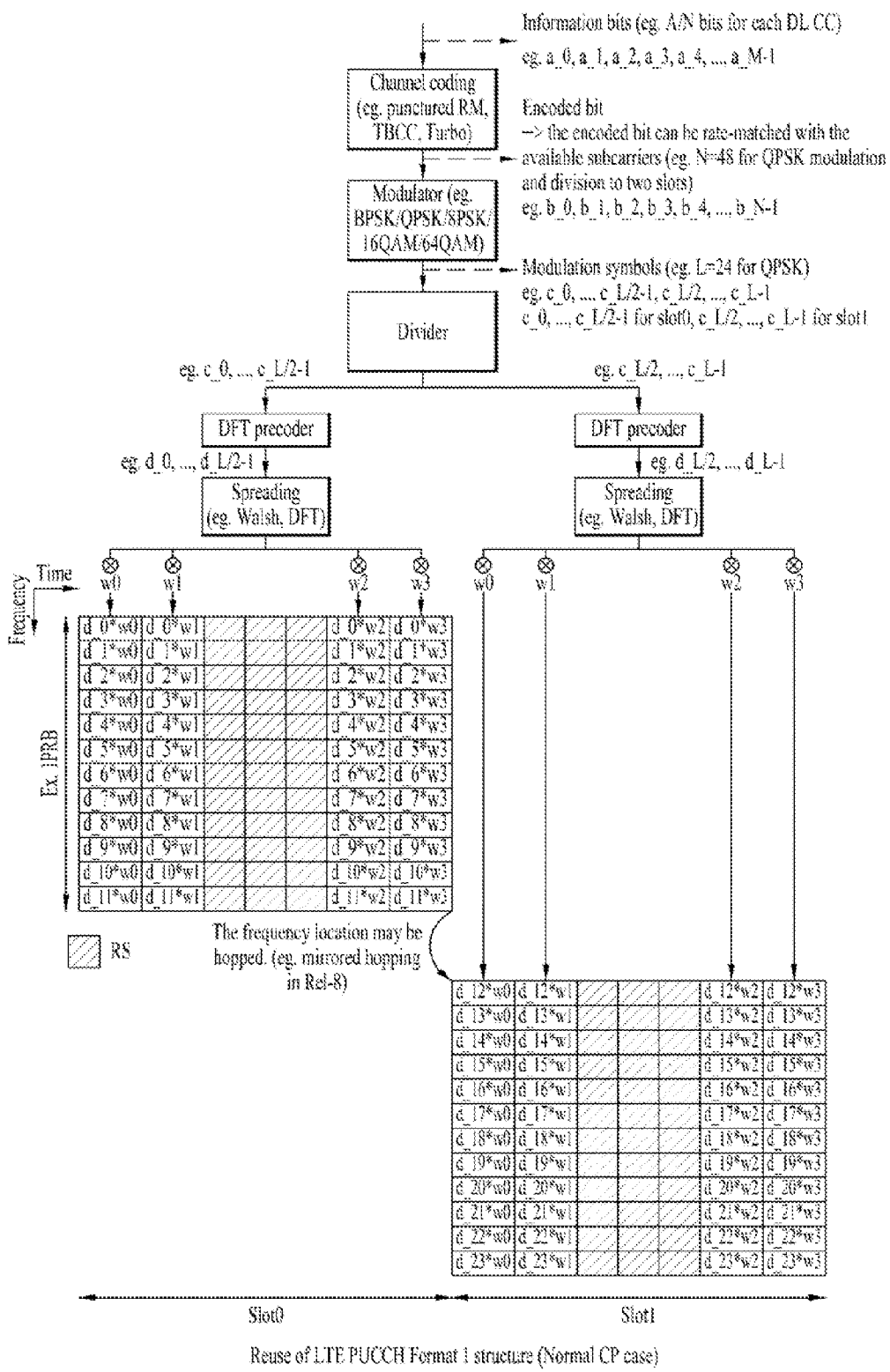
FIGS. 31 to 36 illustrate PUCCH Format 3 structures and signal processing operations.

FIG. 31 shows the case where PUCCH Format 3 is applied to the structure of PUCCH Format 1 (normal CP). Referring to FIG. 31, a channel coding block channel-encodes transmission bits $a\_0, a\_1, \ldots, a\_M-1$ (e.g. multiple ACK/NACK bits) and generates coded bits (or a codeword), $b\_0, b\_1, \ldots, b\_N-1$. M is the size of transmission bits and N is the size of coded bits. The transmission bits include UCI, for example, multiple ACKs/NACKs for a plurality of data (or PDSCHs) received on a plurality of DL CCs. Herein, the transmission bits $a\_0, a\_1, \ldots, a\_M-1$ are jointly encoded irrespective of the type/number/size of UCI constituting the transmission bits. For example, if the transmission bits include multiple ACKs/NACKs for a plurality of DL CCs, channel coding is performed on the entire bit information, rather than per DL CC or per ACK/NACK bit. A single codeword is generated by channel coding. Channel coding includes, but is not limited to, repetition, simplex coding, RM coding, punctured RM coding, Tail-Biting Convolutional Coding (TBCC), Low-Density Parity-Check (LDPC) coding, or turbo coding. Although not shown, the coded bits may be rate-matched, in consideration of modulation order and the amount of resources. The rate matching function may be partially incorporated into the channel coding block or implemented in a separate functional block. For example, the channel coding block may obtain a single codeword by performing (32, 0) RM coding with respect to a plurality of control information and may perform cyclic buffer rate-matching.

A modulator generates modulation symbols $c\_0, c\_1, \ldots, c\_L-1$ by modulating the coded bits $b\_0, b\_1, \ldots, b\_M-1$. L is the size of modulation symbols. A modulation scheme is performed by changing the amplitude and phase of a transmission signal. The modulation scheme may be n-Phase Shift Keying (n-PSK) or n-Quadrature Amplitude Modulation (QAM) (where n is an integer of 2 or more). Specifically, the modulation scheme includes Binary PSB (BPSK), Quadrature (QPSK), 8-PSK, QAM, 16-QAM, or 64-QAM.

A divider divides the modulation symbols $c\_0, c\_1, \ldots, c\_L-1$ into slots. The order/pattern/scheme of dividing modulation symbols into slots is not limited to a specific one. For instance, the divider may divide the modulation symbols into slots, sequentially starting from the first modulation symbol (localized scheme). In this case, the modulation symbols $c\_0, c\_1, \ldots, c\_L/2-1$ may be allocated to slot 0 and the modulation symbols $c\_L/2, c\_L/2+1, \ldots, c\_L-1$ may be allocated to slot 1. When the modulation symbols are divided into the slots, the modulation symbols may be interleaved (or permuted). For example, even-numbered modulation symbols may be allocated to slot 0 and odd-numbered modulation symbols may be allocated to slot 1. The division process and the modulation process are interchangeable in order.

A DFT precoder performs DFT precoding (e.g. 12-point DFT) with respect to the modulation symbols divided into the slots in order to generate a single carrier waveform. Referring to FIG. 31, the modulation symbols $c\_0, c\_1, \ldots, c\_L/2-1$ allocated to slot 0 are DFT-precoded to DFT symbols $d\_0, d\_1, \ldots d\_L/2-1$ and the modulation symbols $c\_L/2, c\_L/2+1, \ldots, c\_L-1$ allocated to slot 1 are DFT-precoded to DFT symbols $d\_L/2, d\_L/2+1, \ldots, d\_L-1$. DFT precoding may be replaced with another linear operation (e.g. Walsh precoding).

A spreading block spreads the DFT-precoded signals at an SC-FDMA symbol level (in the time domain) SC-FDMA symbol-level time-domain spreading is performed using a spreading code (sequence). The spreading code includes a quasi-orthogonal code and an orthogonal code. The quasi-orthogonal code includes, but is not limited to, a Pseudo Noise (PN) code. The orthogonal code includes, but is not limited to, a Walsh code and a DFT code. While the orthogonal code is described as a typical example of the spreading code for convenience of description, the orthogonal code may be replaced with the quasi-orthogonal code. The maximum value of a spreading code size or a Spreading Factor (SF) is limited by the number of SC-FDMA symbols used for transmitting control information. For example, if four SC-FDMA symbols are used for transmission of control information in one slot, an orthogonal code of length 4, w0, w1, w2, w3 can be used in each slot. The SF means the degree of spreading of control information and may be related to the multiplexing order or antenna multiplexing order of a UE. The SF may be changed to 1, 2, 3, 4, . . . depending on system requirements. The SF may be pre-defined between a BS and a UE or the BS may indicate an SF to the UE by DCI or RRC signaling. For example, if one of SC-FDMA symbols for control information is punctured to transmit an SRS, a spreading code with a decreased SF (e.g. SF=3 instead of SF=4) may be applied to the control information in a corresponding slot.

A signal generated from the above operation is mapped to subcarriers in a PRB and converted into a time-domain signal by IFFT. A CP is added to the time-domain signal and the generated SC-FDMA symbols are transmitted through an RF end.

On the assumption that ACKs/NACKs are transmitted for five DL CCs, each operation will be described in more detail. If each DL CC can transmit two PDSCHs, ACK/NACK bits for the PDSCHs may be 12 bits, including a DTX state. Under the assumption of QPSK and time spreading of SF=4, the size of a coding block (after rate matching) may be 48 bits. The coded bits are modulated to 24 QPSK symbols and the QPSK symbols are divided into two slots each including 12 QPSK symbols. The 12 QPSK symbols in each slot are converted into 12 DFT symbols by 12-point DFT. The 12 DFT symbols in each slot are spread to four SC-FDMA symbols using a spreading code of SF=4 in the time domain and then mapped. Since 12 bits are transmitted on [2 bits×12 subcarriers×8 SC-FDMA symbols], the coding rate is 0.0625 (=12/192). If SF=4, a maximum of four UEs may be multiplexed per PRB.

The signal processing operation described with reference to FIG. 31 is only exemplary and the signal mapped to the PRB in FIG. 31 may be obtained using various equivalent signal processing operations. The signal processing operations equivalent to FIG. 31 will be described with reference to FIGS. 32 to 36.

Figure 32:
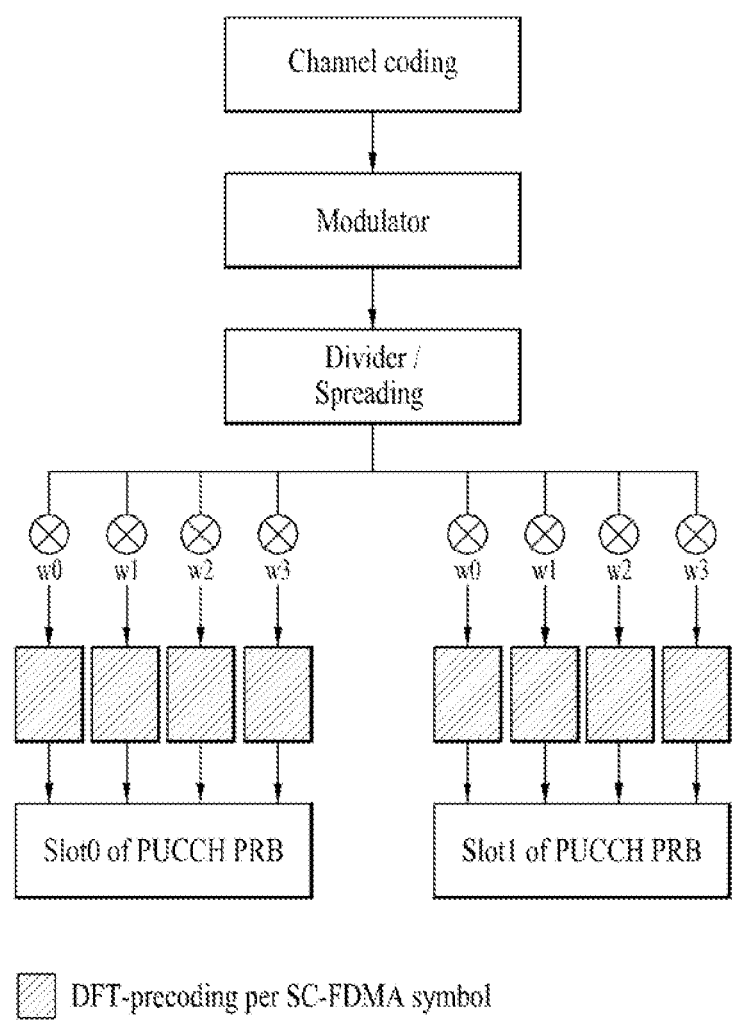

FIG. 32 is different from FIG. 31 in the order of the DFT precoder and the spreading block. In FIG. 31, since the function of the spreading block is equal to multiplication of a DFT symbol sequence output from the DFT precoder by a specific constant at an SC-FDMA symbol level, the value of the signal mapped to the SC-FDMA symbols is constant even when the order of the DFT precoder and the spreading block is changed. Accordingly, the signal processing operation for PUCCH Format 3 may be performed in order of channel coding, modulation, division, spreading and DFT precoding. In this case, the division process and the spreading process may be performed by one functional block. For example, the modulation symbols may be spread at the SC-FDMA symbol level while being alternately divided to slots. As another example, the modulation symbols are copied to suit the size of the spreading code when the modulation symbols are divided to slots, and the modulation symbols and the elements of the spreading code may be multiplied in one-to-one correspondence. Accordingly, the modulation symbol sequence generated in each slot is spread to a plurality of SC-FDMA symbols at the SC-FDMA symbol level. Thereafter, the complex symbol sequence corresponding to each SC-FDMA symbol is DFT-precoded in SC-FDMA symbol units.

Figure 33:
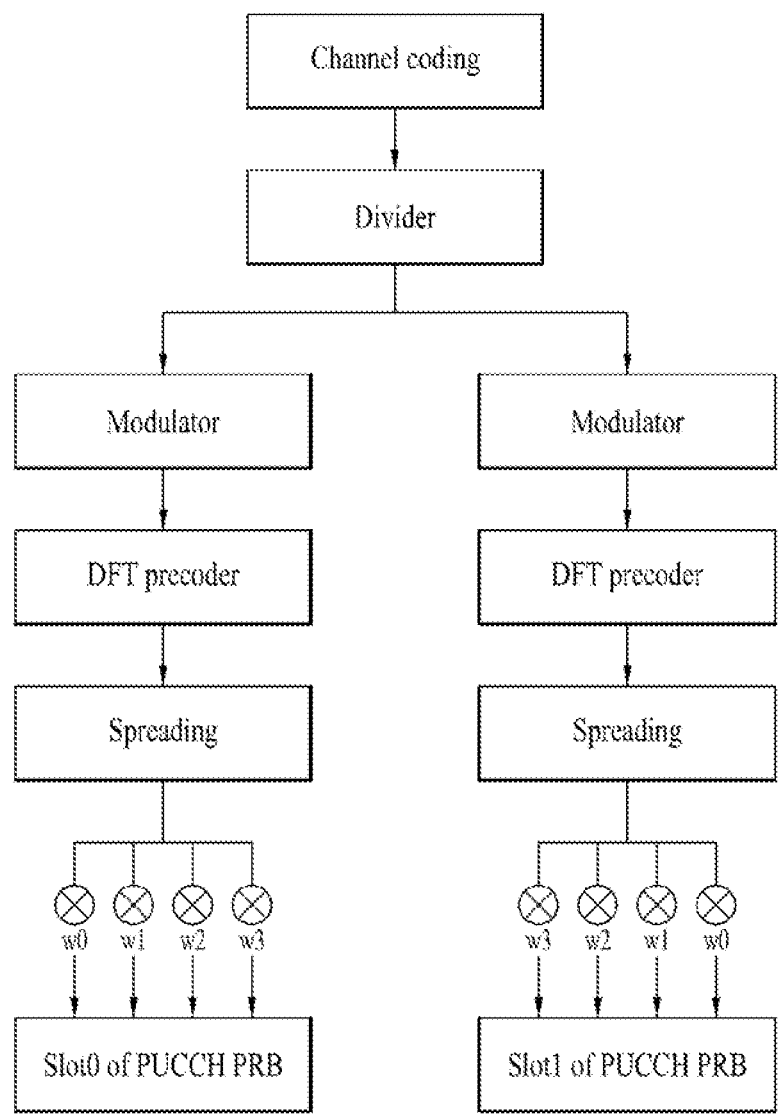

FIG. 33 is different from FIG. 31 in the order of the modulator and the divider. Accordingly, the signal processing operation for PUCCH Format 3 may be performed in order of joint channel coding and division at a subframe level and modulation, DFT precoding and spreading at each slot level.

Figure 34:
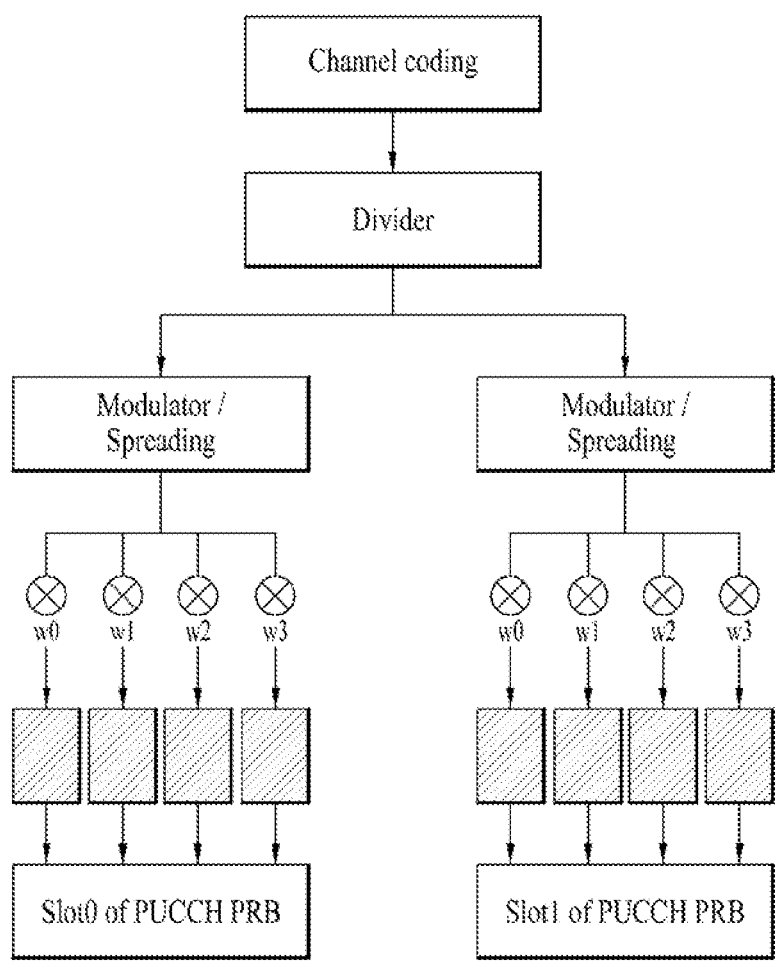

FIG. 34 is different from FIG. 33 in order of the DFT precoder and the spreading block. As described above, since the function of the spreading block is equal to multiplication of a DFT symbol sequence output from the DFT precoder by a specific constant at an SC-FDMA symbol level, the value of the signal mapped to the SC-FDMA symbols is constant even when the order of the DFT precoder and the spreading block is changed. Accordingly, the signal processing operation for PUCCH Format 3 may be performed by joint channel coding and division at a subframe level and modulation at each slot level. The modulation symbol sequence generated in each slot is spread to a plurality of SC-FDMA symbols at the SC-FDMA symbol level and the modulation symbol sequence corresponding to each SC-FDMA symbol is DFT-precoded in SC-FDMA symbol units. In this case, the modulation process and the spreading process may be performed by one functional block. For example, the generated modulation symbols may be directly spread at the SC-FDMA symbol level while the encoded bits are modulated. As another example, the modulation symbols are copied to suit the size of the spreading code when the encoded bits are modulated, and the modulation symbols and the elements of the spreading code may be multiplied in one-to-one correspondence.

Figure 35:
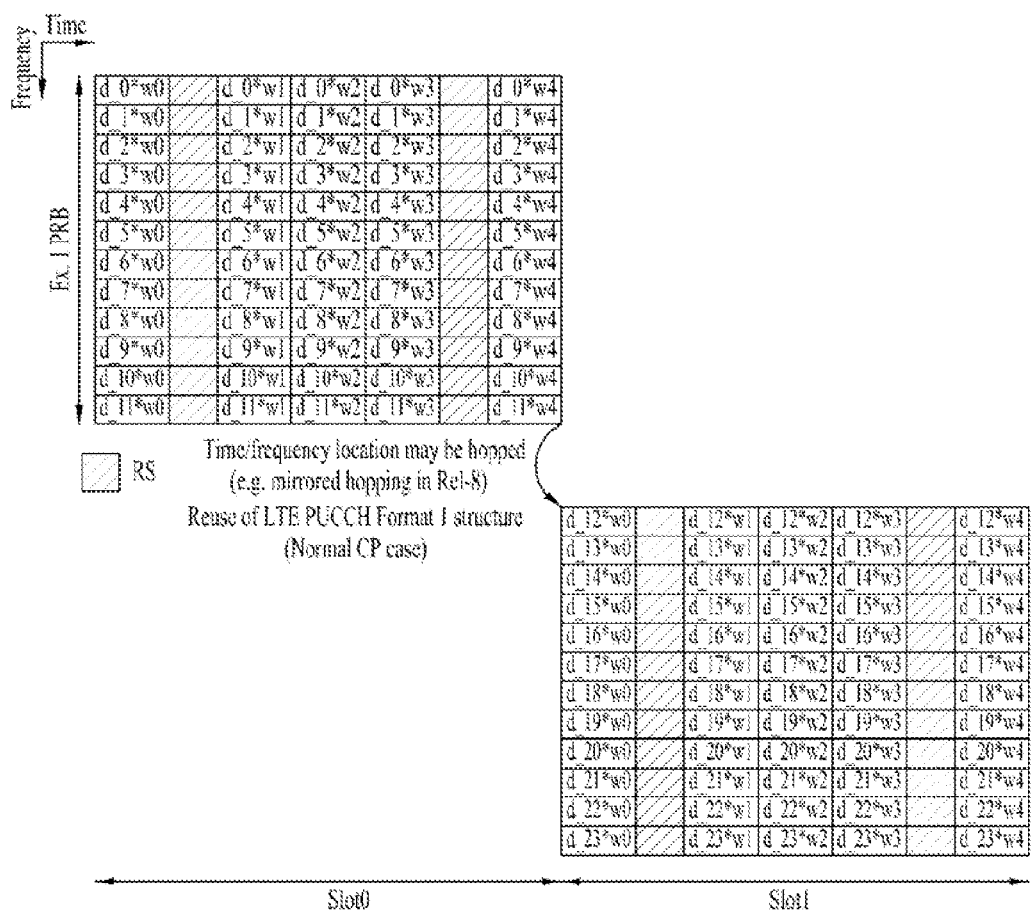
Figure 36:
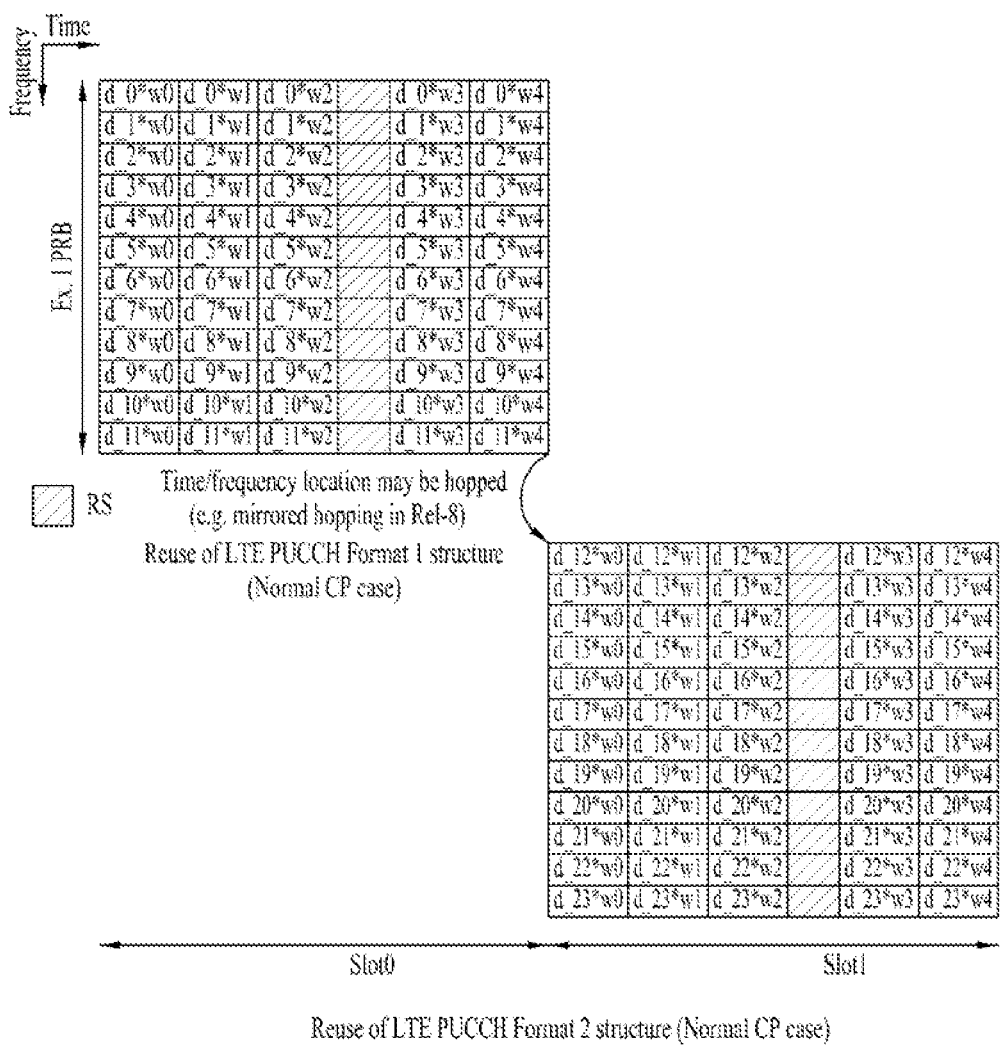

FIG. 35 shows the case where PUCCH Format 3 is applied to the structure of PUCCH Format 2 (normal CP) and FIG. 36 shows the case where PUCCH Format 3 is applied to the structure of PUCCH Format 2 (extended CP). The basic signal processing operation is equal to those described with respect to FIGS. 31 to 34. As the structure of PUCCH Format 2 of the legacy LTE is reused, the number/locations of UCI SC-FDMA symbols and RS SC-FDMA symbols in PUCCH Format 3 is different from that of FIG. 31.

Table 14 shows the location of the RS SC-FDMA symbol in PUCCH Format 3. It is assumed that the number of SC-FDMA symbols in a slot is 7 (indexes 0 to 6) in the normal CP case and the number of SC-FDMA symbols in a slot is 6 (indexes 0 to 5) in the extended CP case.

TABLE 14

| | SC-FDMA symbol location of RS | | |
|---|---|---|---|
| | Normal CP | Extended CP | Note |
| PUCCH Format 3 | 2, 3, 4 | 2, 3 | Reuse of PUCCH Format 1 |
| | 1, 5 | 3 | Reuse of PUCCH Format 2 |

Here, the RS may reuse the structure of the legacy LTE. For example, an RS sequence may be defined using cyclic shift of a base sequence (see Equation 1).

In the meantime, the multiplexing capacity of a data part is 5 due to SF=5. However, the multiplexing capacity of an RS part is determined by a CS interval $\Delta_{shift}^{PUCCH}$. For example, the multiplexing capacity may be $12/\Delta_{shift}^{PUCCH}$. In this case, the multiplexing capacities for the cases in which $\Delta_{shift}^{PUCCH}=1$, $\Delta_{shift}^{PUCCH}=2$, and $\Delta_{shift}^{PUCCH}=3$ are 12, 6, and 4, respectively. In FIGS. 35 and 36, while the multiplexing capacity of the data part is 5 due to SF=5, the multiplexing capacity of the RS part is 4 in case of $\Delta_{shift}^{PUCCH}$. Therefore, an overall multiplexing capacity may be limited to the smaller of the two values, 4.

Figure 37:
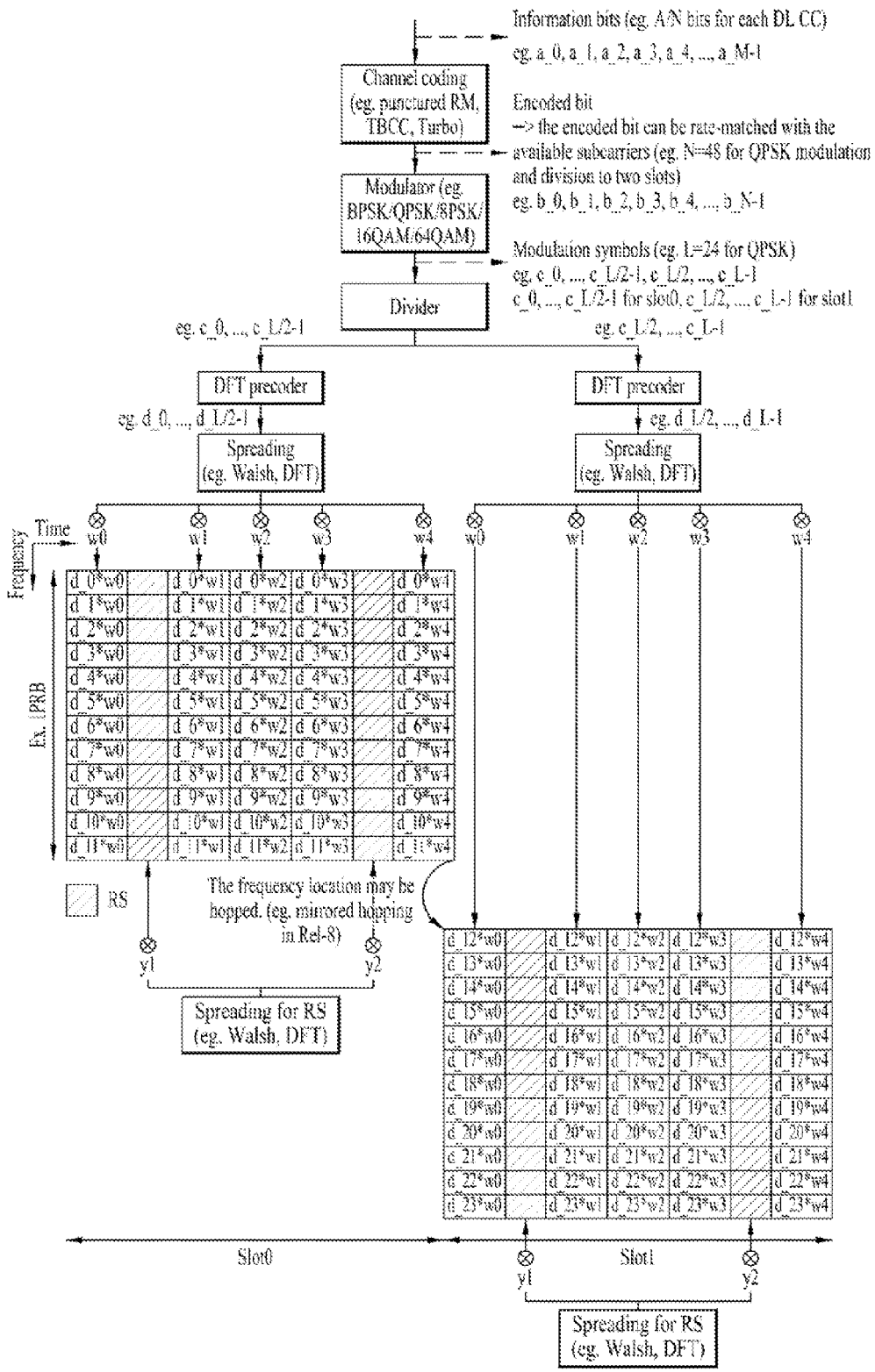
FIGS. 37 and 38 illustrate PUCCH Format 3 structures in which RS multiplexing capacity is increased and signal processing operations.

FIG. 37 illustrates an exemplary structure of PUCCH Format 3 in which a multiplexing capacity is increased. Referring to FIG. 37, SC-FDMA symbol-level spreading in a slot is applied to an RS part. Then, the multiplexing capacity of the RS part is doubled. That is, the multiplexing capacity of the RS part is 8 even in case of $\Delta_{shift}^{PUCCH}=3$, thereby preventing the multiplexing capacity of a UCI data part from being reduced. An OCC for RSs may include, without being limited to, a Walsh cover of [y1 y2]=[1 1] or [1 −1] or linear transformation thereof (e.g. [j j] [j −j], [1 j] [1−j], etc.). y1 is applied to the first RS SC-FDMA symbol of a slot and y2 is applied to the second RS SC-FDMA symbol of a slot.

Figure 38:
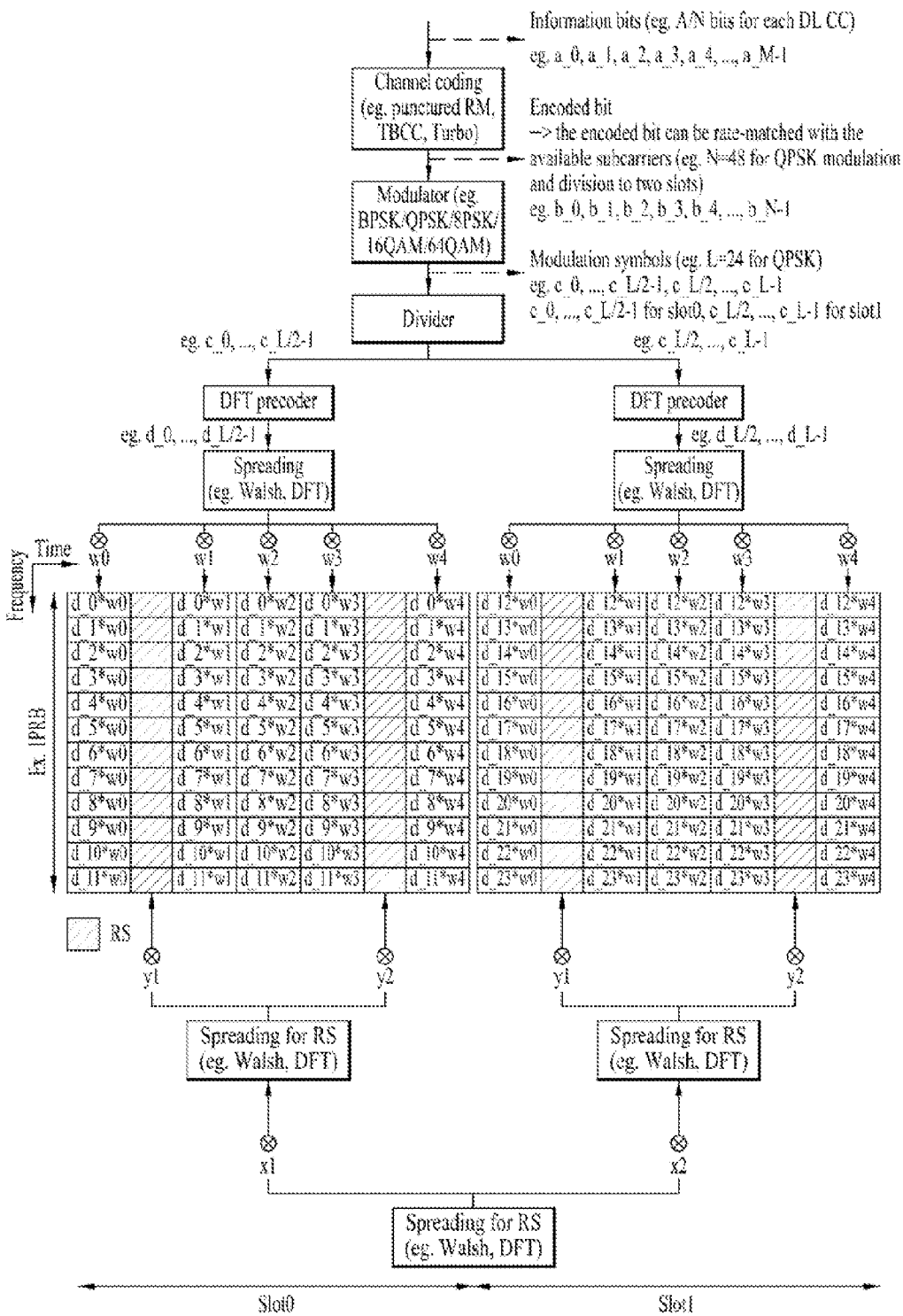

FIG. 38 illustrates another structure of PUCCH Format 3 in which multiplexing capacity is increased. If slot-level frequency hopping is not performed, the multiplexing capacity may be doubled again by further applying spreading or covering (e.g. Walsh covering) in slot units. If slot-level frequency hopping is performed, application of Walsh covering in slot units may not maintain orthogonality due to a channel condition experienced in each slot. A slot-level spreading code (e.g. OCC) for RSs may include, without being limited to, a Walsh cover of [x1 x2]=[1 1] or [1 −1] or linear transformation thereof (e.g. [j j] [j −j], [1 j] [1 −j], etc.). x1 is applied to the first slot and x2 is applied to the second slot. While FIG. 38 shows SC-FDMA symbol-level spreading (or covering) after slot-level spreading (or covering), a spreading (or covering) order may be changed.

The signal processing procedure of PUCCH Format 3 will now be described using equations. For convenience, it is assumed that a length-5 OCC is used (e.g. FIGS. 34 to 38).

The block of bits $b(0), \ldots, b(M_{bit}-1)$ is scrambled with a UE-specific scrambling sequence. The block of bits $b(0), \ldots, b(M^{bit}-1)$ may be corresponding to coded bits $b\_0$, $b\_1$, $b\_N-1$ of FIG. 31. The block of bits $b(0), \ldots, b(M^{bit}-1)$ includes at least one of ACK/NACK bit, CSI bit, SR bit. A block of scrambled bits $\tilde{b}(0), \ldots, \tilde{b}(M_{bit}-1)$ may be generated by the equation below.

$$\tilde{b}(i) = (b(i) + c(i)) \bmod 2 \quad \text{[Equation 10]}$$

where c(i) denotes the scrambling sequence. c(i) includes pseudo-random sequences are defined by a length-31 Gold sequence and may be generated by the following equation where mod denotes the modulo operation.

$$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2 \quad \text{[Equation 11]}$$

where $N_C = 1600$ and the first m-sequence is initialized with $x_1(0)=1$, $x_1(n)=0$, $n=1, 2, \ldots, 30$. The initialization of the second m-sequence is given by $c_{init} = \Sigma_{i=0}^{30} x_2(i) \cdot 2^i$. $c_{init}$ may be initialized with $c_{init} = (\lfloor n_s/2 \rfloor + 1) \cdot (2N_{ID}^{cell} + 1) \cdot 2^{16} + n_{RNTI}$ at the start of each subframe. $n_s$ is a slot number within a radio frame. $N_{ID}^{cell}$ is physical layer cell identity. $n_{RNTI}$ is radio network temporary identifier.

The block of scrambled bits $\tilde{b}(0), \ldots, \tilde{b}(M_{bit}-1)$ is modulated, resulting in a block of complex-valued modulation symbols $d(0), \ldots, d(M_{symb}-1)$. When QPSK modulated, $M_{symb} = M_{bit}/2 = 2N_{sc}^{RB}$. The block of complex-valued modulation symbols $d(0), \ldots, d(M_{symb}-1)$ is corresponding to modulation symbol $c\_0, c\_1, c\_N-1$ at FIG. 31.

The complex-valued modulation symbols $d(0), \ldots, d(M_{symb}-1)$ are block-wise spread with the orthogonal sequence $w_{n_{oc}}(i)$ resulting in $N_{SF,0}^{PUCCH} + N_{SF,1}^{PUCCH}$ sets of complex-valued symbols according to the following equation. The divide/spread procedure of FIG. 32 is performed by the following equation. Each complex-valued symbol is corresponding to an SC-FDMA symbol, and has $N_{sc}^{RB}$ complex-valued modulation values (e.g. 12 complex-valued modulation values).

$$y_n(i) = \quad \text{[Equation 12]}$$

$$\begin{cases} w_{n_{oc},0}(\bar{n}) \cdot e^{j\pi \lfloor n_{cs}^{cell}(n_s,l)/64 \rfloor/2} \cdot d(i) & n < N_{SF,0}^{PUCCH} \\ w_{n_{oc},1}(\bar{n}) \cdot e^{j\pi \lfloor n_{cs}^{cell}(n_s,l)/64 \rfloor/2} \cdot d(N_{sc}^{RB}+i) & \text{otherwise} \end{cases}$$

$$\bar{n} = n \bmod N_{SF,0}^{PUCCH}$$

$$n = 0, \ldots, N_{SF,0}^{PUCCH} + N_{SF,1}^{PUCCH} - 1$$

$$i = 0, 1, \ldots, N_{sc}^{RB} - 1$$

Here, $N_{SF,0}^{PUCCH}$ and $N_{SF,1}^{PUCCH}$ correspond to the number of SC-FDMA symbols used for PUCCH transmission at slot 0 and slot 1, respectively. $N_{SF,0}^{PUCCH} = N_{SF,1}^{PUCCH} = 5$ for both slots in a subframe using normal PUCCH format 3 and $N_{SF,0}^{PUCCH} = 5$, $N_{SF,1}^{PUCCH} = 4$ holds for the first and second slot, respectively, in a subframe using shortened PUCCH format 3. $w_{n_{oc},0}(i)$ and $w_{n_{oc},1}(i)$ indicate orthogonal sequences applied to slot 0 and slot 1, respectively and are given by Table 15 shown below. $n_{oc}$ denotes an orthogonal sequence index (or an orthogonal code index). $\lfloor\ \rfloor$ denotes a flooring function. $n_{cs}^{cell}(n_s, l)$ may be given by $n_{cs}^{cell}(n_s, l) = \Sigma_{i=0}^{7} c(8N_{symb}^{UL} \cdot n_s + 8l + i) \cdot 2^i$. c(i) may be given by Equation 11 and may be initialized to $c_{init} = N_{ID}^{cell}$ at the beginning of every radio frame.

Table 15 shows a sequence index $n_{oc}$ and an orthogonal sequence $w_{n_{oc}}(i)$.

TABLE 15

| Sequence index | Orthogonal sequence $[w_{n_{oc}}(0) \ldots w_{n_{oc}}(N_{SF}^{PUCCH}-1)]$ | |
|---|---|---|
| $n_{oc}$ | $N_{SF}^{PUCCH} = 5$ | $N_{SF}^{PUCCH} = 4$ |
| 0 | [1 1 1 1 1] | [+1 +1 +1 +1] |
| 1 | [1 $e^{j2\pi/5}$ $e^{j4\pi/5}$ $e^{j6\pi/5}$ $e^{j8\pi/5}$] | [+1 −1 +1 −1] |
| 2 | [1 $e^{j4\pi/5}$ $e^{j8\pi/5}$ $e^{j2\pi/5}$ $e^{j6\pi/5}$] | [+1 −1 +1 +1] |
| 3 | [1 $e^{j6\pi/5}$ $e^{j2\pi/5}$ $e^{j8\pi/5}$ $e^{j4\pi/5}$] | [+1 −1 −1 +1] |
| 4 | [1 $e^{j8\pi/5}$ $e^{j6\pi/5}$ $e^{j4\pi/5}$ $e^{j2\pi/5}$] | — |

In Table 15, an orthogonal sequence (or code) of $N_{SF}^{PUCCH} = 5$ is generated by the following equation.

$$\left[ e^{j\frac{2\pi \cdot 0 \cdot n_{oc}}{5}} \ e^{j\frac{2\pi \cdot 1 \cdot n_{oc}}{5}} \ e^{j\frac{2\pi \cdot 2 \cdot n_{oc}}{5}} \ e^{j\frac{2\pi \cdot 3 \cdot n_{oc}}{5}} \ e^{j\frac{2\pi \cdot 4 \cdot n_{oc}}{5}} \right] \quad \text{[Equation 13]}$$

Resources used for transmission of PUCCH formats 3 are identified by a resource index $n_{PUCCH}^{(3)}$. For example, $n_{oc}$ may be given by $n_{oc} = n_{PUCCH}^{(3)} \bmod N_{SF,3}^{PUCCH}$. $n_{PUCCH}^{(3)}$ may be indicated through a Transmit Power Control (TPC) field of an SCell PDCCH. More specifically, $n_{oc}$ for each slot may be given the following equation.

$$n_{oc,0} = n_{PUCCH}^{(3)} \bmod N_{SF,1}^{PUCCH} \quad \text{[Equation 14]}$$

$$n_{oc,1} = \begin{cases} (3n_{oc,0}) \bmod N_{SF,1}^{PUCCH} & \text{if } N_{SF,1}^{PUCCH} = 5 \\ n_{oc,0} \bmod N_{SF,1}^{PUCCH} & \text{otherwise} \end{cases}$$

where $n_{oc,0}$ denotes a sequence index value $n_{oc}$ for slot 0 and $n_{oc,1}$ denotes a sequence index value $n_{oc}$ for slot 1. In case of normal PUCCH Format 3, $N_{SF,0}^{PUCCH} = N_{SF,1}^{PUCCH} = 5$. In case of shortened PUCCH Format 3, $N_{SF,0}^{PUCCH} = 5$ and $N_{SF,1}^{PUCCH} = 4$.

Each set of complex-valued symbols may be cyclically shifted according to $$\tilde{y}_n(i) = y_n((i + n_{cs}^{cell}(n_s, l)) \bmod N_{sc}^{RB}) \quad \text{[Equation 15]}$$

where $n_s$ denotes a slot number in a radio frame and l denotes an SC-FDMA symbol number in a slot. $n_{cs}^{cell}(n_s, l)$ is defined by Equation 12. $n=0, \ldots, N_{SF,0}^{PUCCH} + N_{SF,1}^{PUCCH} - 1$.

The shifted sets of complex-valued symbols are transform precoded according to the following equation, resulting a block of complex-valued symbols $z(0), \ldots, z((N_{SF,0}^{PUCCH} + N_{SF,1}^{PUCCH}) N_{sc}^{RB} - 1)$.

$$z(n \cdot N_{sc}^{RB} + k) = \frac{1}{\sqrt{P}} \frac{1}{\sqrt{N_{sc}^{RB}}} \sum_{i=0}^{N_{sc}^{RB}-1} \tilde{y}_n(i) e^{-j\frac{2\pi ik}{N_{sc}^{RB}}} \quad \text{[Equation 16]}$$

$$k = 0, \ldots, N_{sc}^{RB} - 1$$

$$n = 0, \ldots, N_{SF,0}^{PUCCH} + N_{SF,1}^{PUCCH} - 1$$

Complex symbol blocks z(0), . . . , $z((N_{SF,0}^{PUCCH}+N_{SF,1}^{PUCCH})N_{sc}^{RB}-1)$ are mapped to physical resources after power control. A PUCCH uses one resource block in each slot of a subframe. In the resource block, z(0), . . . , $z((N_{SF,0}^{PUCCH}+N_{SF,1}^{PUCCH})N_{sc}^{RB}-1)$ are mapped to a resource element (k, l) which is not used for RS transmission (see Table 14). Mapping is performed in ascending order of k, l, and a slot number, starting from the first slot of a subframe. k denotes a subcarrier index and l denotes an SC-FDMA symbol index in a slot.

Next, UL transmission mode configuration is described. A transmission mode for the PUCCH is roughly defined as two modes: one is a single-antenna transmission mode and the other is a multi-antenna transmission mode. The single-antenna transmission mode is a method in which a UE transmits signals through a single antenna or a receiving end (e.g. BS) recognizes transmission as signal transmission of the UE through a single antenna, during PUCCH transmission. In the latter case, the UE may use a scheme such as virtualization (e.g. Precoding Vector Switching (PVS), antenna selection, Cyclic Delay Diversity (CDD), etc.) while transmitting signals through multiple antennas. The multi-antenna transmission mode may be a method in which the UE transmits signals to the BS through multiple antennas using a transmission diversity or MEMO scheme. The transmission diversity scheme used in the multi-antenna transmission mode may apply Spatial Orthogonal Resource Transmit Diversity (SORTD) or Space-Code Block Coding (SCBC). In this specification, the multi-antenna transmission mode is referred to as an SORTD mode for convenience unless otherwise mentioned, but the present invention is not limited thereto.

Figure 39:
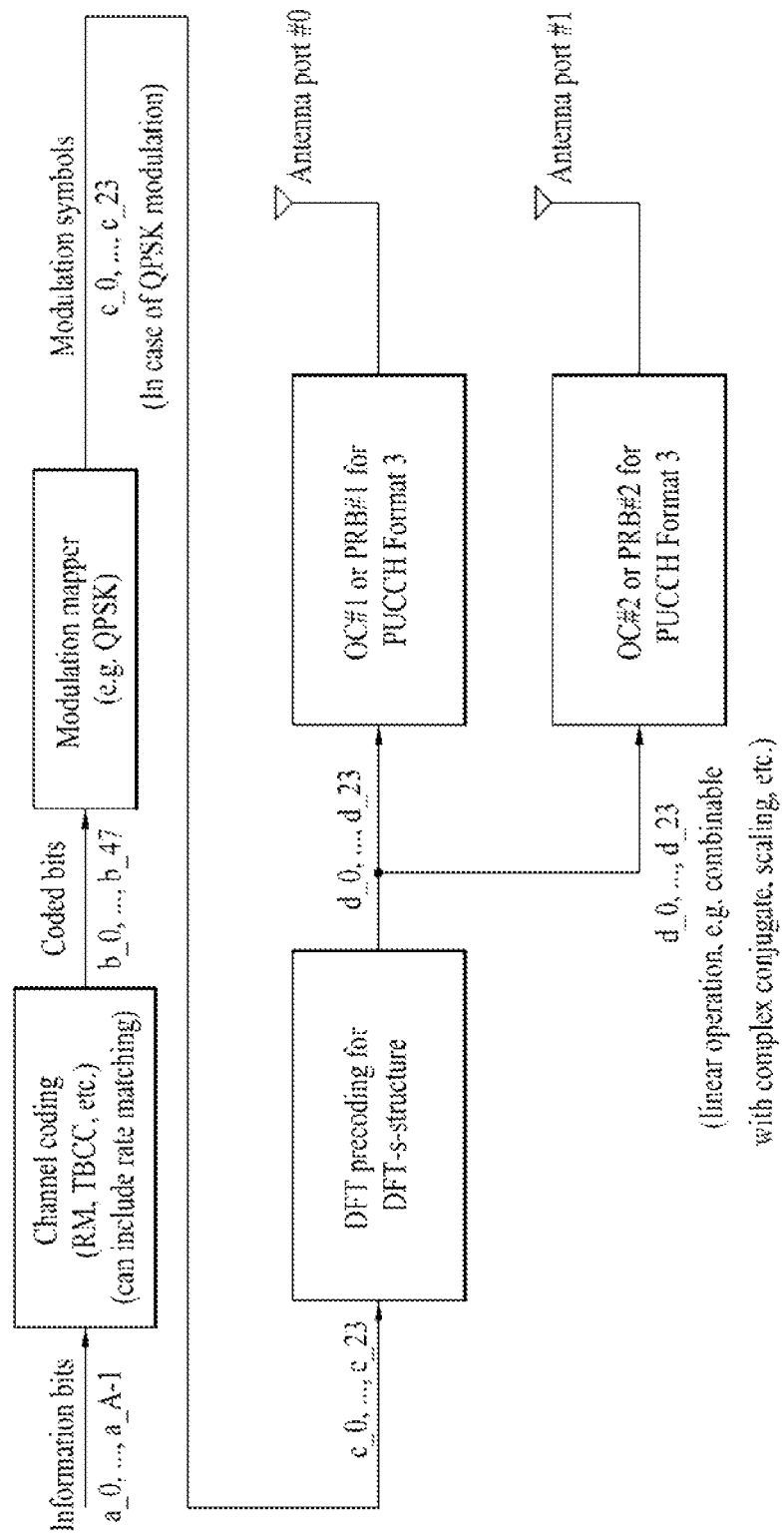
FIG. 39 illustrates a signal processing block/procedure for SORTD.

FIG. 39 illustrates a signal processing block/operation for SORTD. A basic operation except for a multi-antenna transmission process is identical to the operation described with reference to FIGS. 31 to 38. Referring to FIG. 39, modulation symbols c_0, . . . , c_23 are DFT-precoded and then are transmitted through resources (e.g. an OC, a PRB, or a combination thereof) given for each antenna port. While this example illustrates a situation that one DFT operation is performed for a plurality of antenna ports, the DFT operation may be performed per antenna port. In addition, although DFT precoded symbols d_0, . . . , d_23 are transmitted through the second OC/PRB in a copied form, a modified form (e.g. complex conjugate or scaling) of the DFT precoded symbols d_0, . . . , d_23 may be transmitted through the second OC/PRB. For example, $[OC^{(0)} \neq OC^{(1)}; PRB^{(0)}=PRB^{(1)}]$, $[OC^{(0)}=OC^{(1)}; PRB^{(0)} \neq PRB^{(1)}]$, and $[OC^{(0)} \neq OC^{(1)}; PRB^{(0)} \neq PRB^{(1)}]$ are possible in order to guarantee orthogonality between PUCCH signals transmitted through different antenna ports. Here, numbers in superscripts denote antenna port numbers or values corresponding thereto.

Figure 40:
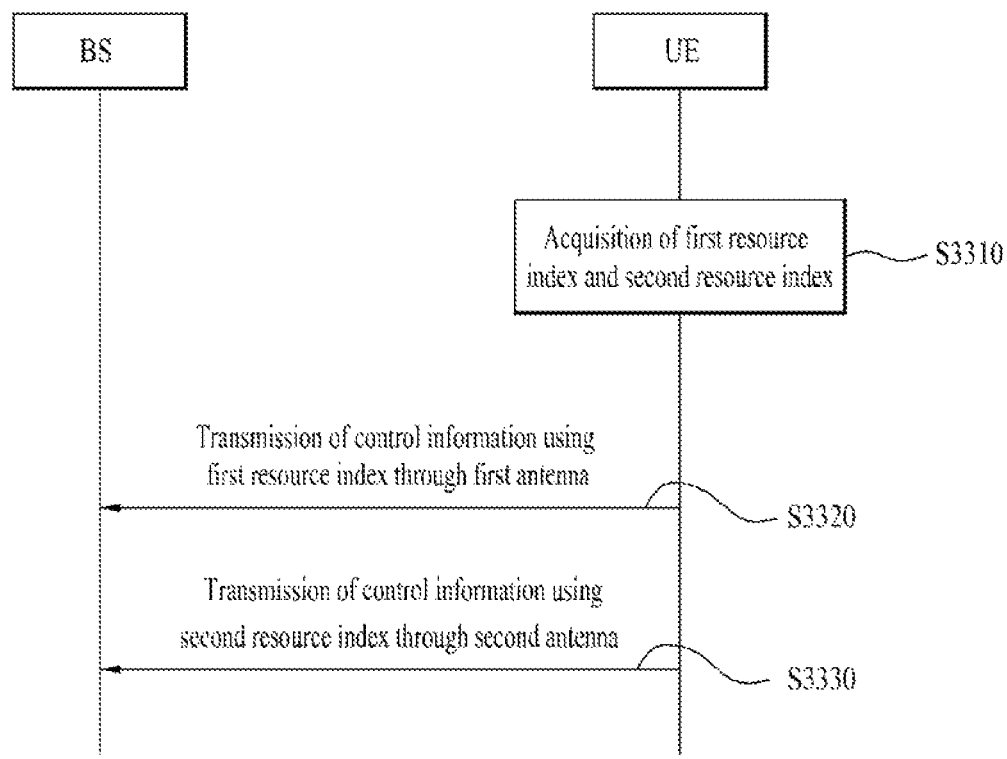
FIG. 40 schematically explains an SORTD operation.

FIG. 40 is a schematic diagram explaining an SORTD operation. Referring to FIG. 40, a UE acquires a first resource index and a second resource index (S3310). Here, a resource index (or a resource value) indicates a PUCCH resource index (or PUCCH resource value), preferably, a PUCCH Format 3 resource index (or PUCCH Format 3 resource value). Step S3310 may include a plurality of steps different in time. A method for acquiring the first resource index and the second resource index will be described in detail later. Next, the UE transmits a PUCCH signal using a PUCCH resource corresponding to the first resource index through a first antenna (port) (S3320). The UE transmits a PUCCH signal using a PUCCH resource corresponding to the second resource index through a second antenna (port) (S3330). Steps S3320 and S3330 are performed in the same frame.

The PUCCH signal may include HARQ-ACK. HARQ-ACK includes a response to a downlink signal, (e.g. ACK, NACK, DTX, or NACK/DTX). If the PUCCH signal includes HARQ-ACK, the procedure of FIG. 40 further includes a process of receiving the downlink signal although not shown in FIG. 40. The process of receiving the downlink signal includes receiving a PUCCH for downlink scheduling and receiving a PDSCH corresponding to the PDCCH. For PUCCH Format 3 transmission, at least one of the PDCCH and PDSCH may be received on an SCell.

As described with reference to FIGS. 39 and 40, multi-antenna (port) transmission (e.g. SORTD) requires greater orthogonal resources than single-antenna (port) transmission. For example, SORTD transmission of two antennas (2Tx) requires twice the orthogonal resources than single-antenna (port) transmission. Accordingly, the antenna (port) transmission mode is associated with the number of UEs that can be multiplexed in a resource region for the PUCCH, i.e. multiplexing capacity. Therefore, a BS needs to flexibly configure the antenna (port) transmission mode according to the number of communicating UEs. For example, if the number of UEs included in the BS is small, the multi-antenna (port) transmission mode (e.g. SORTD mode) using multiple resources may be configured for the UEs. If the number of UEs included in the BS is large, the single-antenna (port) transmission mode using a single resource may be configured. The antenna (port) transmission mode for PUCCH transmission may be configured through RRC signaling. Furthermore, the antenna (port) transmission mode may be independently configured for each PUCCH format. For example, antenna (port) transmission modes for PUCCH Format 1, PUCCH Format 1a/1b, PUCCH Format 2/2a/2b, PUCCH Format 3, and PUCCH 1b based on channel selection in CA may be independently configured.

The present invention proposes various methods for resource allocation (see step S3310 of FIG. 40) in an environment using multiple resources for multi-antenna (port) transmission in PUCCH Format 3. For example, when 2Tx SORTD is applied to PUCCH Format 3, two orthogonal resources are needed and, thus, an allocation rule for the two orthogonal resources is necessary.

First, single-antenna (port) transmission requiring one orthogonal resource will be described. Resource allocation for PUCCH Format 3 is based on explicit resource allocation. Specifically, a UE may be explicitly assigned PUCCH resource value candidate(s) for PUCCH Format 3 (or a PUCCH resource value candidate set) (e.g. $n_{PUCCH,x}^{(3)}$ (x=0, 1, . . . , N)) in advance through higher layer (e.g. RRC) signaling. Next, the BS may transmit an ACK/NACK Resource Indicator (ARI) (in other words, an HARQ-ACK resource value) to the UE and the UE may determine a PUCCH resource value $n_{PUCCH}^{(3)}$ used for actual PUCCH transmission through the ARI. The PUCCH resource value $n_{PUCCH}^{(3)}$ is mapped to a PUCCH resource (e.g. an OC or a PRB). The ARI may be used to directly indicate which of the PUCCH resource candidate(s) (or a PUCCH resource value candidate set) provided by a higher layer in advance will be used. According to an example of implementation, the ARI may represent an offset value relative to a PUCCH resource value signaled (by the higher layer). A Transmit Power Control (TPC) field in a PDSCH-scheduling PDCCH (SCell PDCCH) transmitted on an SCell may be reused for the ARI. Meanwhile, a TPC field of a PDSCH-scheduling PDCCH (PCell PDCCH) transmitted on a PCell may be used for PUCCH power control which is an original purpose thereof. 3GPP Rel-10 does not allow a PDSCH of a PCell to be cross-carrier scheduled by an SCell, receiving the PDSCH on the PCell only may include the same meaning as receiving the PDCCH on the PCell only.

Specifically, when PUCCH resources for A/N are preliminarily allocated by RRC signaling, resources used for actual PUCCH transmission may be determined as follows.

The PDCCH corresponding to the PDSCH on the SCell(s) (or the PDCCH on the SCell(s) corresponding to the PDSCH) indicates one of the RRC-configured PUCCH resource(s) using the ARI (in other words, the HARQ-ACK resource value).

If the PDCCH corresponding to the PDSCH on the SCell(s) (or the PDCCH on the SCell(s) corresponding to the PDSCH) is not detected and if the PDSCH is received on the PCell, any one of the following methods may be applied.

An implicit A/N PUCCH resource (i.e. PUCCH Format 1a/1b resource obtained using the lowest CCE constituting the PUCCH) according to legacy 3GPP Rel-8 is used.

The PDCCH corresponding to the PDSCH on the PCell (or the PDCCH on the PCell corresponding to the PDSCH) indicates one of resources configured by RRC using the ARI (in other words, HARQ-ACK resource value).

It is assumed that all the PDCCHs corresponding to the PDSCHs on the SCells (or the PDCCHs on the SCell(s) corresponding to the PDSCHs) have the same ARI (in other words, HARQ-ACK resource value).

The ARI (in other words, HARQ-ACK resource value) may be an X-bit and, if the TPC field of the SCell PDCCH is reused, X may be 2. For convenience, it is assumed that X is 2.

Hereinafter, a resource allocation method for supporting various antenna (port) transmission modes when control information is transmitted using PUCCH Format 3 will be described.

For example, a UE may be assigned four orthogonal resources, for example, PUCCH resource values $n_{PUCCH,0}^{(3)}$, $n_{PUCCH,1}^{(3)}$, $n_{PUCCH,2}^{(3)}$, and $n_{PUCCH,3}^{(3)}$ for PUCCH Format 3 through RRC signaling (e.g. four RRC signals). In addition, the UE may be assigned one set $\{n_{PUCCH,0}^{(3)}, n_{PUCCH,1}^{(3)}, n_{PUCCH,2}^{(3)}, n_{PUCCH,3}^{(3)}\}$ composed of four PUCCH resource values through one RRC signaling. Thereafter, the UE may detect a PDCCH signal and receive a PDSCH signal corresponding to the PDCCH. At least one of the PDCCH signal and the PDSCH single may be received through an SCell. Next, the UE may determine a PUCCH resource value $n_{PUCCH}^{(3)}$ to be used for actual PUCCH transmission according to a bit value of an ARI (in other words, an HARQ-ACK resource value) in the PDCCH signal. The determined PUCCH resource value is mapped to a PUCCH resource (e.g. an OC or PRB). UCI (e.g. HARQ-ACK for PDSCH) is transmitted to a network (e.g. a BS or a relay) using the PUCCH resource mapped from the PUCCH resource value. The above-described method is shown in Table 16.

TABLE 16

| HARQ-ACK Resource Indicator (ARI) for PUCCH | $n_{PUCCH}^{(3)}$ |
|---|---|
| 00 | 1st PUCCH resource value ($n_{PUCCH,0}^{(3)}$) configured by higher layers |

TABLE 16-continued

| HARQ-ACK Resource Indicator (ARI) for PUCCH | $n_{PUCCH}^{(3)}$ |
|---|---|
| 01 | 2nd PUCCH resource value ($n_{PUCCH,1}^{(3)}$) configured by higher layers |
| 10 | 3rd PUCCH resource value ($n_{PUCCH,2}^{(3)}$) configured by higher layers |
| 11 | 4th PUCCH resource value ($n_{PUCCH,3}^{(3)}$) configured by higher layers |

Here, HARQ-ACK indicates an HARQ ACK/NACK/DTX response to a downlink transport block. The HARQ ACK/NACK/DTX response includes ACK, NACK, DTX, and NACK/DTX.

If it is assumed that an ARI (in other words, HARQ-ACK resource value) is transmitted using a TPC field of an SCell PDCCH, the UE is unable to discern the ARI and a PUCCH resource value associated with the ARI upon receiving the PDSCH only on the PCell (or upon receiving the PDCCH only on the PCell). Accordingly, when a corresponding event occurs, fallback using the existing 3GPP Rel-8/9 PUCCH resource and Rel-8/9 PUCCH Format 1a/1b may be applied.

Next, a method for allocating a plurality of orthogonal resources for transmission diversity (e.g. SORTD) will be described. For convenience, it is assumed that two orthogonal resources are used.

In this case, the UE may be assigned 8 orthogonal resources, for example, PUCCH resource value $n_{PUCCH,0}^{(3)}$, $n_{PUCCH,1}^{(3)}$, $n_{PUCCH,2}^{(3)}$, $n_{PUCCH,3}^{(3)}$, $n_{PUCCH,4}^{(3)}$, $n_{PUCCH,5}^{(3)}$, $n_{PUCCH,6}^{(3)}$, and $n_{PUCCH,7}^{(3)}$ for PUCCH Format 3 through RRC signaling (e.g. 8 RRC signals). In addition, the UE may be assigned one set $\{n_{PUCCH,0}^{(3)}, n_{PUCCH,1}^{(3)}, n_{PUCCH,2}^{(3)}, n_{PUCCH,3}^{(3)}, n_{PUCCH,4}^{(3)}, n_{PUCCH,5}^{(3)}, n_{PUCCH,6}^{(3)}, n_{PUCCH,7}^{(3)}\}$ composed of 8 PUCCH) resource values through one RRC signal. Next, the UE detects a PDCCH signal and may receive a PDSCH signal corresponding to the PDCCH signal. At least one of the PDCCH signal and the PDSCH signal may be received through an SCell. The UE may determine a PUCCH resource value $n_{PUCCH}^{(3,p)}$ to be used for actual PUCCH transmission according to a bit value of an ARI (in other words, HARQ-ACK resource value) in the PDCCH. Here, p denotes an antenna port number or a value related thereto. The determined PUCCH resource value is mapped to a PUCCH resource (e.g. an OC or PRB). UCI (e.g. HARQ-ACK for a PDSCH) is transmitted to a network (e.g. a BS or a relay) using the PUCCH resource mapped from the PUCCH resource value.

In case of the multi-antenna port transmission mode, one ARI is used to indicate a plurality of PUCCH resource values. The plurality of PUCCH resource values indicated by the ARI are respectively mapped to PUCCH resources for respective corresponding antenna ports. Accordingly, the ARI may indicate one or multiple PUCCH resource values according to whether an antenna port transmission mode is a single antenna port mode or a multi-antenna port mode. Table 17 shows the above-described method.

TABLE 17

| HARQ-ACK Resource Indicator (ARI) for PUCCH | $n_{PUCCH}^{(3,p)}$ | |
|---|---|---|
| | p = p0 (e.g. antenna port 0) | p = p1 (e.g. antenna port 1) |
| 00 | 1st PUCCH resource value ($n_{PUCCH,0}^{(3)}$) configured by higher layers | 5th PUCCH resource value ($n_{PUCCH,4}^{(3)}$) configured by higher layers |
| 01 | 2nd PUCCH resource value ($n_{PUCCH,1}^{(3)}$) configured by higher layers | 6th PUCCH resource value ($n_{PUCCH,5}^{(3)}$) configured by higher layers |
| 10 | 3rd PUCCH resource value ($n_{PUCCH,2}^{(3)}$) configured by higher layers | 7th PUCCH resource value ($n_{PUCCH,6}^{(3)}$) configured by higher layers |
| 11 | 4th PUCCH resource value ($n_{PUCCH,3}^{(3)}$) configured by higher layers | 8th PUCCH resource value ($n_{PUCCH,7}^{(3)}$) configured by higher layers |

As another example, the UE may be assigned four orthogonal resources (e.g. PUCCH resource values) per antenna port through RRC signaling. Thereafter, the UE may detect a PDCCH signal and receive a PDSCH signal corresponding to the PDCCH. At least one of the PDCCH signal and the PDSCH single may be received through an SCell. Next, the UE may determine a final PUCCH resource value $n_{PUCCH}^{(3)}$ to be used for each antenna port according to a bit value of an ARI (in other words, an HARQ-ACK resource value) in the PDCCH signal. The determined PUCCH resource value is mapped to a PUCCH resource (e.g. an OC or PRB) for a corresponding antenna port. p denotes an antenna port number or a value related thereto. Table 18 shows the above-described method.

$n_{PUCCH,0}^{(3,0)}$, $n_{PUCCH,1}^{(3,0)}$, $n_{PUCCH,2}^{(3,0)}$, $n_{PUCCH,3}^{(3,0)}$→used for antenna port p0 (e.g. p0=0)

$n_{PUCCH,0}^{(3,1)}$, $n_{PUCCH,1}^{(3,1)}$, $n_{PUCCH,2}^{(3,1)}$, $n_{PUCCH,3}^{(3,1)}$→used for antenna port p1 (e.g. p1=1)

TABLE 18

| HARQ-ACK Resource Indicator (ARI) for PUCCH | $n_{PUCCH}^{(3,p)}$ | |
|---|---|---|
| | p = p0 (e.g. antenna port 0) | p = p1 (e.g. antenna port 1) |
| 00 | 1st PUCCH resource value ($n_{PUCCH,0}^{(3,0)}$) configured by higher layers | 1st PUCCH resource value ($n_{PUCCH,0}^{(3,1)}$) configured by higher layers |
| 01 | 2nd PUCCH resource value ($n_{PUCCH,1}^{(3,0)}$) configured by higher layers | 2nd PUCCH resource value ($n_{PUCCH,1}^{(3,1)}$) configured by higher layers |
| 10 | 3rd PUCCH resource value ($n_{PUCCH,2}^{(3,0)}$) configured by higher layers | 3rd PUCCH resource value ($n_{PUCCH,2}^{(3,1)}$) configured by higher layers |
| 11 | 4th PUCCH resource value ($n_{PUCCH,3}^{(3,0)}$) configured by higher layers | 4th PUCCH resource value ($n_{PUCCH,3}^{(3,3)}$) configured by higher layers |

In addition, the UE may be assigned one set {$n_{PUCCH,0}^{(3,0)}$, $n_{PUCCH,1}^{(3,0)}$, $n_{PUCCH,2}^{(3,0)}$, $n_{PUCCH,3}^{(3,0)}$, $n_{PUCCH,0}^{(3,1)}$, $n_{PUCCH,1}^{(3,1)}$, $n_{PUCCH,2}^{(3,1)}$, $n_{PUCCH,3}^{(3,1)}$} composed of 8 orthogonal resources, for example, PUCCH resources through one RRC signal. According to a bit value of an ARI, the UE may determine a final PUCCH resource value $n_{PUCCH}^{(3,p)}$ to be used per antenna port and a PUCCH resource corresponding to the PUCCH resource value. Table 19 shows the above-described method.

TABLE 19

| HARQ-ACK Resource Indicator (ARI) for PUCCH | $n_{PUCCH}^{(3,p)}$ | |
|---|---|---|
| | p = p0 (e.g. antenna port 0) | p = p1 (e.g. antenna port 1) |
| 00 | 1st PUCCH resource value ($n_{PUCCH,0}^{(3,0)}$) configured by higher layers | 5th PUCCH resource value ($n_{PUCCH,0}^{(3,1)}$) configured by higher layers |
| 01 | 2nd PUCCH resource value ($n_{PUCCH,1}^{(3,0)}$) configured by higher layers | 6th PUCCH resource value ($n_{PUCCH,1}^{(3,1)}$) configured by higher layers |
| 10 | 3rd PUCCH resource value ($n_{PUCCH,2}^{(3,0)}$) configured by higher layers | 7th PUCCH resource value ($n_{PUCCH,2}^{(3,1)}$) configured by higher layers |
| 11 | 4th PUCCH resource value ($n_{PUCCH,3}^{(3,0)}$) configured by higher layers | 8th PUCCH resource value ($n_{PUCCH,3}^{(3,3)}$) configured by higher layers |

Tables 17 to 19 show the case in which a part of p=p0 of allocation of PUCCH resource values for multiple antenna ports has the same configuration as the case of a single antenna port. That is, it is assumed that Tables 17 to 19 have a nested structure. Therefore, both single-antenna port transmission and multiple-antenna port transmission can be supported through one common table.

Referring to Table 18, the nested structure is shown in more detail. In the nested structure, one common table may be used. Table 20 illustrates a common table for a single/multiple-antenna port transmission mode.

TABLE 20

| HARQ-ACK Resource Indicator (ARI) for PUCCH | $n_{PUCCH}^{(3,p)}$ |
|---|---|
| 00 | 1st PUCCH resource value configured by higher layers |
| 01 | 2nd PUCCH resource value configured by higher layers |
| 10 | 3rd PUCCH resource value configured by higher layers |
| 11 | 4th PUCCH resource value configured by higher layers |

If a UE is configured as a single antenna port transmission mode in association with PUCCH transmission, Table 20 may be interpreted as shown in Table 21. Accordingly, when the UE is configured as the single antenna port transmission mode, a PUCCH resource value $n_{PUCCH}^{(3,p)}$, indicated by an ARI is finally mapped to one PUCCH resource $n_{PUCCH}^{(3,p0)}$, for a single antenna port (e.g. p0).

TABLE 21

| HARQ-ACK Resource Indicator (ARI) for PUCCH | $n_{PUCCH}^{(3,p)}$ | → | $n_{PUCCH}^{(3,p)}$ (p = p0) |
|---|---|---|---|
| 00 | 1st PUCCH resource value configured by higher layers | | $n_{PUCCH,0}^{(3,p0)}$ |
| 01 | 2nd PUCCH resource value configured by higher layers | | $n_{PUCCH,1}^{(3,p0)}$ |
| 10 | 3rd PUCCH resource value configured by higher layers | | $n_{PUCCH,2}^{(3,p0)}$ |
| 11 | 4th PUCCH resource value configured by higher layers | | $n_{PUCCH,3}^{(3,p0)}$ |

In the case where the UE is configured as a multi-antenna port transmission mode in association with PUCCH transmission, Table 20 may be interpreted as shown in Table 22. Accordingly, when the UE is configured as the multi-antenna port transmission mode, PUCCH resource values $n_{PUCCH}^{(3,p)}$ indicated by the ARI are finally mapped to a plurality of PUCCH resources $n_{PUCCH}^{(3,p0)}$ and $n_{PUCCH}^{(3,p1)}$ for multiple antenna ports (e.g. p0 and p1).

TABLE 22

| HARQ-ACK Resource Indicator (ARI) for PUCCH | $n_{PUCCH}^{(3,p)}$ → | $n_{PUCCH}^{(3,p)}$ (p = p0) | $n_{PUCCH}^{(3,p)}$ (p = p1) |
|---|---|---|---|
| 00 | 1st PUCCH resource value configured by higher layers | $n_{PUCCH,0}^{(3,p0)}$ | $n_{PUCCH,0}^{(3,p1)}$ |
| 01 | 2nd PUCCH resource value configured by higher layers | $n_{PUCCH,1}^{(3,p0)}$ | $n_{PUCCH,1}^{(3,p1)}$ |
| 10 | 3rd PUCCH resource value configured by higher layers | $n_{PUCCH,2}^{(3,p0)}$ | $n_{PUCCH,2}^{(3,p1)}$ |
| 11 | 4th PUCCH resource value configured by higher layers | $n_{PUCCH,3}^{(3,p0)}$ | $n_{PUCCH,3}^{(3,p1)}$ |

Another example for allocating multiple (e.g. two) orthogonal resources for transmission diversity, for example, SORTD will now be described. For example, it is assumed that the UE is assigned four orthogonal resources for PUCCH Format 3, for example, PUCCH resource values $n_{PUCCH,0}^{(3)}$, $n_{PUCCH,1}^{(3)}$, $n_{PUCCH,2}^{(3)}$, and $n_{PUCCH,3}^{(3)}$ through RRC signaling (e.g. RRC signals). The same is obtained even under the assumption that the UE is assigned one set $\{n_{PUCCH,0}^{(3)}, n_{PUCCH,1}^{(3)}, n_{PUCCH,2}^{(3)}, n_{PUCCH,3}^{(3)}\}$ composed of four PUCCH resource values through one RRC signal. As described above, the UE may determine a final PUCCH resource $n_{PUCCH}^{(3,p)}$ to be used per antenna port according to a bit value of the ARI. According to this example under the above-described assumption, four PUCCH resource values may be divided into two groups of group0=$\{n_{PUCCH,0}^{(3)}, n_{PUCCH,1}^{(3)}\}$ and group1=$\{n_{PUCCH,2}^{(3)}, n_{PUCCH,3}^{(3)}\}$. In this case, the first bit and the last bit of the ARI may be used to indicate resources for the respective groups. For example, assuming that the ARI is comprised of b0 and b1 (where each of b0 and b1 is 1 or 0), b0 may indicate which PUCCH resource value is used in group0 and b1 may indicate which PUCCH resource value is used in group1. The PUCCH resource value selected in group0 may be mapped to a PUCCH resource (e.g. an OC or PRB) for antenna port p0 and the PUCCH resource value selected in group1 may be mapped to a PUCCH resource (e.g. an OC or PRB) for antenna port p1.

The above-described method is shown in Table 23. While the case where four PUCCH resource values $n_{PUCCH,0}^{(3)}$, $n_{PUCCH,1}^{(3)}$, $n_{PUCCH,2}^{(3)}$, and $n_{PUCCH,3}^{(3)}$ are allocated by RRC signaling is shown, this method may be applied to the case where more orthogonal resources are used.

TABLE 23

| HARQ-ACK Resource Indicator (ARI) for PUCCH | $n_{PUCCH}^{(3,p)}$ p = p0 (e.g. antenna port 0) | $n_{PUCCH}^{(3,p)}$ p = p1 (e.g. antenna port 1) |
|---|---|---|
| 00 | 1st PUCCH resource value ($n_{PUCCH,0}^{(3)}$) for AP0, configured by higher layers | 3rd PUCCH resource value ($n_{PUCCH,2}^{(3)}$) for AP1, configured by higher layers |
| 01 | 1st PUCCH resource value ($n_{PUCCH,0}^{(3)}$) for AP0, configured by higher layers | 4th PUCCH resource value ($n_{PUCCH,3}^{(3)}$) for AP1, configured by higher layers |
| 10 | 2nd PUCCH resource value ($n_{PUCCH,1}^{(3)}$) for AP0, configured by higher layers | 3rd PUCCH resource value ($n_{PUCCH,2}^{(3)}$) for AP1, configured by higher layers |
| 11 | 2nd PUCCH resource value ($n_{PUCCH,1}^{(3)}$) for AP0, configured by higher layers | 4th PUCCH resource value ($n_{PUCCH,3}^{(3)}$) for AP1, configured by higher layers |

Table 23 shows the case where (in case of 2Tx, a total of four) signals are received through two RRC signals per antenna and each bit of the ARI indicates a resource used for a corresponding antenna port. Table 24 shows the case where $\{n_{PUCCH,0}^{(3,0)}, n_{PUCCH,1}^{(3,1)}\}$ is allocated for antenna port p0 and $\{n_{PUCCH,0}^{(3,1)}, n_{PUCCH,1}^{(3,1)}\}$ is allocated for antenna port p1.

TABLE 24

| HARQ-ACK Resource Indicator (ARI) for PUCCH | $n_{PUCCH}^{(3,p)}$ p = p0 (e.g. antenna port 0) | $n_{PUCCH}^{(3,p)}$ p = p1 (e.g. antenna port 1) |
|---|---|---|
| 00 | 1st PUCCH resource value ($n_{PUCCH,0}^{(3,0)}$) for antenna port 0 (AP0), configured by higher layers | 1st PUCCH resource value ($n_{PUCCH,0}^{(3,1)}$) for antenna port 1 (AP1), configured by higher layers |
| 01 | 1st PUCCH resource value ($n_{PUCCH,0}^{(3,0)}$) for AP0, configured by higher layers | 2nd PUCCH resource value ($n_{PUCCH,1}^{(3,1)}$) for (AP1), configured by higher layers |
| 10 | 2nd PUCCH resource value ($n_{PUCCH,1}^{(3,0)}$) for AP0, configured by higher layers | 1st PUCCH resource value ($n_{PUCCH,0}^{(3,1)}$) for (AP1), configured by higher layers |
| 11 | 2nd PUCCH resource value ($n_{PUCCH,1}^{(3,0)}$) for AP0, configured by higher layers | 2nd PUCCH resource value ($n_{PUCCH,1}^{(3,1)}$) for (AP1), configured by higher layers |

As another aspect of the present invention, a method of using a Downlink Assignment Index (DAI) field in case of TDD CA will be described. A DAI is a value obtained by counting scheduled PDCCHs in a time domain and is extensible to a cell (or CC) domain in CA. In PUCCH Format 3, since the DAI value is not necessary, the DAI may be used in the present invention.

For example, a PUCCH Format 3 resource for a first antenna port (p=p0) may be allocated/determined using an ARI and a PUCCH format resource for a second antenna port (p=p1) may be allocated/determined using a DAI. In preparation for the case where PDCCHs of at least one serving cell fail in detection, all of the PDCCH(s) of a serving cell may be restricted to have the same DAI value. Meanwhile, if a PDSCH is scheduled only on a PCell, a UE may disregard a DAI value of a PCell PDCCH corresponding to the PDSCH, fall back to a single antenna port mode, and transmit a PUCCH.

For convenience, it is assumed that the UE is assigned four orthogonal resources, for example, PUCCH resource values $n_{PUCCH,0}^{(3)}$, $n_{PUCCH,1}^{(3)}$, $n_{PUCCH,2}^{(3)}$, and $n_{PUCCH,3}^{(3)}$ through RRC signaling in advance. Next, if it is assumed that the UE receives a PDCCH signal including ARI=[00] and DAI=[10], $n_{PUCCH,0}^{(3,0)} = n_{PUCCH,0}^{(3)}$ →used for antenna port p0 (e.g. p0=0) and $n_{PUCCH,0}^{(3,1)} = n_{PUCCH,2}^{(3)}$ →used for antenna port p1 (e.g. p1=1).

The above-described method is shown in Table 25.

TABLE 25

| HARQ-ACK Resource Indicator (ARI) for PUCCH (used for p = p0) | DAI value (used for p = p1) | $n_{PUCCH}^{(3,p)}$ | |
|---|---|---|---|
| | | p = p0 (e.g. antenna port 0) | p = p1 (e.g. antenna port 1) |
| 00 | 01 | 1st PUCCH resource value ($n_{PUCCH,0}^{(3)}$) configured by higher layers | 2nd PUCCH resource value ($n_{PUCCH,1}^{(3)}$) configured by higher layers |
| 00 | 10 | 1st PUCCH resource value ($n_{PUCCH,0}^{(3)}$) configured by higher layers | 3rd PUCCH resource value ($n_{PUCCH,2}^{(3)}$) configured by higher layers |
| 00 | 11 | 1st PUCCH resource value ($n_{PUCCH,0}^{(3)}$) configured by higher layers | 4th PUCCH resource value ($n_{PUCCH,3}^{(3)}$) configured by higher layers |
| 01 | 10 | 2nd PUCCH resource value ($n_{PUCCH,1}^{(3)}$) configured by higher layers | 3rd PUCCH resource value ($n_{PUCCH,2}^{(3)}$) configured by higher layers |
| 01 | 11 | 2nd PUCCH resource value ($n_{PUCCH,1}^{(3)}$) configured by higher layers | 4th PUCCH resource value ($n_{PUCCH,3}^{(3)}$) configured by higher layers |
| 10 | 11 | 3rd PUCCH resource value ($n_{PUCCH,2}^{(3)}$) configured by higher layers | 4th PUCCH resource value ($n_{PUCCH,3}^{(3)}$) configured by higher layers |

In addition, the same method may be applied even if it is assumed that the UE is assigned 8 orthogonal resources, for example, PUCCH resource values $n_{PUCCH,0}^{(3)}$, $n_{PUCCH,1}^{(3)}$, $n_{PUCCH,2}^{(3)}$, $n_{PUCCH,3}^{(3)}$, $n_{PUCCH,4}^{(3)}$, $n_{PUCCH,5}^{(3)}$, $n_{PUCCH,6}^{(3)}$, and $n_{PUCCH,7}^{(3)}$, through RRC signaling in advance. For example, ARI values 00, 01, 10, and 11 for antenna port 0 may respectively indicate $n_{PUCCH,0}^{(3)}$, $n_{PUCCH,1}^{(3)}$, $n_{PUCCH,2}^{(3)}$, and $n_{PUCCH,3}^{(3)}$ and DAI values 00, 01, 10, and 11 for antenna port 1 may respectively indicate $n_{PUCCH,4}^{(3)}$, $n_{PUCCH,5}^{(3)}$, $n_{PUCCH,6}^{(3)}$, and $n_{PUCCH,7}^{(3)}$.

As another example, the UE may be assigned four orthogonal resources per antenna port through RRC signaling as follows.

$n_{PUCCH,0}^{(3,0)}$, $n_{PUCCH,1}^{(3,0)}$, $n_{PUCCH,2}^{(3,0)}$, $n_{PUCCH,3}^{(3,0)}$→used for antenna port p0 (e.g, p0=0)
$n_{PUCCH,0}^{(3,1)}$, $n_{PUCCH,1}^{(3,1)}$, $n_{PUCCH,2}^{(3,1)}$, $n_{PUCCH,3}^{(3,1)}$→used for antenna port p1 (e.g. p1=1)

In this case, the ARI values 00, 01, 10, and 11 may respectively indicate $n_{PUCCH,0}^{(3,0)}$, $n_{PUCCH,1}^{(3,0)}$, $n_{PUCCH,2}^{(3,0)}$, and $n_{PUCCH,3}^{(3,0)}$ the DAI values 00, 01, 10, and 11 may respectively indicate $n_{PUCCH,0}^{(3,1)}$, $n_{PUCCH,1}^{(3,1)}$, $n_{PUCCH,2}^{(3,1)}$, and $n_{PUCCH,3}^{(3,1)}$.

Meanwhile, as mentioned above, when antenna (port) transmission modes according to respective PUCCH formats are independently configured, if the PUCCH formats are flexibly changed, which of antenna (port) transmission modes is to be used for transmission should be taken into consideration. For example, when the PUCCH transmission formats are changed from PUCCH Format 3 to PUCCH Format 1, which of an antenna (port) transmission mode configured as PUCCH Format 3 and an antenna (port) transmission mode configured as PUCCH Format 1 is to be used for transmission should be considered.

In addition, an application time of the antenna (port) transmission mode for the changed PUCCH format should be considered. That is, if the PUCCH transmission formats are changed between a BS and a UE, a time when the UE applies the antenna (port) transmission mode and a time when the BS applies the antenna (port) transmission mode may be different. Then, while the BS expects a specific antenna (port) transmission mode, the UE may use an antenna (port) transmission mode different from the expected mode. In this case, inequality of control information between the BS and the UE may occur. Accordingly, it is necessary to determine an antenna (port) transmission mode in advance when the PUCCH transmission formats are changed.

Change of the PUCCH format may indicate the case where a designated PUCCH format is not used when a plurality of PUCCH formats is configured so as to be used and when a PUCCH format among the plurality of PUCCH formats is used according to a corresponding situation. For example, although PUCCH Format 1a/1b is used for ACK/NACK transmission, PUCCH Format 1 may be used for simultaneous transmission of ACK/NACK and SR. In this case, even if PUCCH is directly selected, this may be called change of a PUCCH format. Namely, change of a PUCCH format includes using PUCCH formats other than a designated PUCCH format for transmission of corresponding control information.

Hereinbelow, the case where flexible change occurs between PUCCH formats will be explained by way of example of scenario 1 in which a PUCCH format is changed from PUCCH Format 1a/1b to PUCCH Format 1 and scenario 2 in which a PUCCH format is changed from PUCCH Format 3 to PUCCH Format 1a/1b. However, the present invention is not limited thereto and it is apparent that similar methods may be applied in the case where change between various formats occurs.

Scenario 1 in which a PUCCH format is changed from PUCCH Format 1a/1b to PUCCH Format 1 occurs when SR transmission using PUCCH Format 1 and ACK/NACK transmission using PUCCH Format 1a/1b are simultaneously performed. For example, in simultaneous transmission of SR and ACK/NACK, if there is no SR, ACK/NACK may be transmitted using an ACK/NACK PUCCH resource and, in this case, an antenna (port) transmission mode configured as PUCCH Format 1a/1b may be used without any problem.

However, if there is SR, ACK/NACK may be transmitted using an SR PUCCH resource. If the number of ACK/NACK bits exceeds two bits, the number of ACKs is counted and preset transmission bits mapped thereto may be modulated and transmitted using an SR PUCCH resource. At this time, even if an antenna (port) transmission mode of PUCCH Format 1a/1b and an antenna (port) transmission mode of PUCCH Format 1 are independently configured, an antenna (port) transmission mode may be determined using one of the following three methods.

As a first method, an antenna (port) transmission mode may use an antenna (port) transmission mode of PUCCH Format 1a/1b for ACK/NACK transmission. For instance, in the case where PUCCH Format 1 is configured as an antenna (port) transmission mode of SORTD and PUCCH Format 1a/1b is configured as a single-antenna (port) transmission mode, when SR and ACK/NACK are simultaneously transmitted, ACK/NACK may be transmitted using an SR PUCCH resource as a single-antenna transmission mode.

As a second method, ACK/NACK may be transmitted as a predetermined antenna (port) transmission mode regardless of an antenna (port) transmission mode of PUCCH Format 1a/1b for ACK/NACK transmission. The predetermined antenna (port) transmission mode may be a single-antenna transmission mode. For instance, in the case where an antenna (port) transmission mode of PUCCH Format 1 is configured as SORTD and an antenna (port) transmission mode of PUCCH Format 1a/1b is configured as SORTD, if SR and ACK/NACK is simultaneously transmitted, ACK/NACK may be transmitted using an SR PUCCH resource as a single antenna transmission mode.

As a third method, ACK/NACK may be transmitted using an antenna (port) transmission mode of PUCCH Format 1 regardless of an antenna (port) transmission mode of PUCCH Format 1a/1b for ACK/NACK transmission. For example, in the case where an antenna (port) transmission mode of PUCCH Format 1a/1b is configured as SORTD and an antenna (port) transmission mode of PUCCH 1 is configured as a single-antenna transmission mode, if SR and ACK/NACK is simultaneously transmitted, ACK/NACK may be transmitted using an SR PUCCH resource as a single antenna transmission mode.

Scenario 2 in which a PUCCH format is changed from PUCCH Format 3 to PUCCH Format 1a/1b may be applied to fallback using the existing 3GPP Rel-8/9 PUCCH resource and Rel-8/9 PUCCH Format 1a/1b when a PDSCH is received only on a PCell.

In this case, even though PUCCH Format 3 and PUCCH Format 1a/1b are independently configured, an antenna (port) transmission mode may be determined using one of the following three methods.

As a first method, an antenna (port) transmission mode of PUCCH Format 3 may be used for transmission. For example, in the case where an antenna (port) transmission mode of PUCCH Format 3 is configured as SORTD, if a fallback situation occurs, ACK/NACK may be transmitted using PUCCH Format 1a/1b as SORTD. A PUCCH resource for a first antenna port may be determined as $n_{PUCCH}^{(1,0)} = n_{CCE} + N_{PUCCH}^{(1)}$ and a PUCCH resource for a second antenna port may be determined as $n_{PUCCH}^{(1,0)} = n_{CCE} + 1 + N_{PUCCH}^{(1)}$.

As a second method, ACK/NACK may be transmitted as a predetermined antenna (port) transmission mode irrespective of an antenna (port) transmission mode of PUCCH Format 3. The predetermined antenna (port) transmission mode may correspond to a single-antenna port mode. The single-antenna port mode using a single resource may be advantageous to solve uncertainty. For example, in the case where an antenna (port) transmission mode of PUCCH Format 3 is configured as SORTD, if a fallback situation occurs, ACK/NACK may be transmitted as a single antenna port mode using PUCCH Format 1a/1b using a PUCCH resource allocation rule of $n_{PUCCH}^{(1,0)} = n_{CCE} + N_{PUCCH}^{(1)}$.

As a third method, an antenna (port) transmission mode of PUCCH Format 1a/1b may be used for ACK/NACK transmission. For example, in the case where an antenna (port) transmission mode of PUCCH Format 3 is configured as a single antenna port mode and an antenna (port) transmission mode of PUCCH Format 1a/1b is configured as SORTD, if a fallback situation occurs, ACK/NACK may be transmitted as SORTD using PUCCH Format 1a/1b.

In the meantime, if SR and ACK/NACK transmissions simultaneously occur in a fallback situation, a rule of scenario 1 may be applied.

Figure 41:
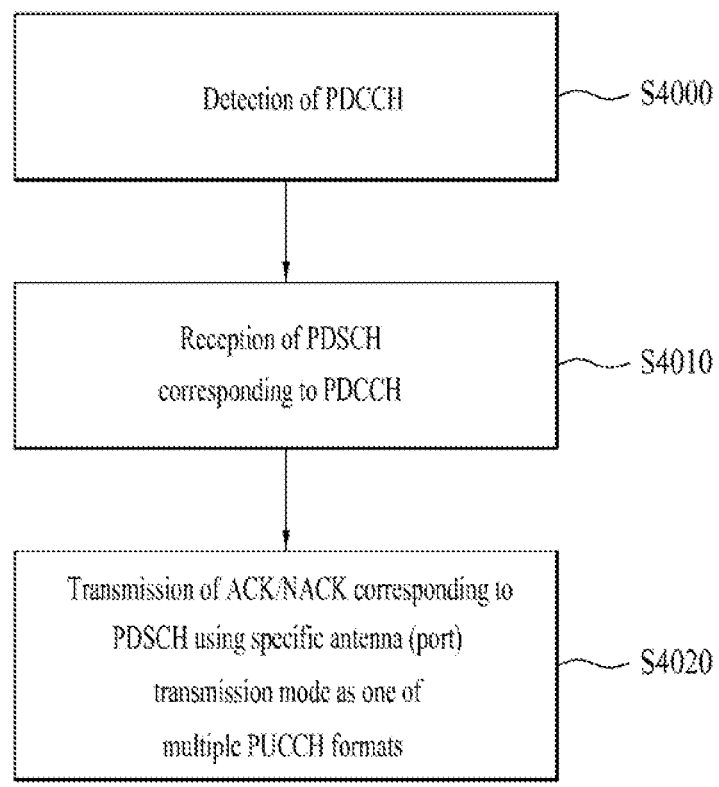
FIG. 41 is a flowchart illustrating an ACK/NACK transmission method to which the present invention is applied.

FIG. 41 is a flowchart illustrating an ACK/NACK transmission method to which the present invention is applied.

A UE may detect a PDCCH transmitted from a BS (S4000). The UE may receive a PDSCH based on the detected PDCCH (S4010). The UE may transmit ACK/NACK corresponding to the PDSCH using a specific antenna (port) transmission mode with one of a plurality of PUCCH formats (S4020). Meanwhile, the case where PUCCH formats are changed such as the case where ACK/NACK and SR transmissions simultaneously occur may occur. For example, if ACK/NACK and SR transmissions simultaneously occur, PUCCH Format 1a/1b for ACK/NACK transmission may be changed to PUCCH Format 1 using an SR PUCCH resource for ACK/NACK transmission. The same case may occur when PUCCH formats are changed from PUCCH Format 3 to PUCCH Format 1a/1b. As an antenna (port) transmission mode corresponding to the changed PUCCH format, an antenna (port) transmission mode corresponding to a PUCCH format prior to change, an antenna (port) transmission mode corresponding to a PUCCH format after change, or an antenna (port) transmission mode configured separately for the changed PUCCH format may be configured. The antenna (port) transmission mode configured separately for the changed PUCCH format preferably corresponds to a single antenna port mode.

Figure 42:
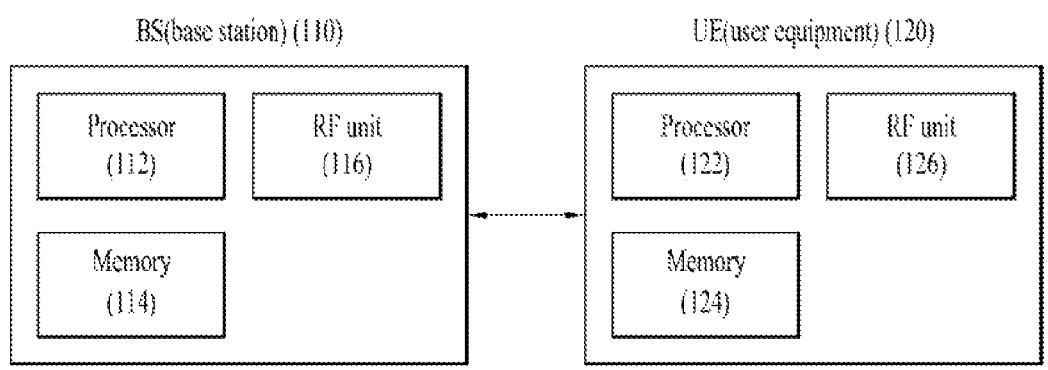
FIG. 42 illustrates a BS and a UE that are applicable to the present invention.

FIG. 42 illustrates a BS and a UE that are applicable to an exemplary embodiment of the present invention. If a relay is included in a wireless communication system, communication on backhaul link is performed between the BS and the relay and communication on access link is performed between the relay and the UE. Accordingly, the BS or the UE shown in the figure may be replaced with a relay according to circumstance.

Referring to FIG. 42, a wireless communication system includes a BS 110 and a UE 120. The BS 110 includes a processor 112, a memory 114, and a Radio Frequency (RF) unit 116. The processor 112 may be configured to carry out the procedures and/or methods proposed in the present invention. The memory 114 is connected to the processor 112 and stores various information related to the operation of the processor 112. The RF unit 116 is connected to the processor 112 and transmits and/or receives RF signals. The UE 120 includes a processor 122, a memory 124, and an RF unit 126. The processor 122 may be configured to carry out the procedures and/or methods proposed in the present invention. The memory 124 is connected to the processor 122 and stores various information related to the operation of the processor 122. The RF unit 126 is connected to the processor 122 and transmits and/or receives RF signals. The BS 110 and/or the UE may have a single antenna or multiple antennas.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

In the embodiments of the present invention, a description is mainly given, centering on a data transmission and reception relationship among a BS and a UE. Such a data transmission and reception relationship is extended to data transmission and reception between a UE and a relay or between a BS and a relay in the same or similar manner. In some cases, a specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the terms fixed station, Node B, eNode B (eNB), access point, etc. The term 'UE' may be replaced with the terms MS, Mobile Subscriber Station (MSS), etc. The term 'relay' may be replaced with the terms Relay Node (RN), relay station, repeater, etc.

The embodiments of the present invention may be achieved by various means, for example, hardware, firmware, software, or a combination thereof. In a hardware configuration, an embodiment of the present invention may be achieved by one or more ASICs, DSPs, DSDPs, PLDs, FPGAs, processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The present invention is applicable to a UE, BS, or other devices of a wireless mobile communication system. Specifically, the present invention is applicable to a method for transmitting uplink control information and an apparatus therefor.

The invention claimed is:

1. A method for transmitting, by a user equipment, an Acknowledgement/Negative Acknowledgement (ACK/NACK) signal in a wireless communication system, comprising:
when a Physical Downlink Shared Channel (PDSCH) is received only on a primary cell and the user equipment is configured to a Physical Uplink Control Channel (PUCCH) format 3, transmitting an at least one ACK/NACK signal corresponding to the PDSCH using a first PUCCH format,
wherein the at least one ACK/NACK signal is transmitted using an antenna port transmission mode configured for the first PUCCH format, and
wherein the first PUCCH format is one of a PUCCH format 1a or a PUCCH format 1b.

2. The method of claim 1, wherein the antenna port transmission mode for the first PUCCH format is configured by a radio resource control signal.

3. The method of claim 1, wherein an antenna port transmission mode for the PUCCH format 3 is configured independently from the first PUCCH format.

4. The method of claim 1, wherein the antenna port transmission mode is a single-antenna port mode.

5. The method of claim 1, wherein the antenna port transmission mode is a SORTD (Spatial Orthogonal Resource Transmit Diversity).

6. An apparatus for transmitting an Acknowledgement/Negative Acknowledgement (ACK/NACK) signal in a wireless communication system, comprising:
a Radio Frequency (RF) unit configured to receive and transmit radio signals; and
a processor configured to control the RF unit, wherein the processor is further configured to:
when a Physical Downlink Shared Channel (PDSCH) is received only on a primary cell and the apparatus is configured to a Physical Uplink Control Channel (PUCCH) format 3, transmit an at least one ACK/NACK signal corresponding to the PDSCH using a first PUCCH format,
wherein the at least one ACK/NACK signal is transmitted using an antenna port transmission mode configured for the first PUCCH format, and
wherein the first PUCCH format is one of a PUCCH format 1a or a PUCCH format 1b.

7. The apparatus of claim 6, wherein the antenna port transmission mode for the first PUCCH format is configured by a radio resource control signal.

8. The apparatus of claim 6, wherein an antenna port transmission mode for the PUCCH format 3 is configured independently from the first PUCCH format.

9. The apparatus of claim 6, wherein the antenna port transmission mode is a single-antenna port mode.

10. The apparatus of claim 1, wherein the antenna port transmission mode is a SORTD (Spatial Orthogonal Resource Transmit Diversity).

11. A method for transmitting, by a user equipment, an Acknowledgement/Negative Acknowledgement (ACK/NACK) signal in a wireless communication system, comprising:
configuring the user equipment to a Physical Uplink Control Channel (PUCCH) format 3;
when a Physical Downlink Shared Channel (PDSCH) is received only on a primary cell, transmitting an at least one ACK/NACK signal corresponding to the PDSCH using a first PUCCH format,
wherein the at least one ACK/NACK signal is transmitted using an antenna port transmission mode configured for the first PUCCH format,
wherein the first PUCCH format is one of a PUCCH format 1a or a PUCCH format 1b, and
wherein the antenna port transmission mode is a SORTD (Spatial Orthogonal Resource Transmit Diversity).

12. An apparatus for transmitting an Acknowledgement/Negative Acknowledgement (ACK/NACK) signal in a wireless communication system, comprising:
a Radio Frequency (RF) unit configured to receive and transmit radio signals; and
a processor configured to control the RF unit, wherein the processor is further configured to:
configure the user equipment to a Physical Uplink Control Channel (PUCCH) format 3,
when a Physical Downlink Shared Channel (PDSCH) is received only on a primary cell, transmit an at least one ACK/NACK signal corresponding to the PDSCH using a first PUCCH format,
wherein the at least one ACK/NACK signal is transmitted using an antenna port transmission mode configured for the first PUCCH format, wherein the first PUCCH format is one of a PUCCH format 1a or a PUCCH format 1b, and
wherein the antenna port transmission mode is a SORTD (Spatial Orthogonal Resource Transmit Diversity).

* * * * *